US012809511B2

(12) United States Patent
Ardaud et al.

(10) Patent No.: US 12,809,511 B2
(45) Date of Patent: Nov. 24, 2026

(54) MULTI-TYPE MEDIA USER INTERFACE

(71) Applicant: Apple Inc., Cupertino, CA (US)

(72) Inventors: Guillaume R. Ardaud, San Francisco, CA (US); Jeffrey T. Bernstein, San Francisco, CA (US); Joseph A. Malia, Isle of Wight (GB); Julian K. Missig, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 18/632,138

(22) Filed: Apr. 10, 2024

(65) Prior Publication Data

US 2024/0361898 A1 Oct. 31, 2024

Related U.S. Application Data

(60) Provisional application No. 63/462,213, filed on Apr. 26, 2023.

(51) Int. Cl.
*G06F 3/048* (2013.01)
*G06F 3/04847* (2022.01)

(52) U.S. Cl.
CPC ................................ *G06F 3/04847* (2013.01)

(58) Field of Classification Search
None
See application file for complete search history.

(56) References Cited

U.S. PATENT DOCUMENTS

| | | | |
|---|---|---|---|
| 4,518,237 | A | 5/1985 | Mizokami |
| 4,933,702 | A | 6/1990 | Komatsuzaki et al. |
| 5,463,443 | A | 10/1995 | Tanaka et al. |
| 5,557,358 | A | 9/1996 | Mukai et al. |
| 5,615,384 | A | 3/1997 | Allard et al. |
| 5,825,353 | A | 10/1998 | Will |
| 6,262,769 | B1 | 7/2001 | Anderson et al. |
| 6,268,864 | B1 | 7/2001 | Chen et al. |
| 6,278,466 | B1 | 8/2001 | Chen |
| 6,359,837 | B1 | 3/2002 | Tsukamoto |
| 6,429,896 | B1 | 8/2002 | Aruga et al. |
| 6,483,878 | B1 | 11/2002 | Yonezawa et al. |

(Continued)

FOREIGN PATENT DOCUMENTS

| | | | |
|---|---|---|---|
| CA | 2729392 | A1 | 8/2011 |
| CA | 2965700 | A1 | 5/2016 |

(Continued)

OTHER PUBLICATIONS

Corrected Notice of Allowance received for U.S. Appl. No. 17/992,789, mailed on Oct. 7, 2025, 2 pages.

(Continued)

*Primary Examiner* — Thanh T Vu
(74) *Attorney, Agent, or Firm* — YHE Law LLP

(57) ABSTRACT

The present disclosure generally relates to capturing and/or editing media items that can correspond to multiple media types and/or multiple cameras. In some embodiments, a method for capturing and/or editing media that can be presented as multiple different media types is described. In some embodiments, a method for capturing and/or editing media that was captured using multiple different cameras is described. In some embodiments, a method for selecting a subset of cameras with which to capture media is described.

44 Claims, 27 Drawing Sheets

(56) References Cited

U.S. PATENT DOCUMENTS 6,522,347 B1 2/2003 Sakai et al.
6,677,981 B1 1/2004 Mancuso et al.
6,809,724 B1 10/2004 Shiraishi et al.
6,809,759 B1 10/2004 Chiang
6,819,867 B2 11/2004 Mayer et al.
6,900,840 B1 5/2005 Schinner et al.
7,417,680 B2 8/2008 Aoki et al.
7,463,304 B2 12/2008 Murray
7,515,178 B1 4/2009 Fleischman et al.
7,583,892 B2 9/2009 Okumura
8,073,207 B2 12/2011 Ayaki et al.
8,185,839 B2 5/2012 Jalon et al.
8,189,087 B2 5/2012 Misawa et al.
8,203,640 B2 6/2012 Kim et al.
8,350,945 B2 1/2013 Yumiki
8,493,408 B2 7/2013 Williamson et al.
8,576,304 B2 11/2013 Ishibashi
8,624,836 B1 1/2014 Miller et al.
8,638,371 B2 1/2014 Laberge et al.
8,659,555 B2 2/2014 Pihlaja
8,675,084 B2 3/2014 Bolton et al.
8,723,988 B2 5/2014 Thorn
8,736,704 B2 5/2014 Jasinski et al.
8,736,716 B2 5/2014 Prentice
8,742,890 B2 6/2014 Gocho et al.
8,762,895 B2 6/2014 Mehta et al.
8,817,158 B2 8/2014 Saito
8,848,097 B2 9/2014 Makii
8,885,978 B2 11/2014 Cote et al.
8,941,749 B2 1/2015 Yahata
9,001,226 B1 4/2015 Ng et al.
9,024,938 B2 5/2015 Joshi
9,077,896 B2 7/2015 Park et al.
9,143,692 B2 9/2015 Hayashi
9,158,974 B1 10/2015 Laska et al.
9,172,866 B2 10/2015 Ito et al.
9,185,291 B1 11/2015 Shabtay et al.
9,223,486 B2 12/2015 Shin et al.
9,230,306 B2 1/2016 Sun et al.
9,250,797 B2 2/2016 Roberts et al.
9,264,660 B1 2/2016 Petterson et al.
9,288,476 B2 3/2016 Sandrew et al.
9,313,397 B2 4/2016 Harris et al.
9,313,401 B2 4/2016 Frey et al.
9,325,970 B2 4/2016 Sakayori
9,342,230 B2 5/2016 Bastien et al.
9,360,671 B1 6/2016 Zhou
9,423,868 B2 8/2016 Iwasaki
9,451,144 B2 9/2016 Dye
9,467,812 B2 10/2016 Jung et al.
9,507,420 B2 11/2016 Tartz et al.
9,538,069 B2 1/2017 Nagao
9,544,563 B1 1/2017 Cheng et al.
9,600,178 B2 3/2017 Yun et al.
9,609,221 B2 3/2017 Kim et al.
9,667,881 B2 5/2017 Harris et al.
9,716,825 B1 7/2017 Manzari et al.
9,749,543 B2 8/2017 Kim et al.
9,767,613 B1 9/2017 Bedikian et al.
9,824,499 B2 11/2017 Wright et al.
9,874,933 B1 1/2018 Carryer
9,942,463 B2 4/2018 Kuo et al.
9,973,674 B2 5/2018 Dye et al.
10,015,298 B2 7/2018 Yang et al.
10,021,294 B2 7/2018 Kwon et al.
10,055,887 B1 8/2018 Gil et al.
10,127,639 B2 11/2018 Miura et al.
10,152,222 B2 12/2018 Ozawa et al.
10,176,622 B1 1/2019 Waggoner et al.
10,187,587 B2 1/2019 Hasinoff et al.
10,225,463 B2 3/2019 Yun et al.
10,230,901 B2 3/2019 Harris et al.
10,270,983 B1 4/2019 Van Os et al.
10,277,829 B1 4/2019 Garrido et al.
10,297,034 B2 5/2019 Nash et al.
10,304,231 B2 5/2019 Saito
10,313,652 B1 6/2019 Falstrup et al.
10,325,417 B1 6/2019 Scapel et al.
10,326,942 B2 6/2019 Shabtay et al.
10,345,592 B2 7/2019 Samec et al.
10,397,469 B1 8/2019 Yan et al.
10,397,500 B1 8/2019 Xu et al.
10,447,908 B2 10/2019 Lee et al.
10,467,729 B1 11/2019 Perera et al.
10,467,775 B1 11/2019 Waggoner et al.
10,474,194 B1 11/2019 Ell et al.
10,523,879 B2 12/2019 Dye et al.
10,574,895 B2 2/2020 Lee et al.
10,585,551 B2 3/2020 Lee et al.
10,614,139 B2 4/2020 Fujioka et al.
10,645,294 B1 5/2020 Manzari et al.
10,652,470 B1 5/2020 Manzari et al.
10,674,072 B1 6/2020 Manzari et al.
10,681,282 B1 6/2020 Manzari et al.
10,681,341 B2 6/2020 Lutter et al.
10,735,642 B1 8/2020 Manzari et al.
10,735,643 B1 8/2020 Manzari et al.
10,791,273 B1 9/2020 Manzari et al.
10,955,956 B2 3/2021 Gleeson et al.
10,958,850 B2 3/2021 Kwak et al.
10,962,935 B1 3/2021 Ely et al.
11,032,535 B2 6/2021 Lutter et al.
11,032,538 B2 6/2021 Lutter et al.
11,039,074 B1 6/2021 Manzari et al.
11,054,973 B1 7/2021 Manzari et al.
11,070,717 B2 7/2021 Cragg et al.
11,099,650 B1 8/2021 Haynold
11,140,313 B1 10/2021 Knott
11,209,957 B2 12/2021 Dryer et al.
11,212,449 B1 12/2021 Manzari et al.
11,321,857 B2 5/2022 Stauber et al.
11,350,026 B1 5/2022 Manzari et al.
11,399,155 B2 7/2022 Van Os et al.
11,431,891 B2 8/2022 O'leary et al.
11,468,625 B2 10/2022 Manzari et al.
11,490,017 B2 11/2022 Bernstein et al.
11,550,420 B2 1/2023 Bovet et al.
11,570,359 B2 * 1/2023 Lee ........................ H04N 23/45
11,606,496 B2 3/2023 Watanabe et al.
11,747,969 B1 9/2023 Karunamuni
11,811,961 B2 11/2023 Zhang et al.
11,877,064 B1 1/2024 Douglas et al.
2002/0140803 A1 10/2002 Gutta et al.
2002/0167604 A1 11/2002 Ban et al.
2002/0171737 A1 11/2002 Tullis et al.
2003/0025802 A1 2/2003 Mayer, Jr. et al.
2003/0107664 A1 6/2003 Suzuki
2003/0122930 A1 7/2003 Schofield et al.
2003/0160756 A1 8/2003 Numano
2003/0174216 A1 9/2003 Iguchi et al.
2003/0184587 A1 10/2003 Ording et al.
2004/0041924 A1 3/2004 White et al.
2004/0061796 A1 4/2004 Honda et al.
2004/0090469 A1 5/2004 Moon et al.
2004/0090546 A1 5/2004 Doron
2004/0095473 A1 5/2004 Park
2004/0189861 A1 9/2004 Tom et al.
2004/0201699 A1 10/2004 Parulski et al.
2005/0027515 A1 2/2005 Huang et al.
2005/0134695 A1 6/2005 Deshpande et al.
2005/0189419 A1 9/2005 Igarashi et al.
2005/0206981 A1 9/2005 Hung
2005/0210403 A1 9/2005 Satanek
2005/0237383 A1 10/2005 Soga et al.
2005/0248660 A1 11/2005 Stavely et al.
2005/0270397 A1 12/2005 Battles
2006/0026521 A1 2/2006 Hotelling et al.
2006/0033831 A1 2/2006 Ejima et al.
2006/0132482 A1 6/2006 Oh et al.
2006/0158730 A1 7/2006 Kira
2006/0187322 A1 8/2006 Janson et al.
2006/0209067 A1 9/2006 Pellacini et al.
2006/0233192 A1 10/2006 Mihara
2006/0275025 A1 12/2006 Labaziewicz et al.

(56) References Cited

U.S. PATENT DOCUMENTS

| | | | |
|---|---|---|---|
| 2007/0025711 | A1 | 2/2007 | Marcus et al. |
| 2007/0025714 | A1 | 2/2007 | Shiraki |
| 2007/0025723 | A1 | 2/2007 | Baudisch et al. |
| 2007/0031062 | A1 | 2/2007 | Pal et al. |
| 2007/0040810 | A1 | 2/2007 | Dowe et al. |
| 2007/0097088 | A1 | 5/2007 | Battles |
| 2007/0109417 | A1 | 5/2007 | Hyttfors et al. |
| 2007/0140675 | A1 | 6/2007 | Yanagi et al. |
| 2007/0146503 | A1 | 6/2007 | Shiraki |
| 2007/0153112 | A1 | 7/2007 | Ueda et al. |
| 2007/0165103 | A1 | 7/2007 | Arima et al. |
| 2007/0228259 | A1 | 10/2007 | Hohenberger |
| 2007/0254640 | A1 | 11/2007 | Bliss |
| 2007/0273769 | A1 | 11/2007 | Takahashi |
| 2007/0291152 | A1 | 12/2007 | Suekane et al. |
| 2008/0030592 | A1 | 2/2008 | Border et al. |
| 2008/0084484 | A1 | 4/2008 | Ochi et al. |
| 2008/0106601 | A1 | 5/2008 | Matsuda |
| 2008/0129759 | A1 | 6/2008 | Jeon et al. |
| 2008/0129825 | A1 | 6/2008 | Deangelis et al. |
| 2008/0131019 | A1 | 6/2008 | Ng |
| 2008/0143840 | A1 | 6/2008 | Corkum et al. |
| 2008/0192020 | A1 | 8/2008 | Kang et al. |
| 2008/0218611 | A1 | 9/2008 | Parulski et al. |
| 2008/0219654 | A1 | 9/2008 | Border et al. |
| 2008/0222558 | A1 | 9/2008 | Cho et al. |
| 2008/0259154 | A1 | 10/2008 | Garrison et al. |
| 2008/0284855 | A1 | 11/2008 | Umeyama et al. |
| 2008/0297587 | A1 | 12/2008 | Kurtz et al. |
| 2008/0309811 | A1 | 12/2008 | Fujinawa et al. |
| 2009/0009612 | A1 | 1/2009 | Tico et al. |
| 2009/0021576 | A1 | 1/2009 | Linder et al. |
| 2009/0021600 | A1 | 1/2009 | Watanabe |
| 2009/0022422 | A1 | 1/2009 | Sorek et al. |
| 2009/0027515 | A1 | 1/2009 | Maruyama et al. |
| 2009/0027539 | A1 | 1/2009 | Kunou |
| 2009/0040332 | A1 | 2/2009 | Yoshino et al. |
| 2009/0046097 | A1 | 2/2009 | Franklin |
| 2009/0051783 | A1 | 2/2009 | Kim et al. |
| 2009/0102918 | A1 | 4/2009 | Sakamoto et al. |
| 2009/0102933 | A1 | 4/2009 | Harris et al. |
| 2009/0109316 | A1 | 4/2009 | Matsui |
| 2009/0160778 | A1 | 6/2009 | Nurmi et al. |
| 2009/0167671 | A1 | 7/2009 | Kerofsky |
| 2009/0167672 | A1 | 7/2009 | Kerofsky |
| 2009/0175511 | A1 | 7/2009 | Lee et al. |
| 2009/0227295 | A1 | 9/2009 | Kim |
| 2009/0244318 | A1 | 10/2009 | Makii |
| 2009/0262088 | A1 | 10/2009 | Moll-Carrillo et al. |
| 2009/0263044 | A1 | 10/2009 | Imagawa et al. |
| 2009/0276700 | A1 | 11/2009 | Anderson et al. |
| 2009/0315671 | A1 | 12/2009 | Gocho et al. |
| 2009/0322901 | A1 | 12/2009 | Subbotin et al. |
| 2010/0020221 | A1 | 1/2010 | Tupman et al. |
| 2010/0020222 | A1 | 1/2010 | Jones et al. |
| 2010/0026637 | A1 | 2/2010 | Lai |
| 2010/0033615 | A1 | 2/2010 | Mori |
| 2010/0039394 | A1 | 2/2010 | Moussavi |
| 2010/0039522 | A1 | 2/2010 | Huang |
| 2010/0066853 | A1 | 3/2010 | Aoki et al. |
| 2010/0066889 | A1 | 3/2010 | Ueda et al. |
| 2010/0066890 | A1 | 3/2010 | Ueda et al. |
| 2010/0066895 | A1 | 3/2010 | Ueda et al. |
| 2010/0097322 | A1 | 4/2010 | Hu et al. |
| 2010/0123737 | A1 | 5/2010 | Williamson et al. |
| 2010/0162160 | A1 | 6/2010 | Stallings et al. |
| 2010/0164893 | A1 | 7/2010 | Shin et al. |
| 2010/0173678 | A1 | 7/2010 | Kim et al. |
| 2010/0194931 | A1 | 8/2010 | Kawaguchi et al. |
| 2010/0208122 | A1 | 8/2010 | Yumiki |
| 2010/0231735 | A1 | 9/2010 | Burian et al. |
| 2010/0231777 | A1 | 9/2010 | Shintani et al. |
| 2010/0232703 | A1 | 9/2010 | Aiso |
| 2010/0232704 | A1 | 9/2010 | Thorn |
| 2010/0238327 | A1 | 9/2010 | Griffith et al. |
| 2010/0245287 | A1 | 9/2010 | Thorn |
| 2010/0259645 | A1 | 10/2010 | Kaplan et al. |
| 2010/0283743 | A1 | 11/2010 | Coddington |
| 2010/0289825 | A1 | 11/2010 | Shin et al. |
| 2010/0289910 | A1 | 11/2010 | Kamshilin et al. |
| 2010/0302280 | A1 | 12/2010 | Szeliski et al. |
| 2011/0008033 | A1 | 1/2011 | Ichimiya et al. |
| 2011/0013049 | A1 | 1/2011 | Thörn |
| 2011/0018970 | A1 | 1/2011 | Wakabayashi |
| 2011/0019058 | A1 | 1/2011 | Sakai et al. |
| 2011/0019069 | A1 | 1/2011 | Kojima et al. |
| 2011/0043662 | A1 | 2/2011 | Kim |
| 2011/0050864 | A1 | 3/2011 | Bond |
| 2011/0058052 | A1 | 3/2011 | Bolton et al. |
| 2011/0074710 | A1 | 3/2011 | Weeldreyer et al. |
| 2011/0074830 | A1 | 3/2011 | Rapp et al. |
| 2011/0085016 | A1 | 4/2011 | Kristiansen et al. |
| 2011/0109581 | A1 | 5/2011 | Ozawa et al. |
| 2011/0115932 | A1 | 5/2011 | Shin et al. |
| 2011/0138332 | A1 | 6/2011 | Miyagawa |
| 2011/0157379 | A1 | 6/2011 | Kimura |
| 2011/0176039 | A1 | 7/2011 | Lo |
| 2011/0187879 | A1 | 8/2011 | Ochiai |
| 2011/0199495 | A1 | 8/2011 | Laberge et al. |
| 2011/0234853 | A1 | 9/2011 | Hayashi et al. |
| 2011/0242369 | A1 | 10/2011 | Misawa et al. |
| 2011/0249078 | A1 | 10/2011 | Abuan et al. |
| 2011/0296163 | A1 | 12/2011 | Abernethy et al. |
| 2012/0002098 | A1 | 1/2012 | Ueda |
| 2012/0002898 | A1 | 1/2012 | Côté et al. |
| 2012/0011456 | A1 | 1/2012 | Noda et al. |
| 2012/0026378 | A1 | 2/2012 | Pang et al. |
| 2012/0056997 | A1 | 3/2012 | Jang |
| 2012/0057064 | A1 | 3/2012 | Gardiner et al. |
| 2012/0069206 | A1 | 3/2012 | Hsieh |
| 2012/0105579 | A1 | 5/2012 | Jeon et al. |
| 2012/0120277 | A1 | 5/2012 | Tsai et al. |
| 2012/0127189 | A1 | 5/2012 | Park et al. |
| 2012/0127346 | A1 | 5/2012 | Sato et al. |
| 2012/0133797 | A1 | 5/2012 | Sato et al. |
| 2012/0162242 | A1 | 6/2012 | Amano et al. |
| 2012/0162455 | A1 | 6/2012 | Kim et al. |
| 2012/0169776 | A1 | 7/2012 | Rissa et al. |
| 2012/0188394 | A1 | 7/2012 | Park et al. |
| 2012/0194559 | A1 | 8/2012 | Lim |
| 2012/0206621 | A1 | 8/2012 | Chen et al. |
| 2012/0235990 | A1 | 9/2012 | Yamaji |
| 2012/0243802 | A1 | 9/2012 | Fintel et al. |
| 2012/0249853 | A1 | 10/2012 | Krolczyk et al. |
| 2012/0274830 | A1 | 11/2012 | Kameyama et al. |
| 2012/0293611 | A1 | 11/2012 | Lee |
| 2012/0308209 | A1 | 12/2012 | Zaletel |
| 2012/0320141 | A1 | 12/2012 | Bowen et al. |
| 2013/0009858 | A1 | 1/2013 | Lacey |
| 2013/0010170 | A1 | 1/2013 | Matsuzawa et al. |
| 2013/0038546 | A1 | 2/2013 | Mineo |
| 2013/0038771 | A1 | 2/2013 | Brunner et al. |
| 2013/0055119 | A1 | 2/2013 | Luong |
| 2013/0057472 | A1 | 3/2013 | Dizac et al. |
| 2013/0076908 | A1 | 3/2013 | Bratton et al. |
| 2013/0083222 | A1 | 4/2013 | Matsuzawa et al. |
| 2013/0088413 | A1 | 4/2013 | Raffle et al. |
| 2013/0091298 | A1 | 4/2013 | Ozzie et al. |
| 2013/0093904 | A1 | 4/2013 | Wagner et al. |
| 2013/0109425 | A1 | 5/2013 | Kerger et al. |
| 2013/0120386 | A1 | 5/2013 | Wilensky et al. |
| 2013/0135315 | A1 | 5/2013 | Bares et al. |
| 2013/0141362 | A1 | 6/2013 | Asanuma et al. |
| 2013/0155308 | A1 | 6/2013 | Wu et al. |
| 2013/0165186 | A1 | 6/2013 | Choi |
| 2013/0179831 | A1 | 7/2013 | Izaki |
| 2013/0194378 | A1 | 8/2013 | Brown |
| 2013/0201307 | A1 | 8/2013 | Schloter et al. |
| 2013/0208093 | A1 | 8/2013 | Sun et al. |
| 2013/0208136 | A1 | 8/2013 | Takatsuka et al. |
| 2013/0210563 | A1 | 8/2013 | Hollinger |
| 2013/0222671 | A1 | 8/2013 | Tseng et al. |
| 2013/0235222 | A1 | 9/2013 | Karn et al. |
| 2013/0235226 | A1 | 9/2013 | Karn et al. |

(56) References Cited

U.S. PATENT DOCUMENTS

2013/0235234 A1 9/2013 Cucci et al.
2013/0239057 A1 9/2013 Ubillos et al.
2013/0246948 A1 9/2013 Chen et al.
2013/0265311 A1 10/2013 Na et al.
2013/0265467 A1 10/2013 Matsuzawa et al.
2013/0278576 A1 10/2013 Lee et al.
2013/0286251 A1 10/2013 Wood et al.
2013/0311186 A1 11/2013 Lee et al.
2013/0321340 A1 12/2013 Seo et al.
2013/0329074 A1 12/2013 Zhang et al.
2013/0346916 A1 12/2013 Williamson et al.
2014/0007021 A1 1/2014 Akiyama et al.
2014/0009639 A1 1/2014 Lee
2014/0022399 A1 1/2014 Rashid et al.
2014/0028872 A1 1/2014 Lee et al.
2014/0028885 A1 1/2014 Ma et al.
2014/0033043 A1 1/2014 Kashima
2014/0033100 A1 1/2014 Noda et al.
2014/0037178 A1 2/2014 Park
2014/0043368 A1 2/2014 Yu
2014/0043517 A1 2/2014 Yim et al.
2014/0047389 A1 2/2014 Aarabi
2014/0049536 A1 2/2014 Neuman et al.
2014/0063175 A1 3/2014 Jafry et al.
2014/0063313 A1 3/2014 Choi et al.
2014/0071325 A1 3/2014 Kawahara et al.
2014/0078371 A1 3/2014 Kinoshita
2014/0092272 A1 4/2014 Choi
2014/0099994 A1 4/2014 Bishop et al.
2014/0104449 A1 4/2014 Masarik et al.
2014/0108928 A1 4/2014 Mumick
2014/0118563 A1 5/2014 Mehta et al.
2014/0132735 A1 5/2014 Lee et al.
2014/0143678 A1 5/2014 Mistry et al.
2014/0152886 A1 6/2014 Morgan-Mar et al.
2014/0160231 A1 6/2014 Middleton et al.
2014/0160304 A1 6/2014 Galor et al.
2014/0160316 A1 6/2014 Hwang
2014/0176469 A1 6/2014 Lim
2014/0184524 A1 7/2014 Schiefer et al.
2014/0192212 A1 7/2014 He et al.
2014/0192232 A1 7/2014 Park et al.
2014/0192233 A1 7/2014 Kakkori et al.
2014/0194164 A1* 7/2014 Lee ...................... G06F 3/0485 455/566
2014/0204229 A1 7/2014 Leung et al.
2014/0218383 A1 8/2014 Srivastava
2014/0218599 A1 8/2014 Nakamura et al.
2014/0226052 A1 8/2014 Kang et al.
2014/0232838 A1 8/2014 Jorgensen et al.
2014/0232921 A1 8/2014 Kim et al.
2014/0240471 A1 8/2014 Srinivasa et al.
2014/0240531 A1 8/2014 Nakai et al.
2014/0240551 A1 8/2014 Kim et al.
2014/0240577 A1 8/2014 Masugi
2014/0253470 A1 9/2014 Havilio
2014/0267867 A1 9/2014 Lee et al.
2014/0281966 A1 9/2014 Kajiyama et al.
2014/0281983 A1 9/2014 Xian et al.
2014/0282223 A1 9/2014 Bastien et al.
2014/0285698 A1 9/2014 Geiss
2014/0300635 A1 10/2014 Suzuki
2014/0300779 A1 10/2014 Yeo et al.
2014/0307147 A1 10/2014 Hanzawa et al.
2014/0310598 A1 10/2014 Sprague et al.
2014/0327639 A1 11/2014 Papakipos et al.
2014/0333671 A1 11/2014 Phang et al.
2014/0333790 A1 11/2014 Wakazono
2014/0333824 A1 11/2014 Xiu
2014/0351753 A1 11/2014 Shin et al.
2014/0354845 A1 12/2014 Mølgaard et al.
2014/0359438 A1 12/2014 Matsuki
2014/0362257 A1 12/2014 Viljamaa et al.
2014/0362274 A1 12/2014 Christie et al.
2014/0368601 A1 12/2014 Decharms
2014/0368719 A1 12/2014 Kaneko et al.
2014/0372856 A1 12/2014 Radakovitz et al.
2014/0375862 A1 12/2014 Kim et al.
2015/0022649 A1 1/2015 Koppal
2015/0022674 A1 1/2015 Koss et al.
2015/0033129 A1 1/2015 Cho et al.
2015/0042852 A1 2/2015 Lee et al.
2015/0049233 A1 2/2015 Choi
2015/0067513 A1 3/2015 Zambetti et al.
2015/0070362 A1 3/2015 Hirai
2015/0085174 A1 3/2015 Shabtay et al.
2015/0092077 A1 4/2015 Feder et al.
2015/0116353 A1 4/2015 Miura et al.
2015/0116448 A1 4/2015 Gottlieb
2015/0116542 A1 4/2015 Lee
2015/0135109 A1 5/2015 Zambetti et al.
2015/0135234 A1 5/2015 Hall
2015/0138079 A1 5/2015 Lannsjö
2015/0145950 A1 5/2015 Murphy et al.
2015/0146079 A1 5/2015 Kim
2015/0149967 A1 5/2015 Bernstein et al.
2015/0150141 A1 5/2015 Szymanski et al.
2015/0154448 A1 6/2015 Murayama et al.
2015/0160839 A1* 6/2015 Krishnaswamy ... G06F 3/04845 715/810
2015/0172534 A1 6/2015 Miyakawa et al.
2015/0181135 A1 6/2015 Shimosato
2015/0189162 A1 7/2015 Kuo et al.
2015/0194186 A1 7/2015 Lee et al.
2015/0201130 A1 7/2015 Cho et al.
2015/0207924 A1 7/2015 Kim et al.
2015/0212723 A1 7/2015 Lim et al.
2015/0220249 A1 8/2015 Snibbe et al.
2015/0248198 A1 9/2015 Somlai-Fisher et al.
2015/0248213 A1 9/2015 Postal
2015/0249775 A1 9/2015 Jacumet
2015/0249785 A1 9/2015 Mehta et al.
2015/0254855 A1 9/2015 Patankar et al.
2015/0254868 A1 9/2015 Srikanth et al.
2015/0256749 A1 9/2015 Frey et al.
2015/0264202 A1 9/2015 Pawlowski
2015/0271389 A1 9/2015 Huang et al.
2015/0281585 A1 10/2015 Guldogan
2015/0289104 A1 10/2015 Jung et al.
2015/0297185 A1 10/2015 Mccormack et al.
2015/0301731 A1 10/2015 Okamoto et al.
2015/0310583 A1 10/2015 Hume et al.
2015/0312185 A1 10/2015 Langholz et al.
2015/0334291 A1 11/2015 Cho et al.
2015/0334292 A1 11/2015 Tartz et al.
2015/0334293 A1 11/2015 Jeung
2015/0341536 A1 11/2015 Huang et al.
2015/0350141 A1 12/2015 Yang et al.
2015/0350523 A1 12/2015 Kinoshita
2015/0350533 A1 12/2015 Harris et al.
2015/0350535 A1 12/2015 Voss
2015/0362998 A1 12/2015 Park et al.
2015/0370458 A1 12/2015 Chen
2016/0012567 A1 1/2016 Siddiqui et al.
2016/0026371 A1 1/2016 Lu et al.
2016/0029004 A1 1/2016 Campbell et al.
2016/0044236 A1 2/2016 Matsuzawa et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050351 A1 2/2016 Lee et al.
2016/0050446 A1 2/2016 Fujioka et al.
2016/0065832 A1 3/2016 Kim et al.
2016/0077725 A1 3/2016 Maeda
2016/0080639 A1 3/2016 Choi et al.
2016/0080657 A1 3/2016 Chuang et al.
2016/0088280 A1 3/2016 Sadi et al.
2016/0105388 A1 4/2016 Bin Mahfooz et al.
2016/0117829 A1 4/2016 Yoon et al.
2016/0119552 A1 4/2016 Oh et al.
2016/0127636 A1 5/2016 Ito et al.
2016/0127638 A1 5/2016 Guo et al.
2016/0132201 A1 5/2016 Shaw et al.

(56) References Cited

U.S. PATENT DOCUMENTS

| | | | |
|---|---|---|---|
| 2016/0148384 | A1 | 5/2016 | Bud et al. |
| 2016/0162039 | A1 | 6/2016 | Eilat et al. |
| 2016/0173869 | A1 | 6/2016 | Srikanth et al. |
| 2016/0188181 | A1 | 6/2016 | Smith |
| 2016/0212319 | A1 | 7/2016 | Harris et al. |
| 2016/0219212 | A1 | 7/2016 | Shoji |
| 2016/0219217 | A1 | 7/2016 | Williams et al. |
| 2016/0225175 | A1 | 8/2016 | Kim et al. |
| 2016/0227016 | A1 | 8/2016 | Kim et al. |
| 2016/0241777 | A1 | 8/2016 | Rav-Acha et al. |
| 2016/0241793 | A1 | 8/2016 | Shanmugavadivelu et al. |
| 2016/0247288 | A1 | 8/2016 | Omori et al. |
| 2016/0255268 | A1 | 9/2016 | Kang et al. |
| 2016/0259413 | A1 | 9/2016 | Anzures et al. |
| 2016/0283586 | A1 | 9/2016 | Thapliyal et al. |
| 2016/0316147 | A1 | 10/2016 | Bernstein et al. |
| 2016/0337570 | A1 | 11/2016 | Tan et al. |
| 2016/0337582 | A1 | 11/2016 | Shimauchi et al. |
| 2016/0357353 | A1 | 12/2016 | Miura et al. |
| 2016/0357354 | A1 | 12/2016 | Chen et al. |
| 2016/0360097 | A1 | 12/2016 | Penha et al. |
| 2016/0360116 | A1 | 12/2016 | Penha et al. |
| 2016/0366344 | A1 | 12/2016 | Pan et al. |
| 2016/0373631 | A1 | 12/2016 | Titi et al. |
| 2016/0373650 | A1 | 12/2016 | Kim et al. |
| 2017/0006210 | A1 | 1/2017 | Dye et al. |
| 2017/0011773 | A1 | 1/2017 | Lee |
| 2017/0013179 | A1 | 1/2017 | Kang et al. |
| 2017/0019604 | A1 | 1/2017 | Kim et al. |
| 2017/0024872 | A1 | 1/2017 | Olsson et al. |
| 2017/0026565 | A1 | 1/2017 | Hong et al. |
| 2017/0032269 | A1 | 2/2017 | Portilla et al. |
| 2017/0034449 | A1 | 2/2017 | Eum et al. |
| 2017/0038852 | A1 | 2/2017 | Hildreth et al. |
| 2017/0039686 | A1 | 2/2017 | Miura et al. |
| 2017/0041549 | A1 | 2/2017 | Kim et al. |
| 2017/0041677 | A1 | 2/2017 | Anderson et al. |
| 2017/0046025 | A1 | 2/2017 | Dascola et al. |
| 2017/0048450 | A1 | 2/2017 | Lee et al. |
| 2017/0048461 | A1 | 2/2017 | Lee et al. |
| 2017/0048494 | A1 | 2/2017 | Boyle et al. |
| 2017/0054960 | A1 | 2/2017 | Chien et al. |
| 2017/0064184 | A1 | 3/2017 | Tsai |
| 2017/0064205 | A1 | 3/2017 | Choi et al. |
| 2017/0064213 | A1 | 3/2017 | Windmark et al. |
| 2017/0092329 | A1 | 3/2017 | Kim et al. |
| 2017/0094019 | A1 | 3/2017 | Ahmed et al. |
| 2017/0109912 | A1 | 4/2017 | Lee et al. |
| 2017/0111567 | A1 | 4/2017 | Pila |
| 2017/0124664 | A1 | 5/2017 | Savenok et al. |
| 2017/0134605 | A1 | 5/2017 | Ju et al. |
| 2017/0139572 | A1 | 5/2017 | Sunkavalli et al. |
| 2017/0186162 | A1 | 6/2017 | Mihic et al. |
| 2017/0230576 | A1 | 8/2017 | Sparks et al. |
| 2017/0230585 | A1 | 8/2017 | Nash et al. |
| 2017/0237888 | A1 | 8/2017 | Harris et al. |
| 2017/0243389 | A1 | 8/2017 | Wild et al. |
| 2017/0244482 | A1 | 8/2017 | Dimare et al. |
| 2017/0244896 | A1 | 8/2017 | Chien et al. |
| 2017/0244897 | A1 | 8/2017 | Jung et al. |
| 2017/0257559 | A1 | 9/2017 | Stricker |
| 2017/0257596 | A1 | 9/2017 | Murata et al. |
| 2017/0264817 | A1 | 9/2017 | Yan et al. |
| 2017/0285764 | A1 | 10/2017 | Kim et al. |
| 2017/0287220 | A1 | 10/2017 | Khalid et al. |
| 2017/0289462 | A1 | 10/2017 | Eum et al. |
| 2017/0302840 | A1 | 10/2017 | Hasinoff et al. |
| 2017/0315772 | A1 | 11/2017 | Lee et al. |
| 2017/0324784 | A1 | 11/2017 | Taine et al. |
| 2017/0336961 | A1 | 11/2017 | Heo et al. |
| 2017/0354888 | A1 | 12/2017 | Benedetto et al. |
| 2017/0358071 | A1 | 12/2017 | Yamaoka et al. |
| 2017/0359504 | A1 | 12/2017 | Manzari et al. |
| 2017/0359505 | A1 | 12/2017 | Manzari et al. |
| 2017/0359506 | A1 | 12/2017 | Manzari et al. |
| 2017/0366729 | A1 | 12/2017 | Itoh |
| 2017/0371538 | A1 | 12/2017 | Zhang et al. |
| 2017/0371844 | A1 | 12/2017 | Yao |
| 2018/0007315 | A1 | 1/2018 | Kim et al. |
| 2018/0021684 | A1 | 1/2018 | Benedetto |
| 2018/0032536 | A1 | 2/2018 | Stachowski |
| 2018/0047200 | A1 | 2/2018 | O'hara et al. |
| 2018/0048820 | A1 | 2/2018 | Hinkel et al. |
| 2018/0052571 | A1 | 2/2018 | Seol et al. |
| 2018/0067622 | A1 | 3/2018 | Chaudhri et al. |
| 2018/0077332 | A1 | 3/2018 | Shimura et al. |
| 2018/0081502 | A1 | 3/2018 | Sangco et al. |
| 2018/0088787 | A1 | 3/2018 | Bereza et al. |
| 2018/0091728 | A1 | 3/2018 | Brown et al. |
| 2018/0096487 | A1 | 4/2018 | Nash et al. |
| 2018/0107367 | A1 | 4/2018 | Rinneberg et al. |
| 2018/0109722 | A1 | 4/2018 | Laroia et al. |
| 2018/0113577 | A1 | 4/2018 | Burns et al. |
| 2018/0114543 | A1 | 4/2018 | Novikoff |
| 2018/0120661 | A1 | 5/2018 | Kilgore et al. |
| 2018/0124299 | A1 | 5/2018 | Brook |
| 2018/0129224 | A1 | 5/2018 | Hur |
| 2018/0131876 | A1 | 5/2018 | Bernstein et al. |
| 2018/0146132 | A1 | 5/2018 | Manzari et al. |
| 2018/0152611 | A1 | 5/2018 | Li et al. |
| 2018/0184008 | A1 | 6/2018 | Kondo |
| 2018/0184061 | A1 | 6/2018 | Kitsunai et al. |
| 2018/0198985 | A1 | 7/2018 | Ishitsuka |
| 2018/0199025 | A1 | 7/2018 | Holzer et al. |
| 2018/0213144 | A1 | 7/2018 | Kim et al. |
| 2018/0213161 | A1 | 7/2018 | Kanda et al. |
| 2018/0227479 | A1 | 8/2018 | Parameswaran et al. |
| 2018/0227482 | A1 | 8/2018 | Holzer et al. |
| 2018/0227505 | A1 | 8/2018 | Baltz et al. |
| 2018/0234608 | A1 | 8/2018 | Sudo et al. |
| 2018/0239930 | A1 | 8/2018 | Lai et al. |
| 2018/0262677 | A1 | 9/2018 | Dye et al. |
| 2018/0267703 | A1 | 9/2018 | Kamimaru et al. |
| 2018/0270420 | A1 | 9/2018 | Lee et al. |
| 2018/0278823 | A1 | 9/2018 | Horesh |
| 2018/0284979 | A1 | 10/2018 | Choi et al. |
| 2018/0288310 | A1 | 10/2018 | Goldenberg |
| 2018/0302551 | A1 | 10/2018 | Yamajo et al. |
| 2018/0302568 | A1 | 10/2018 | Kim et al. |
| 2018/0308282 | A1 | 10/2018 | Yokoi |
| 2018/0335901 | A1 | 11/2018 | Manzari et al. |
| 2018/0349008 | A1 | 12/2018 | Manzari et al. |
| 2018/0349659 | A1 | 12/2018 | Manzari et al. |
| 2018/0352165 | A1 | 12/2018 | Zhen et al. |
| 2018/0364815 | A1 | 12/2018 | Moussette et al. |
| 2018/0376122 | A1 | 12/2018 | Park et al. |
| 2019/0007589 | A1 | 1/2019 | Kadambala et al. |
| 2019/0028650 | A1 | 1/2019 | Bernstein et al. |
| 2019/0029513 | A1 | 1/2019 | Gunnerson et al. |
| 2019/0051032 | A1 | 2/2019 | Chu et al. |
| 2019/0080189 | A1 | 3/2019 | Van Os et al. |
| 2019/0082097 | A1 | 3/2019 | Manzari et al. |
| 2019/0089873 | A1 | 3/2019 | Misawa et al. |
| 2019/0108684 | A1 | 4/2019 | Callaghan |
| 2019/0114740 | A1 | 4/2019 | Ogino et al. |
| 2019/0121216 | A1 | 4/2019 | Shabtay et al. |
| 2019/0138259 | A1 | 5/2019 | Bagaria et al. |
| 2019/0141030 | A1 | 5/2019 | Cockerill et al. |
| 2019/0149706 | A1 | 5/2019 | Rivard et al. |
| 2019/0174054 | A1 | 6/2019 | Srivastava et al. |
| 2019/0199926 | A1 | 6/2019 | An et al. |
| 2019/0205861 | A1 | 7/2019 | Bace |
| 2019/0206031 | A1 | 7/2019 | Kim et al. |
| 2019/0220089 | A1 | 7/2019 | Kakizawa et al. |
| 2019/0222769 | A1 | 7/2019 | Srivastava et al. |
| 2019/0235743 | A1 | 8/2019 | Ono |
| 2019/0250812 | A1 | 8/2019 | Davydov et al. |
| 2019/0253619 | A1 | 8/2019 | Davydov et al. |
| 2019/0289201 | A1 | 9/2019 | Nishimura et al. |
| 2019/0318538 | A1 | 10/2019 | Li et al. |
| 2019/0339804 | A1 | 11/2019 | Gleeson et al. |
| 2019/0379821 | A1 | 12/2019 | Kobayashi et al. |
| 2019/0379837 | A1 | 12/2019 | Kim et al. |
| 2020/0045245 | A1 | 2/2020 | Van Os et al. |

(56) References Cited

U.S. PATENT DOCUMENTS

| | | | |
|---|---|---|---|
| 2020/0053288 A1 | 2/2020 | Kim et al. | |
| 2020/0059605 A1 | 2/2020 | Liu et al. | |
| 2020/0068121 A1 | 2/2020 | Wang | |
| 2020/0082599 A1 | 3/2020 | Manzari | |
| 2020/0104021 A1 | 4/2020 | Bylenok et al. | |
| 2020/0105003 A1 | 4/2020 | Stauber et al. | |
| 2020/0106952 A1 | 4/2020 | Missig et al. | |
| 2020/0106965 A1 | 4/2020 | Malia et al. | |
| 2020/0128191 A1 | 4/2020 | Sun et al. | |
| 2020/0150836 A1 | 5/2020 | Penha et al. | |
| 2020/0204725 A1 | 6/2020 | Li | |
| 2020/0221020 A1 | 7/2020 | Manzari et al. | |
| 2020/0236278 A1 | 7/2020 | Yeung et al. | |
| 2020/0242788 A1 | 7/2020 | Jacobs et al. | |
| 2020/0244879 A1 | 7/2020 | Hohjoh | |
| 2020/0285806 A1 | 9/2020 | Radakovitz et al. | |
| 2020/0336660 A1 | 10/2020 | Dong et al. | |
| 2020/0336674 A1 | 10/2020 | Bernstein et al. | |
| 2020/0342613 A1 | 10/2020 | Altuev et al. | |
| 2020/0358963 A1 | 11/2020 | Manzari et al. | |
| 2020/0382723 A1 | 12/2020 | Pena et al. | |
| 2020/0410763 A1 | 12/2020 | Hare et al. | |
| 2021/0006715 A1* | 1/2021 | Hao | G11B 27/031 |
| 2021/0012761 A1 | 1/2021 | Song | |
| 2021/0027510 A1* | 1/2021 | Avoyan | G06Q 10/40 |
| 2021/0051275 A1 | 2/2021 | Brown et al. | |
| 2021/0081093 A1 | 3/2021 | Yun et al. | |
| 2021/0081450 A1 | 3/2021 | Lopez | |
| 2021/0146838 A1 | 5/2021 | Goseberg et al. | |
| 2021/0160431 A1 | 5/2021 | Chen et al. | |
| 2021/0168300 A1 | 6/2021 | Wang et al. | |
| 2021/0195093 A1 | 6/2021 | Manzari et al. | |
| 2021/0201953 A1 | 7/2021 | Takahashi et al. | |
| 2021/0248371 A1 | 8/2021 | Carter et al. | |
| 2021/0266447 A1 | 8/2021 | Ding et al. | |
| 2021/0281746 A1 | 9/2021 | Fleizach et al. | |
| 2021/0286510 A1 | 9/2021 | Tyler et al. | |
| 2021/0304629 A1 | 9/2021 | Barron et al. | |
| 2021/0344845 A1 | 11/2021 | Li et al. | |
| 2021/0373750 A1 | 12/2021 | Manzari et al. | |
| 2021/0389850 A1 | 12/2021 | Charlton et al. | |
| 2021/0397338 A1 | 12/2021 | Davydov et al. | |
| 2022/0006946 A1 | 1/2022 | Missig et al. | |
| 2022/0050867 A1 | 2/2022 | Waller | |
| 2022/0053126 A1 | 2/2022 | Zhao et al. | |
| 2022/0053142 A1 | 2/2022 | Manzari et al. | |
| 2022/0057984 A1 | 2/2022 | Yang et al. | |
| 2022/0070380 A1 | 3/2022 | Bernstein et al. | |
| 2022/0070385 A1 | 3/2022 | Van Os et al. | |
| 2022/0086336 A1 | 3/2022 | Zhang | |
| 2022/0103758 A1 | 3/2022 | Manzari et al. | |
| 2022/0124241 A1 | 4/2022 | Manzari et al. | |
| 2022/0134226 A1 | 5/2022 | Takura et al. | |
| 2022/0207838 A1 | 6/2022 | Anvaripour et al. | |
| 2022/0210328 A1 | 6/2022 | Anvaripour et al. | |
| 2022/0210337 A1 | 6/2022 | Anvaripour et al. | |
| 2022/0210338 A1* | 6/2022 | Albi | H04N 23/667 |
| 2022/0217253 A1 | 7/2022 | Tian et al. | |
| 2022/0217275 A1 | 7/2022 | Fan | |
| 2022/0224828 A1 | 7/2022 | Lim et al. | |
| 2022/0256068 A1 | 8/2022 | Geiss et al. | |
| 2022/0262022 A1 | 8/2022 | Stauber et al. | |
| 2022/0264028 A1 | 8/2022 | Manzari et al. | |
| 2022/0276041 A1 | 9/2022 | Dryer et al. | |
| 2022/0279116 A1 | 9/2022 | Zhou | |
| 2022/0294992 A1 | 9/2022 | Manzari et al. | |
| 2022/0319100 A1 | 10/2022 | Manzari et al. | |
| 2022/0321797 A1 | 10/2022 | Bian et al. | |
| 2022/0353425 A1 | 11/2022 | Manzari et al. | |
| 2022/0382440 A1 | 12/2022 | Manzari et al. | |
| 2022/0382443 A1 | 12/2022 | Clarke et al. | |
| 2022/0394190 A1 | 12/2022 | Cui et al. | |
| 2022/0408020 A1 | 12/2022 | Zhang | |
| 2022/0417416 A1 | 12/2022 | Li et al. | |
| 2022/0417440 A1 | 12/2022 | Bernstein et al. | |
| 2023/0007186 A1 | 1/2023 | Li et al. | |
| 2023/0016178 A1 | 1/2023 | Ma et al. | |
| 2023/0018557 A1 | 1/2023 | Jiang | |
| 2023/0020616 A1 | 1/2023 | Manzari et al. | |
| 2023/0081664 A1 | 3/2023 | Li | |
| 2023/0087879 A1 | 3/2023 | An et al. | |
| 2023/0098395 A1 | 3/2023 | O'leary et al. | |
| 2023/0115929 A1 | 4/2023 | Bian et al. | |
| 2023/0116044 A1 | 4/2023 | Han | |
| 2023/0118567 A1 | 4/2023 | Manzari et al. | |
| 2023/0156144 A1 | 5/2023 | Cui | |
| 2023/0156316 A1 | 5/2023 | Kang et al. | |
| 2023/0164427 A1 | 5/2023 | Lu et al. | |
| 2023/0179856 A1 | 6/2023 | Shin | |
| 2023/0188831 A1 | 6/2023 | Hyun et al. | |
| 2023/0188861 A1 | 6/2023 | Bian | |
| 2023/0209179 A1 | 6/2023 | Manzari et al. | |
| 2023/0217097 A1 | 7/2023 | Wu et al. | |
| 2023/0217098 A1 | 7/2023 | Wang et al. | |
| 2023/0224575 A1 | 7/2023 | Ding et al. | |
| 2023/0252659 A1 | 8/2023 | Stauber et al. | |
| 2023/0254573 A1 | 8/2023 | Manzari et al. | |
| 2023/0262317 A1 | 8/2023 | O'leary et al. | |
| 2023/0308742 A1 | 9/2023 | Lin et al. | |
| 2023/0308743 A1 | 9/2023 | Ku et al. | |
| 2023/0308778 A1 | 9/2023 | Yang | |
| 2023/0319394 A1 | 10/2023 | Manzari et al. | |
| 2023/0325989 A1 | 10/2023 | Zhao | |
| 2023/0328379 A1 | 10/2023 | Bernstein et al. | |
| 2023/0328429 A1 | 10/2023 | Bian | |
| 2023/0333704 A1 | 10/2023 | Chen | |
| 2023/0336865 A1 | 10/2023 | Da Veiga et al. | |
| 2023/0345110 A1 | 10/2023 | Yi et al. | |
| 2023/0345113 A1 | 10/2023 | Liu | |
| 2023/0353862 A1 | 11/2023 | Yi et al. | |
| 2023/0359314 A1 | 11/2023 | Karunamuni | |
| 2023/0359315 A1 | 11/2023 | Karunamuni et al. | |
| 2023/0359316 A1 | 11/2023 | Karunamuni | |
| 2023/0367472 A1 | 11/2023 | Clarke et al. | |
| 2023/0370507 A1 | 11/2023 | Chang et al. | |
| 2023/0393705 A1 | 12/2023 | Krenn | |
| 2023/0418426 A1 | 12/2023 | Karunamuni | |
| 2024/0080543 A1 | 3/2024 | Manzari et al. | |
| 2024/0168626 A1 | 5/2024 | Davydov et al. | |
| 2024/0259669 A1 | 8/2024 | Missig et al. | |
| 2024/0259670 A1 | 8/2024 | Manzari et al. | |
| 2024/0284037 A1 | 8/2024 | Manzari et al. | |
| 2024/0422425 A1 | 12/2024 | Che et al. | |
| 2024/0430564 A1 | 12/2024 | Manzari et al. | |
| 2025/0022211 A1 | 1/2025 | Manzari et al. | |
| 2025/0024133 A1 | 1/2025 | Manzari et al. | |
| 2025/0080851 A1 | 3/2025 | Bernstein et al. | |
| 2025/0088734 A1 | 3/2025 | Manzari et al. | |
| 2025/0110574 A1 | 4/2025 | Alonso et al. | |
| 2025/0113094 A1 | 4/2025 | Alonso et al. | |
| 2025/0113095 A1 | 4/2025 | Alonso et al. | |
| 2025/0238127 A1 | 7/2025 | Alonso et al. | |
| 2025/0238128 A1 | 7/2025 | Manzari et al. | |
| 2025/0238129 A1 | 7/2025 | Moussette et al. | |
| 2025/0240516 A1 | 7/2025 | Zumbrunnen et al. | |

FOREIGN PATENT DOCUMENTS

| | | | |
|---|---|---|---|
| CA | 2729392 | C | 5/2017 |
| CA | 2965925 | A1 | 3/2018 |
| CN | 1437365 | A | 8/2003 |
| CN | 1499878 | A | 5/2004 |
| CN | 1705346 | A | 12/2005 |
| CN | 1901717 | A | 1/2007 |
| CN | 101243383 | A | 8/2008 |
| CN | 101282422 | A | 10/2008 |
| CN | 101300830 | A | 11/2008 |
| CN | 101310519 | A | 11/2008 |
| CN | 101355655 | A | 1/2009 |
| CN | 101364031 | A | 2/2009 |
| CN | 101427574 | A | 5/2009 |
| CN | 101533330 | A | 9/2009 |
| CN | 101576996 | A | 11/2009 |
| CN | 101681462 | A | 3/2010 |

(56) References Cited

FOREIGN PATENT DOCUMENTS

| | | | |
|---|---|---|---|
| CN | 101778220 | A | 7/2010 |
| CN | 101883213 | A | 11/2010 |
| CN | 101931691 | A | 12/2010 |
| CN | 102084327 | A | 6/2011 |
| CN | 102088554 | A | 6/2011 |
| CN | 102272700 | A | 12/2011 |
| CN | 102369723 | A | 3/2012 |
| CN | 102428655 | A | 4/2012 |
| CN | 102457661 | A | 5/2012 |
| CN | 102474560 | A | 5/2012 |
| CN | 202309894 | U | 7/2012 |
| CN | 202330968 | U | 7/2012 |
| CN | 102855079 | A | 1/2013 |
| CN | 103051837 | A | 4/2013 |
| CN | 103051841 | A | 4/2013 |
| CN | 103052961 | A | 4/2013 |
| CN | 103297719 | A | 9/2013 |
| CN | 103309602 | A | 9/2013 |
| CN | 103324329 | A | 9/2013 |
| CN | 103491298 | A | 1/2014 |
| CN | 103685925 | A | 3/2014 |
| CN | 103702039 | A | 4/2014 |
| CN | 103777742 | A | 5/2014 |
| CN | 103916582 | A | 7/2014 |
| CN | 103970472 | A | 8/2014 |
| CN | 104346080 | A | 2/2015 |
| CN | 104346099 | A | 2/2015 |
| CN | 104423946 | A | 3/2015 |
| CN | 104461288 | A | 3/2015 |
| CN | 104781773 | A | 7/2015 |
| CN | 104813322 | A | 7/2015 |
| CN | 104836947 | A | 8/2015 |
| CN | 105049726 | A | 11/2015 |
| CN | 105138259 | A | 12/2015 |
| CN | 105183442 | A | 12/2015 |
| CN | 105190511 | A | 12/2015 |
| CN | 105229571 | A | 1/2016 |
| CN | 105338256 | A | 2/2016 |
| CN | 105474163 | A | 4/2016 |
| CN | 105589637 | A | 5/2016 |
| CN | 105620393 | A | 6/2016 |
| CN | 105630290 | A | 6/2016 |
| CN | 105637855 | A | 6/2016 |
| CN | 105765967 | A | 7/2016 |
| CN | 105981372 | A | 9/2016 |
| CN | 105991915 | A | 10/2016 |
| CN | 106067947 | A | 11/2016 |
| CN | 106104448 | A | 11/2016 |
| CN | 106161956 | A | 11/2016 |
| CN | 106210184 | A | 12/2016 |
| CN | 106210550 | A | 12/2016 |
| CN | 106257909 | A | 12/2016 |
| CN | 106303280 | A | 1/2017 |
| CN | 106341611 | A | 1/2017 |
| CN | 106375662 | A | 2/2017 |
| CN | 106412214 | A | 2/2017 |
| CN | 106412412 | A | 2/2017 |
| CN | 106412445 | A | 2/2017 |
| CN | 106445219 | A | 2/2017 |
| CN | 106791357 | A | 5/2017 |
| CN | 106791377 | A | 5/2017 |
| CN | 106791420 | A | 5/2017 |
| CN | 106921829 | A | 7/2017 |
| CN | 107077274 | A | 8/2017 |
| CN | 107079141 | A | 8/2017 |
| CN | 107566721 | A | 1/2018 |
| CN | 107580693 | A | 1/2018 |
| CN | 107710135 | A | 2/2018 |
| CN | 107770448 | A | 3/2018 |
| CN | 107800945 | A | 3/2018 |
| CN | 107820011 | A | 3/2018 |
| CN | 107924113 | A | 4/2018 |
| CN | 108174096 | A | 6/2018 |
| CN | 108196761 | A | 6/2018 |
| CN | 108319629 | A | 7/2018 |
| CN | 108353126 | A | 7/2018 |
| CN | 108391053 | A | 8/2018 |
| CN | 108419019 | A | 8/2018 |
| CN | 108513070 | A | 9/2018 |
| CN | 108549522 | A | 9/2018 |
| CN | 108600610 | A | 9/2018 |
| CN | 108668083 | A | 10/2018 |
| CN | 108848308 | A | 11/2018 |
| CN | 108886569 | A | 11/2018 |
| CN | 109005366 | A | 12/2018 |
| CN | 109061985 | A | 12/2018 |
| CN | 109313530 | A | 2/2019 |
| CN | 109496425 | A | 3/2019 |
| CN | 105338244 | B | 4/2019 |
| CN | 109639970 | A | 4/2019 |
| CN | 109644217 | A | 4/2019 |
| CN | 109644229 | A | 4/2019 |
| CN | 109769396 | A | 5/2019 |
| CN | 110678832 | A | 1/2020 |
| CN | 111034164 | A | 4/2020 |
| CN | 111142724 | A | 5/2020 |
| DE | 202017002874 | U1 | 9/2017 |
| DK | 201670753 | A1 | 1/2018 |
| DK | 201670755 | A1 | 1/2018 |
| DK | 201670627 | A1 | 2/2018 |
| EP | 0257972 | A2 | 3/1988 |
| EP | 0651543 | A2 | 5/1995 |
| EP | 0651543 | A3 | 12/1997 |
| EP | 1278099 | A1 | 1/2003 |
| EP | 1953663 | A1 | 8/2008 |
| EP | 0651543 | B1 | 9/2008 |
| EP | 1981262 | A1 | 10/2008 |
| EP | 2194508 | A1 | 6/2010 |
| EP | 2430766 | A2 | 3/2012 |
| EP | 2454872 | A1 | 5/2012 |
| EP | 2482179 | A2 | 8/2012 |
| EP | 2487613 | A1 | 8/2012 |
| EP | 2487913 | A2 | 8/2012 |
| EP | 2430766 | A4 | 12/2012 |
| EP | 2579572 | A1 | 4/2013 |
| EP | 2627073 | A1 | 8/2013 |
| EP | 2640060 | A1 | 9/2013 |
| EP | 2682855 | A2 | 1/2014 |
| EP | 2830297 | A1 | 1/2015 |
| EP | 2843530 | A1 | 3/2015 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |
| EP | 3033837 | A1 | 6/2016 |
| EP | 3033837 | A4 | 3/2017 |
| EP | 3217341 | A1 | 9/2017 |
| EP | 2194508 | B1 | 12/2017 |
| EP | 3333544 | A1 | 6/2018 |
| EP | 3033837 | B1 | 10/2018 |
| EP | 3393119 | A1 | 10/2018 |
| EP | 3135028 | B1 | 1/2019 |
| EP | 2482179 | B1 | 3/2019 |
| EP | 3457680 | A1 | 3/2019 |
| EP | 3012732 | B1 | 5/2019 |
| EP | 3008575 | B1 | 7/2019 |
| EP | 3633975 | A1 | 4/2020 |
| EP | 3736676 | A1 | 11/2020 |
| EP | 2682855 | B1 | 2/2021 |
| EP | 3833002 | A1 | 6/2021 |
| EP | 3633975 | B1 | 5/2023 |
| EP | 4195658 | A1 | 6/2023 |
| GB | 2307383 | A | 5/1997 |
| GB | 2515797 | A | 1/2015 |
| GB | 2523670 | A | 9/2015 |
| JP | 2-179078 | A | 7/1990 |
| JP | 3-129573 | A | 6/1991 |
| JP | 6-215092 | A | 8/1994 |
| JP | 9-116792 | A | 5/1997 |
| JP | 9-179998 | A | 7/1997 |
| JP | 11-355617 | A | 12/1999 |
| JP | 2000-207549 | A | 7/2000 |

(56) References Cited

FOREIGN PATENT DOCUMENTS

| | | | |
|---|---|---|---|
| JP | 2000-244905 | A | 9/2000 |
| JP | 2001-101259 | A | 4/2001 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 1/2003 |
| JP | 2003-241293 | A | 8/2003 |
| JP | 2003-248549 | A | 9/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 2005-311699 | A | 11/2005 |
| JP | 2006-332809 | A | 12/2006 |
| JP | 3872041 | B2 | 1/2007 |
| JP | 2007-28211 | A | 2/2007 |
| JP | 2007-124279 | A | 5/2007 |
| JP | 2007-124398 | A | 5/2007 |
| JP | 2007-258869 | A | 10/2007 |
| JP | 2007-274017 | A | 10/2007 |
| JP | 2008-66978 | A | 3/2008 |
| JP | 2008-236534 | A | 10/2008 |
| JP | 2009-105919 | A | 5/2009 |
| JP | 2009-212899 | A | 9/2009 |
| JP | 2009-217816 | A | 9/2009 |
| JP | 2009-246468 | A | 10/2009 |
| JP | 2009-273023 | A | 11/2009 |
| JP | 2009-290782 | A | 12/2009 |
| JP | 2009-545256 | A | 12/2009 |
| JP | 2010-117444 | A | 5/2010 |
| JP | 2010-119147 | A | 5/2010 |
| JP | 2010-182023 | A | 8/2010 |
| JP | 2010-211166 | A | 9/2010 |
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2012-15978 | A | 1/2012 |
| JP | 2012-44564 | A | 3/2012 |
| JP | 2012-79302 | A | 4/2012 |
| JP | 2012-89973 | A | 5/2012 |
| JP | 2012-147379 | A | 8/2012 |
| JP | 2012-253748 | A | 12/2012 |
| JP | 2013-9274 | A | 1/2013 |
| JP | 2013-58861 | A | 3/2013 |
| JP | 2013-70303 | A | 4/2013 |
| JP | 2013-106289 | A | 5/2013 |
| JP | 2013-225844 | A | 10/2013 |
| JP | 2013-546238 | A | 12/2013 |
| JP | 2014-23083 | A | 2/2014 |
| JP | 2014-60501 | A | 4/2014 |
| JP | 2014-107836 | A | 6/2014 |
| JP | 2014-123069 | A | 7/2014 |
| JP | 2014-212415 | A | 11/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-50713 | A | 3/2015 |
| JP | 2015-76717 | A | 4/2015 |
| JP | 2015-91098 | A | 5/2015 |
| JP | 2015-104031 | A | 6/2015 |
| JP | 2015-111822 | A | 6/2015 |
| JP | 2015-520456 | A | 7/2015 |
| JP | 2015-149095 | A | 8/2015 |
| JP | 2015-534742 | A | 12/2015 |
| JP | 2016-39613 | A | 3/2016 |
| JP | 2016-66978 | A | 4/2016 |
| JP | 2016-72965 | A | 5/2016 |
| JP | 2016-129315 | A | 7/2016 |
| JP | 2016-175175 | A | 10/2016 |
| JP | 2017-34474 | A | 2/2017 |
| JP | 2017-521737 | A | 8/2017 |
| JP | 2018-10488 | A | 1/2018 |
| JP | 2018-107711 | A | 7/2018 |
| JP | 2018-117186 | A | 7/2018 |
| JP | 2018-121235 | A | 8/2018 |
| JP | 2019-507928 | A | 3/2019 |
| JP | 2019-62556 | A | 4/2019 |
| JP | 2019-203399 | A | 11/2019 |
| JP | 2020-42602 | A | 3/2020 |
| JP | 6982047 | B2 | 11/2021 |
| KR | 10-2009-0096833 | A | 9/2009 |
| KR | 10-2012-0004928 | A | 1/2012 |
| KR | 10-2012-0025872 | A | 3/2012 |
| KR | 10-2012-0048397 | A | 5/2012 |
| KR | 10-2012-0054406 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | B1 | 12/2013 |
| KR | 10-1343591 | B1 | 12/2013 |
| KR | 10-2014-0019631 | A | 2/2014 |
| KR | 10-2014-0049850 | A | 4/2014 |
| KR | 10-2014-0062801 | A | 5/2014 |
| KR | 10-2015-0014290 | A | 2/2015 |
| KR | 10-2016-0019145 | A | 2/2016 |
| KR | 10-2016-0020396 | A | 2/2016 |
| KR | 10-2016-0020791 | A | 2/2016 |
| KR | 10-2016-0075583 | A | 6/2016 |
| KR | 10-1674959 | B1 | 11/2016 |
| KR | 10-2017-0123125 | A | 11/2017 |
| KR | 10-1799223 | B1 | 11/2017 |
| KR | 10-2017-0135975 | A | 12/2017 |
| KR | 10-2018-0024761 | A | 3/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0116574 | A | 10/2018 |
| KR | 10-2018-0137610 | A | 12/2018 |
| KR | 10-1939253 | B1 | 1/2019 |
| KR | 10-2019-0034248 | A | 4/2019 |
| KR | 10-2020-0001601 | A | 1/2020 |
| KR | 10-2020-0130139 | A | 11/2020 |
| KR | 10-2020-0140378 | A | 12/2020 |
| WO | 99/39307 | A1 | 8/1999 |
| WO | 2005/043892 | A1 | 5/2005 |
| WO | 2007/126707 | A1 | 11/2007 |
| WO | 2008/014301 | A2 | 1/2008 |
| WO | 2008/020655 | A1 | 2/2008 |
| WO | 2008/025120 | A1 | 3/2008 |
| WO | 2009/078091 | A1 | 6/2009 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2013/136394 | A1 | 9/2013 |
| WO | 2013/169849 | A2 | 11/2013 |
| WO | 2013/173838 | A2 | 11/2013 |
| WO | 2014/066115 | A1 | 5/2014 |
| WO | 2014/109125 | A1 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/200734 | A1 | 12/2014 |
| WO | 2014/200798 | A1 | 12/2014 |
| WO | 2015/023044 | A1 | 2/2015 |
| WO | 2015/026864 | A1 | 2/2015 |
| WO | 2015/034969 | A2 | 3/2015 |
| WO | 2015/080744 | A1 | 6/2015 |
| WO | 2015/085042 | A1 | 6/2015 |
| WO | 2015/112868 | A1 | 7/2015 |

(56) References Cited

FOREIGN PATENT DOCUMENTS

| | | | |
|---|---|---|---|
| WO | 2014/200798 | A8 | 8/2015 |
| WO | 2015/183438 | A1 | 12/2015 |
| WO | 2015/187494 | A1 | 12/2015 |
| WO | 2015/190666 | A1 | 12/2015 |
| WO | 2016/024440 | A1 | 2/2016 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/072538 | A1 | 5/2016 |
| WO | 2016/073804 | A2 | 5/2016 |
| WO | 2016/073804 | A3 | 7/2016 |
| WO | 2016/144563 | A1 | 9/2016 |
| WO | 2016/172619 | A1 | 10/2016 |
| WO | 2016/204936 | A1 | 12/2016 |
| WO | 2016/208539 | A1 | 12/2016 |
| WO | 2017/051605 | A1 | 3/2017 |
| WO | 2017/058834 | A1 | 4/2017 |
| WO | 2017/187573 | A1 | 11/2017 |
| WO | 2017/218193 | A1 | 12/2017 |
| WO | 2018/012395 | A1 | 1/2018 |
| WO | 2018/048838 | A1 | 3/2018 |
| WO | 2018/057267 | A1 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2018/222244 | A1 | 12/2018 |
| WO | 2018/226264 | A1 | 12/2018 |
| WO | 2019/050562 | A1 | 3/2019 |
| WO | 2019/118933 | A1 | 6/2019 |
| WO | 2019/217148 | A1 | 11/2019 |
| WO | 2021/093793 | A1 | 5/2021 |
| WO | 2024/001513 | A1 | 1/2024 |
| WO | 2024/186519 | A1 | 9/2024 |

OTHER PUBLICATIONS

Non-Final Office Action received for U.S. Appl. No. 18/428,549, mailed on Sep. 24, 2025, 13 pages.

Intention to Grant received for European Patent Application No. 24182717.9, mailed on Jun. 6, 2025, 8 pages.

Office Action received for European Patent Application No. 24155758.6, mailed on May 28, 2025, 8 pages.

Office Action received for Korean Patent Application No. 10-2023-0125143, mailed on May 19, 2025, 9 pages (4 pages of English Translation and 5 pages of Official Copy).

Office Action received for Japanese Patent Application No. 2024-199034, mailed on Oct. 2, 2025, 7 pages (4 pages of English Translation and 3 pages of Official Copy).

Office Action received for Japanese Patent Application No. 2025-145953, mailed on Oct. 2, 2025, 3 pages (1 page of English Translation and 2 pages of Official Copy).

Corrected Notice of Allowance received for U.S. Appl. No. 18/423,234, mailed on Dec. 18, 2025, 3 pages.

Notice of Allowance received for Japanese Patent Application No. 2025-018293, mailed on Dec. 22, 2025, 3 pages (1 page of English Translation and 2 pages of Official Copy).

Notice of Hearing received for Indian Patent Application No. 202318031344, mailed on Dec. 12, 2025, 4 pages.

Office Action received for Indian Patent Application No. 202417043055, mailed on Dec. 17, 2025, 8 pages.

Corrected Notice of Allowance received for U.S. Appl. No. 18/892,251, mailed on Nov. 4, 2025, 2 pages.

Decision to Grant received for European Patent Application No. 20206196.6, mailed on Nov. 6, 2025, 4 pages.

Intention to Grant received for European Patent Application No. 23173036.7, mailed on Nov. 5, 2025, 9 pages.

Non-Final Office Action received for U.S. Appl. No. 18/892,230, mailed on Nov. 19, 2025, 25 pages.

Notice of Acceptance received for Australian Patent Application No. 2023285892, mailed on Oct. 27, 2025, 3 pages.

Office Action received for Chinese Patent Application No. 202010235395.9, mailed on Oct. 29, 2025, 2 pages (1 page of English Translation and 1 page of Official Copy).

Intention to Grant received for European Patent Application No. 20206196.6, mailed on Jul. 14, 2025, 10 pages.

Intention to Grant received for European Patent Application No. 23173036.7, mailed on Jun. 30, 2025, 9 pages.

International Search Report and Written Opinion received for PCT Patent Application No. PCT/US2025/010440, mailed on Jul. 4, 2025, 20 pages.

Invitation to Pay Additional Fees and Partial International Search Report received for PCT Patent Application No. PCT/US2025/010440, mailed on May 13, 2025, 15 pages.

Non-Final Office Action received for U.S. Appl. No. 18/892,251, mailed on Jul. 11, 2025, 28 pages.

Notice of Allowance received for Chinese Patent Application No. 202110356908.6, mailed on Jul. 1, 2025, 2 pages (1 page of English Translation and 1 page of Official Copy).

Office Action received for Australian Patent Application No. 2023285892, mailed on Jul. 21, 2025, 5 pages.

Office Action received for Chinese Patent Application No. 202010235395.9, mailed on May 31, 2025, 15 pages (7 pages of English Translation and 8 pages of Official Copy).

Corrected Notice of Allowance received for U.S. Appl. No. 17/992,789, mailed on Dec. 2, 2025, 2 pages.

Examiner-Initiated Interview Summary received for U.S. Appl. No. 18/428,549, mailed on Nov. 20, 2025, 2 pages.

International Search Report and Written Opinion received for PCT Patent Application No. PCT/US2025/030506, mailed on Oct. 17, 2025, 20 pages.

Invitation to Pay Additional Fees and Partial International Search Report received for PCT Patent Application No. PCT/US2025/030506, mailed on Aug. 26, 2025, 14 pages.

Notice of Allowance received for Chinese Patent Application No. 202010235395.9, mailed on Nov. 10, 2025, 2 pages (1 page of English Translation and 1 page of Official Copy).

Office Action received for Indian Patent Application No. 202218054596, mailed on Nov. 14, 2025, 6 pages.

Office Action received for Indian Patent Application No. 202218054599, mailed on Nov. 14, 2025, 8 pages.

Office Action received for Indian Patent Application No. 202318031342, mailed on Nov. 12, 2025, 6 pages.

Applicant-Initiated Interview Summary received for U.S. Appl. No. 18/423,234, mailed on Jan. 2, 2025, 2 pages.

Applicant-Initiated Interview Summary received for U.S. Appl. No. 18/137,369, mailed on Mar. 7, 2025, 2 pages.

Corrected Notice of Allowance received for U.S. Appl. No. 18/196,997, mailed on Nov. 15, 2024, 2 pages.

Corrected Notice of Allowance received for U.S. Appl. No. 18/207,293, mailed on Sep. 20, 2024, 2 pages.

Decision to Grant received for Japanese Patent Application No. 2024-001951, mailed on Jan. 7, 2025, 4 pages (2 pages of English Translation and 2 pages of Official Copy).

Decision to Grant received for Japanese Patent Application No. 2024-060293, mailed on Oct. 15, 2024, 3 pages (1 page of English Translation and 2 pages of Official Copy).

Egg Flakes, "Use Slow Shutter to capture night scenes and light trails", Online available at: https://www.jianshu.com/p/6c742da00d3c, Mar. 8, 2018, 5 pages (1 page of English Translation and 4 pages of Official Copy).

Extended European Search Report received for European Application No. 24182717.9, mailed on Jan. 31, 2025, 6 pages.

Extended European Search Report received for European Patent Application No. 24202041.0, mailed on Dec. 16, 2024, 9 pages.

Final Office Action received for U.S. Appl. No. 18/423,234, mailed on Dec. 19, 2024, 8 pages.

Intention to Grant received for European Patent Application No. 19769316.1, mailed on Dec. 17, 2024, 9 pages.

Intention to Grant received for European Patent Application No. 20206196.6, mailed on Mar. 10, 2025, 10 pages.

(56) References Cited

OTHER PUBLICATIONS

Manogajapathi et al., "Detecting Camera Based Traitor and Fraudulent Apps on Smartphone", World Conference on Futuristic Trends in Research and Innovation for Social Welfare (Startup Conclave), IEEE, Feb. 29, 2016, 5 pages.
Non-Final Office Action received for U.S. Appl. No. 18/137,369, mailed on Dec. 4, 2024, 13 pages.
Non-Final Office Action received for U.S. Appl. No. 18/423,234, mailed on Sep. 16, 2024, 9 pages.
Notice of Acceptance received for Australian Patent Application No. 2024213126, mailed on Oct. 30, 2024, 3 pages.
Notice of Allowance received for Chinese Patent Application No. 202210849316.2, mailed on Nov. 9, 2024, 4 pages (1 page of English Translation and 3 pages of Official Copy).
Notice of Allowance received for Korean Patent Application No. 10-2023-7002360, mailed on Feb. 5, 2025, 8 pages (2 pages of English Translation and 6 pages of Official Copy).
Notice of Allowance received for Korean Patent Application No. 10-2023-7016569, mailed on Sep. 10, 2024, 7 pages (2 pages of English Translation and 5 pages of Official Copy).
Notice of Allowance received for Korean Patent Application No. 10-2023-7041271, mailed on Nov. 24, 2024, 7 pages (2 pages of English Translation and 5 pages of Official Copy).
Notice of Allowance received for U.S. Appl. No. 17/846,962, mailed on Oct. 25, 2024, 2 pages.
Notice of Allowance received for U.S. Appl. No. 17/846,962, mailed on Sep. 30, 2024, 8 pages.
Notice of Allowance received for U.S. Appl. No. 18/196,997, mailed on Nov. 4, 2024, 11 pages.
Notice of Hearing received for Indian Patent Application No. 202118021941, mailed on Feb. 21, 2025, 2 pages.
Notice of Hearing received for Indian Patent Application No. 202215010325, mailed on Feb. 18, 2025, 3 pages.
Notice of Hearing received for Indian Patent Application No. 202215010325, mailed on Mar. 10, 2025, 3 pages.
Office Action received for Australian Patent Application No. 2023226764, mailed on Nov. 13, 2024, 3 pages.
Office Action received for Australian Patent Application No. 2023282230, mailed on Dec. 9, 2024, 2 pages.
Office Action received for Australian Patent Application No. 2023285892, mailed on Dec. 16, 2024, 5 pages.
Office Action received for Australian Patent Application No. 2024213126, mailed on Sep. 26, 2024, 3 pages.
Office Action received for Chinese Patent Application No. 201980012481.9, mailed on Dec. 24, 2024, 17 pages (9 pages of English Translation and 8 pages of Official Copy).
Office Action received for Chinese Patent Application No. 201980012481.9, mailed on Feb. 26, 2025, 14 pages (1 page of English Translation and 13 pages of Official Copy).
Office Action received for Chinese Patent Application No. 202010235395.9, mailed on Oct. 19, 2024, 12 pages (7 pages of English Translation and 5 pages of Official Copy).
Office Action received for Chinese Patent Application No. 202110356908.6, mailed on Jan. 25, 2025, 10 pages (5 pages of English Translation and 5 pages of Official Copy).
Office Action received for Chinese Patent Application No. 202210849316.2, mailed on Aug. 30, 2024, 7 pages (4 pages of English Translation and 3 pages of Official Copy).
Office Action received for European Patent Application No. 21157252.4, mailed on Feb. 24, 2025, 6 pages.
Office Action received for European Patent Application No. 23173036.7, mailed on Nov. 8, 2024, 5 pages.
Office Action received for Indian Patent Application No. 202218054598, mailed on Oct. 3, 2024, 5 pages.
Office Action received for Japanese Patent Application No. 2023-158354, mailed on Dec. 2, 2024, 6 pages (3 pages of English Translation and 3 pages of Official Copy).
Office Action received for Japanese Patent Application No. 2024-033171, mailed on Feb. 25, 2025, 12 pages (6 pages of English Translation and 6 pages of Official Copy).
Office Action received for Japanese Patent Application No. 2024-532566, mailed on Mar. 7, 2025, 14 pages (7 pages of English Translation and 7 pages of Official Copy).
Office Action received for Korean Patent Application No. 10-2023-0125143, mailed on Sep. 24, 2024, 9 pages (4 pages of English Translation and 5 pages of Official Copy).
Supplemental Notice of Allowance received for U.S. Appl. No. 17/546,968, mailed on Sep. 25, 2024, 2 pages.
Wanjale et al., "AAPS: Android Based System for Camera Based Attacks", International Journal of Emerging Technologies and Engineering (IJETE), vol. 1 Issue 10, Nov. 2014, pp. 246-247.
Wu et al., "Analyzing Mobile Phone Vulnerabilities Caused by Camera", IEEE Global Communications Conference, Dec. 8, 2014, 5 pages.
Shinobu, Unakami, "Camera—Intention of Continuous Shooting Will be Video Photographing by Application!?—iPhone which cannot now be heard—why—", available online at: https://news.mynavi.jp/article/20201119 - iphone_why/, Nov. 19, 2020, 3 pages (Official Copy only) {See Communication under Rule 37 CFR § 1.98(a) (3)}.
Shinobu, Unakami, "The reason why the "outside of the frame" of the camera application is turned off? Reason for the iphone which is not to be heard again", available online at: https://news.mynavi.jp/article/20210216] iphone_why/>, Feb. 16, 2021, 3 pages (Official Copy only) {See Communication under Rule 37 CFR § 1.98(a) (3)}.
Slice42, "iPhone 11 QuickTake", available online at: https://www.youtube.com/watch?v=hMwTfD44nUg, Sep. 30, 2019, 2 pages (Official Copy only) {See Communication under Rule 37 CFR § 1.98(a) (3)}.
Ygigazine, "Basic camera operation method of iPhone 11 Pro", available online at: https://www.youtube.com/shorts/Jr7a6F7hUiA, Sep. 21, 2019, 2 pages (Official Copy only) {See Communication under Rule 37 CFR § 1.98(a) (3)}.
Applicant-Initiated Interview Summary received for U.S. Appl. No. 18/628,021, mailed on Aug. 5, 2024, 4 pages.
Corrected Notice of Allowance received for U.S. Appl. No. 18/196,997, mailed on Aug. 19, 2024, 2 pages.
Corrected Notice of Allowance received for U.S. Appl. No. 18/196,997, mailed on Jun. 13, 2024, 2 pages.
Corrected Notice of Allowance received for U.S. Appl. No. 18/207,293, mailed on Sep. 12, 2024, 2 pages.
Corrected Notice of Allowance received for U.S. Appl. No. 18/628,021, mailed on Jun. 24, 2024, 2 pages.
Corrected Notice of Allowance received for U.S. Appl. No. 18/628,021, mailed on Sep. 12, 2024, 2 pages.
Decision to Grant received for European Patent Application No. 21202358.4, mailed on Aug. 29, 2024, 2 pages.
International Preliminary Report on Patentability received for PCT Patent Application No. PCT/US2022/050916, mailed on Jun. 13, 2024, 18 pages.
Notice of Allowance received for U.S. Appl. No. 17/546,968, mailed on Sep. 13, 2024, 25 pages.
Notice of Allowance received for U.S. Appl. No. 17/846,962, mailed on Aug. 1, 2024, 7 pages.
Notice of Allowance received for U.S. Appl. No. 18/196,997, mailed on Jul. 15, 2024, 11 pages.
Notice of Allowance received for U.S. Appl. No. 18/207,293, mailed on Aug. 7, 2024, 12 pages.
Notice of Allowance received for U.S. Appl. No. 18/628,021, mailed on Aug. 28, 2024, 9 pages.
Notice of Allowance received for U.S. Appl. No. 18/628,021, mailed on Jun. 5, 2024, 9 pages.
Office Action received for Indian Patent Application No. 202218016788, mailed on Sep. 4, 2024, 5 pages.
Office Action received for Japanese Patent Application No. 2022-199433, mailed on Jul. 2, 2024, 6 pages (3 pages of English Translation and 3 pages of Official Copy).
Office Action received for Japanese Patent Application No. 2024-060293, mailed on Jul. 29, 2024, 6 pages (3 pages of English Translation and 3 pages of Official Copy).
Office Action received for Korean Patent Application No. 10-2023-7002360, mailed on Jun. 5, 2024, 6 pages (2 pages of English Translation and 4 pages of Official Copy).

(56) References Cited

OTHER PUBLICATIONS

Supplemental Notice of Allowance received for U.S. Appl. No. 17/546,968, mailed on Jun. 14, 2024, 2 pages.
Extended European Search Report received for European Patent Application No. 25172958.8, mailed on Jul. 23, 2025, 11 pages.
"Focos-Bokeh Camera for Dual Lens", Available Online at: http://web.archive.org/web/20180908220222/http://focos.me/, Sep. 8, 2018, 7 pages.
Notice of Allowance received for Japanese Patent Application No. 2024-033171, mailed on Jul. 18, 2025, 4 pages (1 page of English Translation and 3 pages of Official Copy).
Applicant-Initiated Interview Summary received for U.S. Appl. No. 18/781,667, mailed on Sep. 15, 2025, 3 pages.
Applicant-Initiated Interview Summary received for U.S. Appl. No. 18/892,251, mailed on Sep. 17, 2025, 4 pages.
Decision to Grant received for Japanese Patent Application No. 2023-158354, mailed on Sep. 8, 2025, 3 pages (1 page of English Translation and 2 pages of Official Copy).
Notice of Allowance received for U.S. Appl. No. 17/992,789, mailed on Sep. 18, 2025, 12 pages.
Office Action received for Chinese Patent Application No. 202110766668.7, mailed on Aug. 27, 2025, 17 pages (10 pages of English Translation and 7 pages of Official Copy).
[Iphone] How to Turn on/off (Enable/Disable) "Show Outside the Frame" on the Camera, Func!!, Available Online at: https://func.jp/iphone-camera-frame-exterior/, Nov. 5, 2024, 8 pages.
International Search Report and Written Opinion received for PCT Patent Application No. PCT/US2024/044796, mailed on Nov. 28, 2024, 17 pages.
Non-Final Office Action received for U.S. Appl. No. 17/992,789, mailed on Mar. 20, 2025, 17 pages.
Notice of Allowance received for U.S. Appl. No. 18/137,369, mailed on Apr. 15, 2025, 11 pages.
Office Action received for Australian Patent Application No. 2023285892, mailed on Apr. 11, 2025, 4 pages.
Office Action received for Chinese Patent Application No. 202010235395.9, mailed on Mar. 1, 2025, 16 pages (9 pages of English Translation and 7 pages of Official Copy).
Office Action received for European Patent Application No. 21773186.8, mailed on Mar. 20, 2025, 7 pages.
Office Action received for Indian Patent Application No. 202118009190, mailed on Mar. 24, 2025, 7 pages.
Office Action received for Indian Patent Application No. 202318031344, mailed on Apr. 1, 2025, 7 pages.
Shinobu Umi, "What Happens if You Turn off "Show Outside Frame" in the Camera App?—Why Can't I Ask About the Iphone Anymore?", available online at: https://news.mynavi.jp/article/20210216 ]iphone_why/>, Feb. 16, 2021, 5 pages (1 page of English Translation and 4 pages of Official Copy).
Non-Final Office Action received for U.S. Appl. No. 18/781,667, mailed on Jul. 1, 2025, 18 pages.
Notice of Allowance received for Japanese Patent Application No. 2024-532566, mailed on Jun. 13, 2025, 5 pages (1 page of English Translation and 4 pages of Official Copy).
Office Action received for European Patent Application No. 20728854.9, mailed on Jun. 20, 2025, 6 pages.
Applicant-Initiated Interview Summary received for U.S. Appl. No. 18/423,234, mailed on May 9, 2025, 2 pages.
Corrected Notice of Allowance received for U.S. Appl. No. 18/137,369, mailed on May 12, 2025, 2 pages.
Advisory Action received for U.S. Appl. No. 16/144,629, mailed on Dec. 13, 2019, 9 pages.
Advisory Action received for U.S. Appl. No. 16/144,629, mailed on Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Applicant-Initiated Interview Summary received for U.S. Appl. No. 17/190,879, mailed on Oct. 26, 2021, 3 pages.
Applicant-Initiated Interview Summary received for U.S. Appl. No. 16/271,583 mailed on Mar. 2, 2020, 3 pages.
Applicant-Initiated Interview Summary received for U.S. Appl. No. 16/271,583, mailed on Jul. 14, 2020, 4 pages.
Applicant-Initiated Interview Summary received for U.S. Appl. No. 15/995,040, mailed on Aug. 2, 2022, 5 pages.
Applicant-Initiated Interview Summary received for U.S. Appl. No. 15/995,040, mailed on Dec. 23, 2019, 5 pages.
Applicant-Initiated Interview Summary received for U.S. Appl. No. 15/995,040, mailed on Jul. 27, 2020, 4 pages.
Applicant-Initiated Interview Summary received for U.S. Appl. No. 15/995,040, mailed on Nov. 18, 2022, 5 pages.
Applicant-Initiated Interview Summary received for U.S. Appl. No. 15/995,040, mailed on Nov. 24, 2020, 4 pages.
Applicant-Initiated Interview Summary received for U.S. Appl. No. 16/144,629, mailed on Jul. 2, 2020, 5 pages.
Applicant-Initiated Interview Summary received for U.S. Appl. No. 16/144,629, mailed on Nov. 23, 2020, 3 pages.
Applicant-Initiated Interview Summary received for U.S. Appl. No. 16/528,257, mailed on Nov. 18, 2021, 2 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 17/027,317, mailed on Dec. 21, 2020, 4 pages.
Applicant-Initiated Interview Summary received for U.S. Appl. No. 17/041,412, mailed on Jan. 31, 2023, 7 pages.
Applicant-Initiated Interview Summary received for U.S. Appl. No. 17/220,596, mailed on Aug. 18, 2021, 3 pages.
Applicant-Initiated Interview Summary received for U.S. Appl. No. 17/466,824, mailed on Apr. 20, 2023, 2 pages.
Applicant-Initiated Interview Summary received for U.S. Appl. No. 17/466,824, mailed on Oct. 5, 2022, 2 pages.
Applicant-Initiated Interview Summary received for U.S. Appl. No. 17/466,824, mailed on Sep. 28, 2023, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/546,968, mailed on Apr. 26, 2024, 2 pages.
Applicant-Initiated Interview Summary received for U.S. Appl. No. 17/546,968, mailed on Jan. 16, 2024, 3 pages.
Applicant-Initiated Interview Summary received for U.S. Appl. No. 18/207,293, mailed on Apr. 19, 2024, 3 pages.
AstroVideo, "AstroVideo enables you to use a low-cost,low-light video camera to capture astronomical images.", Available online at: https://www.coaa.co.uk/astrovideo.htm, Retrieved on: Nov. 18, 2019, 5 pages.
Board Decision received for Chinese Patent Application No. 201811446867.4, mailed on Apr. 26, 2023, 21 pages (5 pages of English Translation and 16 pages of Official copy).
Board Opinion received for Chinese Patent Application No. 201811446867.4, mailed on Feb. 14, 2023, 11 pages (4 pages of English Translation and 7 pages of Official Copy).
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication Regarding Oral Proceedings received for European Patent Application No. 21163791.3, mailed on Nov. 7, 2023, 4 pages.
Certificate of Examination received for Australian Patent Application No. 2017100683, mailed on Jan. 16, 2018, 2 pages.
Certificate of Examination received for Australian Patent Application No. 2020100720, mailed on Nov. 11, 2020, 2 pages.

(56) References Cited

OTHER PUBLICATIONS

Certificate of Examination received for Australian Patent Application No. 2020104220, mailed on Apr. 1, 2021, 2 pages.
Certificate of Examination received for Australian Patent Application No. 2021103004, mailed on Sep. 13, 2021, 2 pages.
Certificate of Examination received for Australian Patent Application No. 2021107587, mailed on Apr. 29, 2022, 2 pages.
Clover, Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Communication for Board of Appeal received for European Patent Application No. 17184710.6, mailed on Feb. 29, 2024, 13 pages.
Computerhilfen, "Whatsapp: Voice Message without Holding the Button", Retrieved from Internet: <https://www.youtube.com/watch?v=ofFCKvs5URw>, Jan. 14, 2018, 9 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages.
Corrected Notice of Allowance received for U.S. Appl. No. 16/143,396, mailed on Jan. 30, 2020, 2 pages.
Corrected Notice of Allowance received for U.S. Appl. No. 16/144,629, mailed on Apr. 21, 2022, 5 pages.
Corrected Notice of Allowance received for U.S. Appl. No. 16/144,629, mailed on Aug. 24, 2022, 6 pages.
Corrected Notice of Allowance received for U.S. Appl. No. 16/144,629, mailed on Jun. 23, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/528,257, mailed on Feb. 3, 2022, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 16/840,719, mailed on Jul. 8, 2021, 8 pages.
Corrected Notice of Allowance received for U.S. Appl. No. 16/840,719, mailed on May 14, 2021, 4 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/041,412, mailed on Apr. 12, 2023, 2 pages.
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/041,412, mailed on May 17, 2023, 2 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Corrected Notice of Allowance received for U.S. Appl. No. 17/409,598, mailed on Jul. 7, 2022, 2 pages.
Corrected Notice of Allowance received for U.S. Appl. No. 17/409,598, mailed on Jul. 18, 2022, 3 pages.
Corrected Notice of Allowance received for U.S. Appl. No. 17/409,598, mailed on Sep. 30, 2022, 2 pages.
Corrected Notice of Allowance received for U.S. Appl. No. 17/466,824, mailed on Feb. 6, 2024, 2 pages.
Corrected Notice of Allowance received for U.S. Appl. No. 17/479,897, mailed on Aug. 17, 2023, 2 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.

(56) References Cited

OTHER PUBLICATIONS

Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 17/740,032, mailed on Feb. 15, 2023, 6 pages.
Corrected Notice of Allowance received for U.S. Appl. No. 17/740,032, mailed on Nov. 3, 2022, 6 pages.
Corrected Notice of Allowance received for U.S. Appl. No. 18/121,458, mailed on Jan. 18, 2024, 2 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on May 23, 2024, 2 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision on Appeal received for U.S. Appl. No. 15/995,040, mailed on Dec. 29, 2021, 14 pages.
Decision on Appeal received for U.S. Appl. No. 16/144,629, mailed on Jan. 18, 2022, 8 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15712218.5, mailed on Jun. 7, 2018, 2 pages.
Decision to Grant received for European Patent Application No. 16784025.5, mailed on Nov. 11, 2021, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for European Patent Application No. 20168009.7, mailed on Jun. 22, 2023, 4 pages.
Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for European Patent Application No. 21733324.4, mailed on Jun. 2, 2023, 3 pages.
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).
Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Grant received for Japanese Patent Application No. 2021-187533, mailed on Sep. 28, 2023, 3 pages (1 page of English Translation and 2 pages of Official Copy).
Decision to Grant received for Japanese Patent Application No. 2022-130725, mailed on Dec. 11, 2023, 2 pages (1 page of English Translation and 1 page of Official Copy).
Decision to Grant received for Japanese Patent Application No. 2022-145387, mailed on Mar. 4, 2024, 3 pages (1 page of English Translation and 2 pages of Official Copy).
Decision to Refuse received for European Patent Application No. 17184710.6, mailed on Jun. 16, 2020, 9 pages.
Decision to Refuse received for European Patent Application No. 21163791.3, mailed on Dec. 4, 2023, 16 pages.
Decision to Refuse received for Japanese Patent Application No. 2018-225131, mailed on Jul. 8, 2019, 6 pages (4 pages of English Translation and 2 pages of Official Copy).
Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
Demetriou, Soteris, “Analyzing & Designing the Security of Shared Resources on Smartphone Operating Systems”, Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Drunk Beauty Flower Digital Technology, “iPhone Xs Max Camera Tips, Tricks, Features and Complete Tutorial”, Available online at: https://www.ixigua.com/6606874981844386308?wid_try=1, Oct. 2, 2018, 2 pages (Official Copy Only) {See Communication under Rule 37 CFR § 1.98(a) (3)}.
Dutta, Tushar S., “Warning! iOS Apps With Camera Access Permission Can Spy on You”, Online available at: https://web.archive.org/web/20180219092123/https://techviral.net/ios-apps-camera-can-spy/, Feb. 19, 2018, 3 pages.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.

(56) References Cited

OTHER PUBLICATIONS

Examiner Initiated-Interview Summary received for U.S. Appl. No. 16/528,941, mailed on Dec. 1, 2020, 2 pages.
Examiner-Initiated Interview Summary received for U.S. Appl. No. 17/220,596, mailed on Oct. 7, 2021, 2 pages.
Examiner's Answer to Appeal Brief received for U.S. Appl. No. 15/995,040, mailed on Jun. 23, 2021, 31 pages.
Examiner's Answer to Appeal Brief received for U.S. Appl. No. 16/144,629, mailed on Jul. 21, 2021, 21 pages.
Extended European Search Report received for European Patent Application No. 16784025.5, mailed on Apr. 16, 2018, 11 pages.
Extended European Search Report received for European Patent Application No. 20168009.7, mailed on Sep. 11, 2020, 12 pages.
Extended European Search Report received for European Patent Application No. 21202358.4, mailed on Dec. 6, 2021, 8 pages.
Extended European Search Report received for European Patent Application No. 23173036.7, mailed on Jul. 24, 2023, 13 pages.
Extended European Search Report received for European Patent Application No. 24155758.6, mailed on Mar. 20, 2024, 11 pages.
Extended Search Report received for European Patent Application 17809168.2, mailed on Jun. 28, 2018, 9 pages.
Feng et al., "3D Direct Human-Computer Interface Paradigm Based on Free Hand Tracking", Chinese Journal of Computers, vol. 37, No. 6, Jun. 30, 2014, 15 pages (Official copy only) {See Communication under Rule 37 CFR § 1.98(a) (3)}.
Final Office Action received for U.S. Appl. No. 15/268,115, mailed on Oct. 11, 2017, 48 pages.
Final Office Action received for U.S. Appl. No. 15/995,040, mailed on Oct. 6, 2022, 27 pages.
Final Office Action received for U.S. Appl. No. 15/995,040, mailed on Oct. 17, 2019, 20 pages.
Final Office Action received for U.S. Appl. No. 15/995,040, mailed on Sep. 2, 2020, 21 pages.
Final Office Action received for U.S. Appl. No. 16/143,396, mailed on Jun. 20, 2019, 14 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/271,583, mailed on Aug. 26, 2020, 18 pages.
Final Office Action received for U.S. Appl. No. 16/528,941, mailed on Jul. 13, 2020, 15 pages.
Final Office Action received for U.S. Appl. No. 17/466,824, mailed on Nov. 25, 2022, 35 pages.
Final Office Action received for U.S. Appl. No. 17/479,897, mailed on Jan. 10, 2023, 15 pages.
Final Office Action received for U.S. Appl. No. 17/546,968, mailed on Mar. 19, 2024, 43 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson, Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review : Camera", Available Online at: <https://web.archive.org/web/20180823142417/https://www.gsmarena.com/honor_10-review-1771p5.php>, Aug. 23, 2018, 11 pages.
Hall, Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRkTg>, Jun. 19, 2018, 3 pages.
Hearing Notice received for Indian Patent Application No. 201817024430, mailed on Apr. 6, 2023, 2 pages.
Hernandez, Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for Danish Patent Application No. PA202070611, mailed on May 5, 2021, 2 pages.
Intention to Grant received for European Patent Application No. 15712218.5, mailed on Jan. 24, 2018, 7 pages.
Intention to Grant received for European Patent Application No. 16784025.5, mailed on Jul. 15, 2021, 8 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
Intention to Grant received for European Patent Application No. 20168009.7, mailed on Feb. 28, 2023, 10 pages.
Intention to Grant received for European Patent Application No. 20168009.7, mailed on May 17, 2022, 9 pages.
Intention to Grant received for European Patent Application No. 20168009.7, mailed on Oct. 31, 2022, 9 pages.
Intention to Grant received for European Patent Application No. 20206196.6, mailed on Nov. 10, 2023, 10 pages.
Intention to Grant received for European Patent Application No. 20206197.4, mailed on Dec. 15, 2022, 10 pages.
Intention to Grant received for European Patent Application No. 20206197.4, mailed on May 25, 2023, 9 pages.
Intention to Grant received for European Patent Application No. 20210373.5, mailed on Jan. 10, 2023, 12 pages.
Intention to Grant received for European Patent Application No. 21202358.4, mailed on Apr. 15, 2024, 9 pages.
Intention to Grant received for European Patent Application No. 21733324.4, mailed on Jan. 9, 2023, 9 pages.

(56) References Cited

OTHER PUBLICATIONS

Intention to Grant received for European Patent Application No. 21733324.4, mailed on Sep. 13, 2022, 7 pages.
International Preliminary Report on Patentability and Written Opinion received for PCT Application No. PCT/US2016/029030, mailed on Nov. 2, 2017, 35 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2017/035321, mailed on Dec. 27, 2018, 11 pages.
International Preliminary Report on Patentability received for PCT Patent Application No. PCT/US2019/017363, mailed on Aug. 20, 2020, 9 pages.
International Preliminary Report on Patentability received for PCT Patent Application No. PCT/US2019/049101, mailed on Mar. 25, 2021, 17 pages.
International Preliminary Report on Patentability received for PCT Patent Application No. PCT/US2020/031643, mailed on Nov. 18, 2021, 27 pages.
International Preliminary Report on Patentability received for PCT Patent Application No. PCT/US2021/034304, mailed on Dec. 15, 2022, 19 pages.
International Preliminary Report on Patentability received for PCT Patent Application No. PCT/US2021/046877, mailed on Apr. 6, 2023, 12 pages.
International Search Report & Written Opinion received for PCT Patent Application No. PCT/US2016/029030, mailed on Aug. 5, 2016, 37 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2019/017363, mailed on Aug. 12, 2019, 12 pages.
International Search Report and Written Opinion received for PCT Patent Application No. PCT/US2019/049101, mailed on Dec. 16, 2019, 26 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2021/034304, mailed on Oct. 11, 2021, 24 pages.
International Search Report and Written Opinion received for PCT Patent Application No. PCT/US2021/046877, mailed on Mar. 1, 2022, 17 pages.
International Search Report and Written Opinion received for PCT Patent Application No. PCT/US2022/050916, mailed on May 15, 2023, 23 pages.
Invitation to Pay Addition Fees received for PCT Patent Application No. PCT/US2017/035321, mailed on Aug. 17, 2017, 3 pages.
Invitation to Pay Additional Fee received for PCT Patent Application No. PCT/US2022/050916, mailed on Mar. 23, 2023, 16 pages.
Invitation to Pay Additional Fees and Partial International Search Report received for PCT Patent Application No. PCT/US2019/049101, mailed on Oct. 24, 2019, 17 pages.
Invitation to Pay Additional Fees received for PCT Patent Application No. PCT/US2019/017363, mailed on Jun. 17, 2019, 8 pages.
Invitation to Pay Additional Fees received for PCT Patent Application No. PCT/US2020/031643, mailed on Sep. 9, 2020, 30 pages.
Invitation to Pay Additional Fees received for PCT Patent Application No. PCT/US2021/034304, mailed on Aug. 20, 2021, 16 pages.
Invitation to Pay Additional Fees received for PCT Patent Application No. PCT/US2021/046877, mailed on Jan. 5, 2022, 10 pages.
Invitation to Pay Search Fees received for European Patent Application No. 20728854.9, mailed on Feb. 23, 2024, 3 pages.
"IPhone User Guide for iOS 4.2 and 4.3 Software", Available at https://manuals.info.apple.com/MANUALS/1000/MA1539/en_US/iPhone_iOS4_User_Guide.pdf, 2011, 274 pages.
Junxiang, Zhang, "Playing My New iPad", The Publishing House of Ordinance Industry, Sep. 30, 2012, pp. 217-219 (Official Copy only) {See Communication under Rule 37 CFR § 1.98(a) (3)}.
King, Julie A., "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Minutes of the Oral Proceedings received for European Patent Application No. 17184710.6, mailed on May 22, 2024, 4 pages.
Minutes of the Oral Proceedings received for European Patent Application No. 21163791.3, mailed on Dec. 1, 2023, 6 pages.
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, mailed on Jul. 30, 2021, 12 pages.
Non-Final Office Action received for U.S. Appl. No. 14/869,807, mailed on Dec. 2, 2016, 23 pages.
Non-Final Office Action received for U.S. Appl. No. 15/136,323, mailed on Apr. 6, 2017, 27 pages.
Non-Final Office Action received for U.S. Appl. No. 15/268,115, mailed on Apr. 13, 2017, 44 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/863,369, mailed on Apr. 4, 2018, 15 pages.
Non-Final Office Action received for U.S. Appl. No. 15/995,040, mailed on Apr. 8, 2022, 21 pages.
Non-Final Office Action received for U.S. Appl. No. 15/995,040, mailed on Apr. 15, 2020, 19 pages.
Non-Final Office Action received for U.S. Appl. No. 15/995,040, mailed on Jun. 7, 2023, 26 pages.
Non-Final Office Action received for U.S. Appl. No. 15/995,040, mailed on May 16, 2019, 24 pages.
Non-Final Office Action received for U.S. Appl. No. 16/143,396, mailed on Jan. 7, 2019, 13 pages.
Non-Final Office Action received for U.S. Appl. No. 16/144,629, mailed on Mar. 13, 2020, 24 pages.
Non-Final Office Action received for U.S. Appl. No. 16/144,629, mailed on Mar. 29, 2019, 18 pages.
Non-Final Office Action received for U.S. Appl. No. 16/271,583, mailed on May 6, 2020, 24 pages.
Non-Final Office Action received for U.S. Appl. No. 16/271,583, mailed on Nov. 29, 2019, 18 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 16/825,879, mailed on May 5, 2021, 12 pages.
Non-Final Office Action received for U.S. Appl. No. 17/027,317, mailed on Nov. 17, 2020, 17 pages.

(56) References Cited

OTHER PUBLICATIONS

Non-Final Office Action received for U.S. Appl. No. 17/041,412, mailed on Dec. 5, 2022, 13 pages.
Non-Final Office Action received for U.S. Appl. No. 17/190,879, mailed on Oct. 13, 2021, 10 pages.
Non-Final Office Action received for U.S. Appl. No. 17/220,596, mailed on Jun. 10, 2021, 31 pages.
Non-Final Office Action received for U.S. Appl. No. 17/466,824, mailed on May 11, 2022, 30 pages.
Non-Final Office Action received for U.S. Appl. No. 17/466,824, mailed on May 25, 2023, 33 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/510,168, mailed on Dec. 6, 2022, 11 pages.
Non-Final Office Action received for U.S. Appl. No. 17/546,968, mailed on Nov. 24, 2023, 34 pages.
Non-Final Office Action received for U.S. Appl. No. 17/846,962, mailed on May 9, 2024, 19 pages.
Non-Final Office Action received for U.S. Appl. No. 17/940,672, mailed on Mar. 16, 2023, 15 pages.
Non-Final Office Action received for U.S. Appl. No. 18/114,880, mailed on Aug. 29, 2023, 10 pages.
Non-Final Office Action received for U.S. Appl. No. 18/196,997, mailed on Nov. 20, 2023, 12 pages.
Non-Final Office Action received for U.S. Appl. No. 18/207,293, mailed on Feb. 29, 2024, 11 pages.
Notice of Acceptance received for Australian Patent Application No. 2016252993, mailed on Dec. 19, 2017, 3 pages.
Notice of Acceptance received for Australian Patent Application No. 2017286130, mailed on Apr. 26, 2019, 3 pages.
Notice of Acceptance received for Australian Patent Application No. 2019213341, mailed on Aug. 25, 2020, 3 pages.
Notice of Acceptance received for Australian Patent Application No. 2019218241, mailed on Mar. 9, 2022, 3 pages.
Notice of Acceptance received for Australian Patent Application No. 2019338180, mailed on Jun. 27, 2022, 3 pages.
Notice of Acceptance received for Australian Patent Application No. 2020239717, mailed on Jun. 1, 2022, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15, 2021, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.
Notice of Acceptance received for Australian Patent Application No. 2021290292, mailed on Jan. 23, 2023, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Acceptance received for Australian Patent Application No. 2022204465, mailed on May 26, 2023, 3 pages.
Notice of Acceptance received for Australian Patent Application No. 2022221466, mailed on Aug. 31, 2023, 3 pages.
Notice of Acceptance received for Australian Patent Application No. 2022228121, mailed on Dec. 13, 2023, 3 pages.
Notice of Acceptance received for Australian Patent Application No. 2022228191, mailed on Oct. 10, 2023, 3 pages.
Notice of Acceptance received for Australian Patent Application No. 2023200607, mailed on May 9, 2024, 3 pages.
Notice of Allowance received for Brazilian Patent Application No. 112018074765-3, mailed on Oct. 8, 2019, 2 pages (1 page of English Translation and 1 page of Official Copy).
Notice of Allowance received for Brazilian Patent Application No. BR122018076550-0, mailed on Jan. 3, 2022, 3 pages (1 page of English Translation and 2 pages of Official Copy).
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201680023520.1, mailed on Jun. 28, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201780002533.5, mailed on Apr. 14, 2020, 2 pages (1 page of English Translation and 1 page of Official Copy).
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Chinese Patent Application No. 201811512767.7, mailed on Jul. 27, 2020, 4 pages (1 page of English Translation and 3 pages of Official Copy).
Notice of Allowance received for Chinese Patent Application No. 201910864074.2, mailed on Mar. 10, 2021, 2 pages (1 page of English Translation and 1 page of Official Copy).
Notice of Allowance received for Chinese Patent Application No. 202010287950.2, mailed on Mar. 22, 2022, 7 pages (3 pages of English Translation and 4 pages of Official Copy).
Notice of Allowance received for Chinese Patent Application No. 202010287953.6, mailed on Mar. 18, 2021, 7 pages (3 pages of English Translation and 4 pages of Official Copy).
Notice of Allowance received for Chinese Patent Application No. 202010287958.9, mailed on Aug. 27, 2021, 6 pages (3 pages of English Translation and 3 pages of Official Copy).
Notice of Allowance received for Chinese Patent Application No. 202010287961.0, mailed on Mar. 9, 2021, 8 pages (4 pages of English Translation and 4 pages of Official Copy).
Notice of Allowance received for Chinese Patent Application No. 202010287975.2, mailed on Mar. 1, 2021, 7 pages (3 pages of English Translation and 4 pages of Official Copy).
Notice of Allowance received for Chinese Patent Application No. 202010600151.6, mailed on Aug. 13, 2021, 2 pages (1 page of English Translation and 1 page of Official Copy).
Notice of Allowance received for Chinese Patent Application No. 202010600197.8, mailed on Feb. 9, 2022, 5 pages (1 page of English Translation and 4 pages of Official Copy).
Notice of Allowance received for Chinese Patent Application No. 202010601484.0, mailed on Nov. 23, 2021, 2 pages (1 page of English Translation and 1 page of Official Copy).
Notice of Allowance received for Chinese Patent Application No. 202011480411.7, mailed on Feb. 18, 2022, 6 pages (3 pages of English Translation and 3 pages of Official Copy).
Notice of Allowance received for Chinese Patent Application No. 202180002106.3, mailed on May 5, 2022, 6 pages (3 pages of English Translation and 3 pages of Official Copy).
Notice of Allowance received for Japanese Patent Application No. 2018-171188, mailed on Jul. 16, 2019, 3 pages (1 page of English Translation and 2 pages of Official Copy).
Notice of Allowance received for Japanese Patent Application No. 2020-159338, mailed on Jul. 19, 2022, 3 pages (1 page of English Translation and 2 pages of Official Copy).
Notice of Allowance received for Japanese Patent Application No. 2020-542592, mailed on Nov. 14, 2022, 2 pages (1 page of English Translation and 1 page of Official Copy).
Notice of Allowance received for Japanese Patent Application No. 2021-510849, mailed on May 16, 2022, 4 pages (1 page of English Translation and 3 pages of Official Copy).

(56) References Cited

OTHER PUBLICATIONS

Notice of Allowance received for Japanese Patent Application No. 2021-565919, mailed on Oct. 3, 2022, 3 pages (1 page of English Translation and 2 pages of Official Copy).
Notice of Allowance received for Japanese Patent Application No. 2022-095182, mailed on Feb. 5, 2024, 4 pages (1 page of English Translation and 3 pages of Official Copy).
Notice of Allowance received for Korean Patent Application No. 10-2018-7026743, mailed on Mar. 20, 2019, 7 pages (1 page of English Translation and 6 pages of Official Copy).
Notice of Allowance received for Korean Patent Application No. 10-2018-7028849, mailed on Feb. 1, 2019, 4 pages (1 page of English Translation and 3 pages of Official Copy).
Notice of Allowance received for Korean Patent Application No. 10-2018-7034780, mailed on Jun. 19, 2019, 4 pages (1 page of English Translation and 3 pages of Official Copy).
Notice of Allowance received for Korean Patent Application No. 10-2018-7036893, mailed on Jun. 12, 2019, 4 pages (1 page of English Translation and 3 pages of Official Copy).
Notice of Allowance received for Korean Patent Application No. 10-2019-7027042, mailed on Nov. 26, 2020, 4 pages (1 page of English Translation and 3 pages of Official Copy).
Notice of Allowance received for Korean Patent Application No. 10-2020-0052618, mailed on Mar. 23, 2021, 5 pages (2 page of English Translation and 3 pages of Official Copy).
Notice of Allowance received for Korean Patent Application No. 10-2020-0124139, mailed on Jun. 19, 2023, 7 pages (2 pages of English Translation and 5 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2020-7022663, mailed on Jun. 23, 2022, 6 pages (2 pages of English Translation and 4 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7000954, mailed on Aug. 18, 2021, 5 pages (2 pages of English Translation and 3 pages of Official Copy).
Notice of Allowance received for Korean Patent Application No. 10-2021-7006145, mailed on Mar. 6, 2023, 5 pages (2 pages of English Translation and 3 pages of Official Copy).
Notice of Allowance received for Korean Patent Application No. 10-2021-7035687, mailed on Dec. 30, 2021, 5 pages (1 page of English Translation and 4 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7010505, mailed on Dec. 26, 2022, 7 pages (2 pages of English Translation and 5 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for Korean Patent Application No. 10-2022-7033119, mailed on Jul. 26, 2023, 7 pages (2 pages of English Translation and 5 pages of Official Copy).
Notice of Allowance received for Korean Patent Application No. 10-2023-7009943, mailed on Aug. 31, 2023, 7 pages (2 pages of English Translation and 5 pages of Official Copy).
Notice of Allowance received for Korean Patent Application No. 10-2023-7036985, mailed on Apr. 11, 2024, 7 pages (2 pages of English Translation and 5 pages of Official Copy).
Notice of Allowance received for Taiwanese Patent Application No. 104107328, mailed on Jun. 12, 2017, 3 pages (Official Copy Only) {See Communication under Rule 37 CFR § 1.98(a) (3)}.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 14/641,251, mailed on May 18, 2016, 13 pages.
Notice of Allowance received for U.S. Appl. No. 14/869,807, mailed on Jun. 21, 2017, 9 pages.
Notice of Allowance received for U.S. Appl. No. 14/869,807, mailed on Oct. 10, 2017, 9 pages.
Notice of Allowance received for U.S. Appl. No. 15/136,323, mailed on Feb. 28, 2018, 9 pages.
Notice of Allowance received for U.S. Appl. No. 15/136,323, mailed on Oct. 12, 2017, 8 pages.
Notice of Allowance received for U.S. Appl. No. 15/268,115, mailed on Mar. 7, 2018, 15 pages.
Notice of Allowance received for U.S. Appl. No. 15/273,453, mailed on Oct. 12, 2017, 11 pages.
Notice of Allowance received for U.S. Appl. No. 15/273,503, mailed on Aug. 14, 2017, 9 pages.
Notice of Allowance received for U.S. Appl. No. 15/273,522, mailed on Mar. 28, 2017, 9 pages.
Notice of Allowance received for U.S. Appl. No. 15/273,522, mailed on May 19, 2017, 2 pages.
Notice of Allowance received for U.S. Appl. No. 15/273,522, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017, 8 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 15/863,369, mailed on Jun. 28, 2018, 8 pages.
Notice of Allowance received for U.S. Appl. No. 15/975,581, mailed on Oct. 3, 2018, 25 pages.
Notice of Allowance received for U.S. Appl. No. 16/143,396, mailed on Nov. 27, 2019, 8 pages.
Notice of Allowance received for U.S. Appl. No. 16/144,629, mailed on Apr. 7, 2022, 8 pages.
Notice of Allowance received for U.S. Appl. No. 16/144,629, mailed on Jul. 25, 2022, 10 pages.
Notice of Allowance received for U.S. Appl. No. 16/191,117, mailed on Oct. 29, 2019, 9 pages.
Notice of Allowance received for U.S. Appl. No. 16/271,583, mailed on Apr. 14, 2021, 6 pages.
Notice of Allowance received for U.S. Appl. No. 16/271,583, mailed on Dec. 9, 2020, 6 pages.
Notice of Allowance received for U.S. Appl. No. 16/271,583, mailed on Jul. 23, 2021, 6 pages.
Notice of Allowance received for U.S. Appl. No. 16/271,583, mailed on May 10, 2021, 3 pages.
Notice of Allowance received for U.S. Appl. No. 16/528,257, mailed on Jan. 14, 2022, 10 pages.
Notice of Allowance received for U.S. Appl. No. 16/582,595, mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages.
Notice of Allowance received for U.S. Appl. No. 16/584,100, mailed on Apr. 8, 2020, 12 pages.
Notice of Allowance received for U.S. Appl. No. 16/584,100, mailed on Jan. 14, 2020, 13 pages.

(56) References Cited

OTHER PUBLICATIONS

Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice of Allowance received for U.S. Appl. No. 16/586,344, mailed on Dec. 16, 2019, 12 pages.
Notice of Allowance received for U.S. Appl. No. 16/586,344, mailed on Mar. 27, 2020, 12 pages.
Notice of Allowance received for U.S. Appl. No. 16/825,879, mailed on Jul. 13, 2021, 9 pages.
Notice of Allowance received for U.S. Appl. No. 16/825,879, mailed on Sep. 28, 2021, 8 pages.
Notice of Allowance received for U.S. Appl. No. 16/835,651, mailed on Jul. 23, 2021, 8 pages.
Notice of Allowance received for U.S. Appl. No. 16/835,651, mailed on Jun. 1, 2021, 10 pages.
Notice of Allowance received for U.S. Appl. No. 16/835,651, mailed on Nov. 10, 2021, 9 pages.
Notice of Allowance received for U.S. Appl. No. 16/840,719, mailed on Apr. 30, 2021, 13 pages.
Notice of Allowance received for U.S. Appl. No. 17/027,317, mailed on Apr. 12, 2021, 7 pages.
Notice of Allowance received for U.S. Appl. No. 17/027,317, mailed on Jan. 13, 2021, 10 pages.
Notice of Allowance received for U.S. Appl. No. 17/027,484, mailed on May 3, 2021, 11 pages.
Notice of Allowance received for U.S. Appl. No. 17/041,412, mailed on Apr. 26, 2023, 11 pages.
Notice of Allowance received for U.S. Appl. No. 17/041,412, mailed on Mar. 15, 2023, 13 pages.
Notice of Allowance received for U.S. Appl. No. 17/190,879, mailed on Nov. 10, 2021, 8 pages.
Notice of Allowance received for U.S. Appl. No. 17/220,596, mailed on Oct. 21, 2021, 43 pages.
Notice of Allowance received for U.S. Appl. No. 17/354,376, mailed on Jan. 27, 2022, 10 pages.
Notice of Allowance received for U.S. Appl. No. 17/354,376, mailed on Mar. 4, 2022, 5 pages.
Notice of Allowance received for U.S. Appl. No. 17/354,376, mailed on Mar. 30, 2022, 5 pages.
Notice of Allowance received for U.S. Appl. No. 17/409,598, mailed on Jun. 21, 2022, 12 pages.
Notice of Allowance received for U.S. Appl. No. 17/409,598, mailed on Sep. 14, 2022, 9 pages.
Notice of Allowance received for U.S. Appl. No. 17/466,824, mailed on Mar. 13, 2024, 5 pages.
Notice of Allowance received for U.S. Appl. No. 17/466,824, mailed on Nov. 8, 2023, 5 pages.
Notice of Allowance received for U.S. Appl. No. 17/479,897, mailed on Jul. 26, 2023, 7 pages.
Notice of Allowance received for U.S. Appl. No. 17/479,897, mailed on Oct. 3, 2023, 5 pages.
Notice of Allowance received for U.S. Appl. No. 17/510,168, mailed on Feb. 13, 2023, 10 pages.
Notice of Allowance received for U.S. Appl. No. 17/510,168, mailed on May 3, 2023, 10 pages.
Notice of Allowance received for U.S. Appl. No. 17/546,968, mailed on May 31, 2024, 24 pages.
Notice of Allowance received for U.S. Appl. No. 17/566,094, mailed on Feb. 23, 2023, 8 pages.
Notice of Allowance received for U.S. Appl. No. 17/566,094, mailed on Nov. 22, 2022, 10 pages.
Notice of Allowance received for U.S. Appl. No. 17/732,191, mailed on Feb. 27, 2023, 12 pages.
Notice of Allowance received for U.S. Appl. No. 17/732,191, mailed on Nov. 9, 2022, 12 pages.
Notice of Allowance received for U.S. Appl. No. 17/740,032, mailed on Feb. 1, 2023, 9 pages.
Notice of Allowance received for U.S. Appl. No. 17/740,032, mailed on Oct. 13, 2022, 11 pages.
Notice of Allowance received for U.S. Appl. No. 17/940,672, mailed on Apr. 27, 2023, 9 pages.
Notice of Allowance received for U.S. Appl. No. 18/114,880, mailed on Feb. 15, 2024, 17 pages.
Notice of Allowance received for U.S. Appl. No. 18/114,880, mailed on Nov. 15, 2023, 11 pages.
Notice of Allowance received for U.S. Appl. No. 18/121,458, mailed on Dec. 6, 2023, 9 pages.
Notice of Allowance received for U.S. Appl. No. 18/121,458, mailed on Mar. 12, 2024, 9 pages.
Notice of Allowance received for U.S. Appl. No. 18/196,997, mailed on Mar. 28, 2024, 11 pages.
Notice of Hearing received for Indian Patent Application No. 201818045872, mailed on Nov. 16, 2023, 2 pages.
Notice of Hearing received for Indian Patent Application No. 201818046896, mailed on Jul. 11, 2023, 2 pages.
Notice of Hearing received for Indian Patent Application No. 202118028159, mailed on Nov. 22, 2023, 2 pages.
Office Action received for Australian Patent Application No. 2017100683, mailed on Sep. 20, 2017, 3 pages.
Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action received for Australian Patent Application No. 2017286130, mailed on Jan. 21, 2019, 4 pages.
Office Action received for Australian Patent Application No. 2019213341, mailed on Jun. 30, 2020, 6 pages.
Office Action received for Australian Patent Application No. 2019218241, mailed on Apr. 1, 2021, 3 pages.
Office Action received for Australian Patent Application No. 2019338180, mailed on Feb. 18, 2022, 3 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020239717, mailed on Dec. 15, 2021, 6 pages.
Office Action received for Australian Patent Application No. 2020239717, mailed on Jun. 23, 2021, 7 pages.
Office Action received for Australian Patent Application No. 2020239717, mailed on Mar. 16, 2022, 4 pages.
Office Action received for Australian Patent Application No. 2020239717, mailed on Sep. 28, 2021, 6 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021103004, mailed on Aug. 12, 2021, 5 pages.
Office Action received for Australian Patent Application No. 2021107587, mailed on Feb. 1, 2022, 6 pages.
Office Action received for Australian Patent Application No. 2021290292, mailed on Nov. 24, 2022, 2 pages.
Office Action received for Australian Patent Application No. 2022204465, mailed on Mar. 10, 2023, 4 pages.
Office Action received for Australian Patent Application No. 2022221466, mailed on Jun. 16, 2023, 2 pages.
Office Action received for Australian Patent Application No. 2022228121, mailed on Jul. 7, 2023, 3 pages.
Office Action received for Australian Patent Application No. 2022228121, mailed on Sep. 20, 2023, 3 pages.
Office Action received for Australian Patent Application No. 2022228191, mailed on Aug. 16, 2023, 4 pages.
Office Action received for Australian Patent Application No. 2023200607, mailed on Dec. 20, 2023, 3 pages.

(56) References Cited

OTHER PUBLICATIONS

Office Action received for Australian Patent Application No. 2023200607, mailed on Feb. 22, 2024, 2 pages.
Office Action received for Brazilian Patent Application No. BR122018076550-0, mailed on Sep. 28, 2022, 7 pages (1 page of English Translation and 6 pages of Official Copy).
Office Action received for Chinese Patent Application No. 201580046237.6, mailed on Feb. 6, 2018, 10 pages (5 pages of English Translation and 5 pages of Official Copy).
Office Action received for Chinese Patent Application No. 201680023520.1, mailed on Jan. 3, 2019, 10 pages (5 pages of English translation and 5 pages of Official Copy).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201780002533.5, mailed on Apr. 25, 2019, 17 pages (7 pages of English Translation and 10 pages of Official Copy).
Office Action received for Chinese Patent Application No. 201780002533.5, mailed on Feb. 3, 2020, 6 pages (3 pages of English Translation and 3 pages of Official Copy).
Office Action received for Chinese Patent Application No. 201780002533.5, mailed on Sep. 26, 2019, 21 pages (9 pages of English Translation and 12 pages of Official Copy).
Office Action received for Chinese Patent Application No. 201810566134.8, mailed on Aug. 13, 2019, 14 pages (8 pages of English Translation and 6 pages of Official Copy).
Office Action received for Chinese Patent Application No. 201810664927.3, mailed on Mar. 28, 2019, 11 pages (5 pages of English Translation and 6 pages of Official Copy).
Office Action received for Chinese Patent Application No. 201811446867.4, mailed on Dec. 31, 2019, 12 pages (5 pages of English Translation and 7 pages of Official Copy).
Office Action received for Chinese Patent Application No. 201811446867.4, mailed on May 6, 2020, 10 pages (5 pages of English Translation and 5 pages of Official Copy).
Office Action received for Chinese Patent Application No. 201811446867.4, mailed on Sep. 8, 2020, 9 pages (4 pages of English Translation and 5 pages of Official Copy).
Office Action received for Chinese Patent Application No. 201811512767.7, mailed on Dec. 20, 2019, 14 pages (7 pages of English Translation and 7 pages of Official Copy).
Office Action received for Chinese Patent Application No. 201811512767.7, mailed on Jun. 4, 2020, 6 pages (3 pages of English Translation and 3 pages of Official Copy).
Office Action received for Chinese Patent Application No. 201910864074.2, mailed on Sep. 23, 2020, 11 pages (5 pages of English Translation and 6 pages of Official Copy).
Office Action received for Chinese Patent Application No. 201980012481.9, mailed on Jan. 12, 2023, 18 pages (9 pages of English Translation and 9 pages of Official Copy).
Office Action received for Chinese Patent Application No. 201980012481.9, mailed on Jun. 8, 2023, 16 pages (9 pages of English Translation and 7 pages of Official Copy).
Office Action received for Chinese Patent Application No. 201980012481.9, mailed on Nov. 21, 2023, 18 pages (10 pages of English Translation and 8 pages of Official Copy).
Office Action received for Chinese Patent Application No. 202010235395.9, mailed on Mar. 16, 2024, 18 pages (9 pages of English Translation and 9 pages of Official Copy).
Office Action received for Chinese Patent Application No. 202010287950.2, mailed on Aug. 10, 2021, 12 pages (6 pages of English Translation and 6 pages of Official Copy).
Office Action received for Chinese Patent Application No. 202010287950.2, mailed on Feb. 20, 2021, 22 pages (10 pages of English Translation and 12 pages of Official Copy).
Office Action received for Chinese Patent Application No. 202010287950.2, mailed on Nov. 19, 2021, 8 pages (5 pages of English Translation and 3 pages of Official Copy).
Office Action received for Chinese Patent Application No. 202010287953.6, mailed on Jan. 14, 2021, 14 pages (7 pages of English Translation and 7 pages of Official Copy).
Office Action received for Chinese Patent Application No. 202010287958.9, mailed on Jan. 5, 2021, 16 pages (8 pages of English Translation and 8 pages of Official Copy).
Office Action received for Chinese Patent Application No. 202010287961.0, mailed on Dec. 30, 2020, 16 pages (8 pages of English Translation and 8 pages of Official Copy).
Office Action received for Chinese Patent Application No. 202010287975.2, mailed on Dec. 30, 2020, 17 pages (9 pages of English Translation and 8 pages of Official Copy).
Office Action received for Chinese Patent Application No. 202010600151.6, mailed on Apr. 29, 2021, 11 pages (5 pages of English Translation and 6 pages of Official copy).
Office Action received for Chinese Patent Application No. 202010600197.8, mailed on Jul. 2, 2021, 14 pages (6 pages of English Translation and 8 pages of Official Copy).
Office Action received for Chinese Patent Application No. 202010601484.0, mailed on Jun. 3, 2021, 13 pages (6 pages of English Translation and 7 pages of Official Copy).
Office Action received for Chinese Patent Application No. 202011480411.7, mailed on Aug. 2, 2021, 12 pages (6 pages of English Translation and 6 pages of Official Copy).
Office Action received for Chinese Patent Application No. 202011480411.7, mailed on Jan. 12, 2022, 7 pages (4 pages of English Translation and 3 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202110766668.7, mailed on Jan. 20, 2023, 11 pages (6 pages of English Translation and 5 pages of Official Copy).
Office Action received for Chinese Patent Application No. 202110766668.7, mailed on Jun. 7, 2023, 13 pages (9 pages of English Translation and 4 pages of Official Copy).
Office Action received for Chinese Patent Application No. 202110766668.7, mailed on Sep. 15, 2022, 18 pages (9 pages of English Translation and 9 pages of Official Copy).
Office Action received for Chinese Patent Application No. 202180002106.3, mailed on Feb. 16, 2022, 12 pages (6 pages of English Translation and 6 pages of Official Copy).
Office Action received for Chinese Patent Application No. 202210849242.2, mailed on Jan. 20, 2023, 12 pages (6 pages of English Translation and 6 pages of Official Copy).
Office Action received for Chinese Patent Application No. 202210849316.2, mailed on Jan. 18, 2024, 12 pages (6 pages of English Translation and 6 pages of Official Copy).
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670627, mailed on Apr. 5, 2017, 3 pages.
Office Action received for Danish Patent Application No. PA201670627, mailed on Nov. 6, 2017, 2 pages.
Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017, 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.

(56) References Cited

OTHER PUBLICATIONS

Office Action received for Danish Patent Application No. PA201670755, mailed on Dec. 22, 2016, 6 pages.
Office Action received for Danish Patent Application No. PA201670755, mailed on Oct. 20, 2017, 4 pages.
Office Action received for Danish Patent Application No. PA201870623, mailed on Jan. 30, 2020, 2 pages.
Office Action received for Danish Patent Application No. PA201870623, mailed on Jul. 12, 2019, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for Danish Patent Application No. PA202070611, mailed on Dec. 22, 2020, 7 pages.
Office Action received for European Patent Application No. 17809168.2, mailed on Jan. 7, 2020, 5 pages.
Office Action received for European Patent Application No. 17809168.2, mailed on Oct. 8, 2020, 4 pages.
Office Action received for European Patent Application No. 15712218.5, mailed on Aug. 3, 2017, 4 pages.
Office Action received for European Patent Application No. 16784025.5, mailed on Jul. 17, 2020, 6 pages.
Office Action received for European Patent Application No. 17184710.6, mailed on Dec. 21, 2018, 7 pages.
Office Action received for European Patent Application No. 18176890.4, mailed on Oct. 16, 2018, 8 pages.
Office Action received for European Patent Application No. 18183054.8, mailed on Feb. 24, 2020, 6 pages.
Office Action received for European Patent Application No. 18183054.8, mailed on Nov. 16, 2018, 8 pages.
Office Action received for European Patent Application No. 18209460.7, mailed on Apr. 10, 2019, 7 pages.
Office Action received for European Patent Application No. 18209460.7, mailed on Apr. 21, 2020, 5 pages.
Office Action received for European Patent Application No. 18214698.5, mailed on Apr. 2, 2019, 8 pages.
Office Action received for European Patent Application No. 19707557.5, mailed on Jun. 3, 2022, 5 pages.
Office Action received for European Patent Application No. 19769316.1, mailed on Jan. 12, 2023, 10 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Office Action received for European Patent Application No. 20206196.6, mailed on Aug. 10, 2022, 13 pages.
Office Action received for European Patent Application No. 20206196.6, mailed on Jan. 13, 2021, 10 pages.
Office Action received for European Patent Application No. 20206197.4, mailed on Aug. 27, 2021, 6 pages.
Office Action received for European Patent Application No. 20206197.4, mailed on Jan. 12, 2021, 9 pages.
Office Action received for European Patent Application No. 20206197.4, mailed on Mar. 18, 2022, 7 pages.
Office Action received for European Patent Application No. 20210373.5, mailed on Dec. 9, 2021, 7 pages.
Office Action received for European Patent Application No. 20210373.5, mailed on May 10, 2021, 9 pages.
Office Action received for European Patent Application No. 20210373.5, mailed on May 31, 2022, 5 pages.
Office Action received for European Patent Application No. 20728854.9, mailed on Apr. 8, 2024, 7 pages.
Office Action received for European Patent Application No. 20728854.9, mailed on May 7, 2024, 10 pages.
Office Action received for European Patent Application No. 21157252.4, mailed on Apr. 23, 2021, 8 pages.
Office Action received for European Patent Application No. 21157252.4, mailed on Jul. 24, 2023, 5 pages.
Office Action received for European Patent Application No. 21163791.3, mailed on Jun. 2, 2021, 8 pages.
Office Action received for European Patent Application No. 21163791.3, mailed on Sep. 20, 2022, 6 pages.
Office Action received for European Patent Application No. 21202358.4, mailed on Jun. 9, 2023, 7 pages.
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 202014041530, mailed on Dec. 8, 2021, 7 pages.
Office Action received for Indian Patent Application No. 202117009020, mailed on Feb. 6, 2023, 7 pages.
Office Action received for Indian Patent Application No. 202117017871, mailed on Apr. 4, 2024, 8 pages.
Office Action received for Indian Patent Application No. 202118021941, mailed on Mar. 23, 2022, 5 pages.
Office Action received for Indian Patent Application No. 202118028158, mailed on Apr. 22, 2024, 7 pages.
Office Action received for Indian Patent Application No. 202118028159, mailed on Jun. 27, 2022, 6 pages.
Office Action received for Indian Patent Application No. 202215010325, mailed on Oct. 10, 2022, 7 pages.
Office Action received for Japanese Patent Application No. 2018-225131, mailed on Aug. 17, 2020, 21 pages (6 pages of English Translation and 15 pages of Official Copy).
Office Action received for Japanese Patent Application No. 2018-225131, mailed on Mar. 4, 2019, 10 pages (6 pages of English Translation and 4 pages of Official Copy).
Office Action received for Japanese Patent Application No. 2018-545502, mailed on Aug. 17, 2020, 14 pages (6 pages of English Translation and 8 pages of Official Copy).
Office Action received for Japanese Patent Application No. 2019-203399, mailed on Aug. 10, 2021, 4 pages (2 pages of English Translation and 2 pages of Official Copy).
Office Action received for Japanese Patent Application No. 2020-070418, mailed on Aug. 3, 2020, 22 pages (14 pages of English Translation and 8 pages of Official Copy).
Office Action received for Japanese Patent Application No. 2020-159338, mailed on Dec. 8, 2021, 9 pages (5 pages of English Translation and 4 pages of Official Copy).
Office Action received for Japanese Patent Application No. 2020-184470, mailed on May 10, 2021, 3 pages (1 page of English Translation and 2 pages of Official Copy).
Office Action received for Japanese Patent Application No. 2020-184471, mailed on May 10, 2021, 3 pages (1 page of English Translation and 2 pages of Official Copy).

(56) References Cited

OTHER PUBLICATIONS

Office Action received for Japanese Patent Application No. 2020-542592, mailed on Aug. 1, 2022, 5 pages (2 pages of English Translation and 3 pages of Official Copy).
Office Action received for Japanese Patent Application No. 2020-542592, mailed on Sep. 21, 2021, 5 pages (3 pages of English Translation and 2 pages of Official Copy).
Office Action received for Japanese Patent Application No. 2021-187533, mailed on Feb. 6, 2023, 7 pages (4 pages of English Translation and 3 pages of Official Copy).
Office Action received for Japanese Patent Application No. 2021-187533, mailed on Jun. 26, 2023, 6 pages (3 pages of English Translation and 3 pages of Official Copy).
Office Action received for Japanese Patent Application No. 2021-565919, mailed on Jun. 13, 2022, 4 pages (2 pages of English Translation and 2 pages of Official Copy).
Office Action received for Japanese Patent Application No. 2022-095182, mailed on Sep. 25, 2023, 10 pages (5 pages of English Translation and 5 pages of Official Copy).
Office Action received for Japanese Patent Application No. 2022-130725, mailed on Sep. 4, 2023, 2 pages (1 page of English Translation and 1 page of Official Copy).
Office Action received for Japanese Patent Application No. 2022-145387, mailed on Oct. 2, 2023, 7 pages (3 pages of English Translation and 4 pages of Official Copy).
Office Action received for Japanese Patent Application No. 2022-199433, mailed on Jan. 29, 2024, 6 pages (3 pages of English Translation and 3 pages of Official Copy).
Office Action received for Korean Patent Application No. 10-2018-7026743, mailed on Jan. 17, 2019, 5 pages (2 pages of English Translation and 3 pages of Official Copy).
Office Action received for Korean Patent Application No. 10-2018-7034780, mailed on Apr. 4, 2019, 11 pages (5 pages of English Translation and 6 pages of Official Copy).
Office Action received for Korean Patent Application No. 10-2018-7036893, mailed on Apr. 9, 2019, 6 pages (2 pages of English Translation and 4 pages of Official Copy).
Office Action received for Korean Patent Application No. 10-2019-7027042, mailed on May 13, 2020, 6 pages (2 pages of English Translation and 4 pages of Official Copy).
Office Action received for Korean Patent Application No. 10-2020-0052618, mailed on Aug. 18, 2020, 11 pages (5 pages of English Translation and 6 pages of Official Copy).
Office Action received for Korean Patent Application No. 10-2020-0124139, mailed on Jan. 17, 2023, 10 pages (5 pages of English Translation and 5 pages of Official Copy).
Office Action received for Korean Patent Application No. 10-2020-7022663, mailed on Aug. 17, 2021, 11 pages (5 pages of English Translation and 6 pages of Official Copy).
Office Action received for Korean Patent Application No. 10-2021-0022053, mailed on Mar. 1, 2021, 11 pages (5 pages of English Translation and 6 pages of Official Copy).
Office Action received for Korean Patent Application No. 10-2021-7000954, mailed on Jan. 28, 2021, 5 pages (2 pages of English Translation and 3 pages of Official Copy).
Office Action received for Korean Patent Application No. 10-2021-7006145, mailed on Oct. 12, 2022, 14 pages (6 pages of English Translation and 8 pages of Official Copy).
Office Action received for Korean Patent Application No. 10-2021-7036337, mailed on Dec. 8, 2021, 6 pages (2 pages of English Translation and 4 pages of Official Copy).
Office Action received for Korean Patent Application No. 10-2022-7010505, mailed on Jun. 14, 2022, 5 pages (2 pages of English Translation and 3 pages of Official Copy).
Office Action received for Korean Patent Application No. 10-2022-7023077, mailed on Jul. 25, 2022, 6 pages (2 pages of English Translation and 4 pages of Official Copy).
Office Action received for Korean Patent Application No. 10-2022-7033119, mailed on Mar. 29, 2023, 5 pages (2 pages of English Translation and 3 pages of Official Copy).
Office Action received for Korean Patent Application No. 10-2023-7016569, mailed on Jan. 22, 2024, 10 pages (4 pages of English Translation and 6 pages of Official Copy).
Office Action received for Taiwanese Patent Application No. 104107328, mailed on Dec. 28, 2016, 4 pages (1 page of Search Report and 3 pages of Official Copy).
Osxdaily, "How to Zoom the Camera on iPhone", Available Online at: https://osxdaily.com/2012/04/18/zoom-camera-iphone/, Apr. 18, 2012, 6 pages.
PlayMemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
PreAppeal Review Report received for Japanese Patent Application No. 2018-225131, mailed on Jan. 24, 2020, 8 pages (4 pages of English Translation and 4 pages of Official Copy).
PreAppeal Review Report received for Japanese Patent Application No. 2018-545502, mailed on Jan. 24, 2020, 8 pages (3 pages of English Translation and 5 pages of Official Copy).
"Procamera Capture the Moment", Online Available at: http://www.procamera-app.com/procamera_manual/ProCamera_Manual_EN.pdf, Apr. 21, 2016, 63 pages.
Record of Oral Hearing received for U.S. Appl. No. 16/144,629, mailed on Jan. 28, 2022, 13 pages.
"Remote Shot for SmartWatch 2", Available online at: https://play.google.com/store/apps/details?id=net.watea.sw2.rshot&h1=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 20206196.6, mailed on Mar. 27, 2024, 4 pages.
Schiffhauer, Alexander, "See the Light with Night Sight", Available online at: https://www.blog.google/products/pixel/see-light-night-sight, Nov. 14, 2018, 6 pages.
Search Report and Opinion received for Danish Patent Application No. PA201870623, mailed on Dec. 20, 2018, 8 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Shareit, "WhatsApp Easy Way to Record Long Voice Messages—New Update", Retrieved from Internet: <https://www.youtube.com/watch?v=3MVnYGt8v1l>, Apr. 7, 2018, 39 pages.
Shaw et al., ""Skills for Closeups Photography"", Watson-Guptill Publications, Nov. 1999, 5 pages (Official Copy Only) {See Communication under Rule 37 CFR § 1.98(a) (3)}.
shiftdelete.net, "Oppo Reno 10x Zoom Ön Inceleme—Huawei P30 Pro'ya rakip mi geliyor?", Available online at <https://www.youtube.com/watch?v=ev2wIUztdrg>, See especially 5:34-6:05, Apr. 24, 2019, 2 pages.
Sigdel, Prakash, "How to record WhatsApp voice massage without continue holding down button", Available Online at: https://www.youtube.com/watch?v=m3Hz6TXt0PA, Dec. 6, 2017, 9 pages.
Smart Reviews, "Honor10 AI Camera's in Depth Review", See Especially 2:37-2:48; 6:39-6:49, Available Online at <https://www.youtube.com/watch?v=oKFqRvxeDBQ>, May 31, 2018, 2 pages.
"Sony Xperia XZ3 Camera Review—The Colors, Duke, The Colors!", Android Headlines—Android News & Tech News, Available online at <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-

(56) References Cited

OTHER PUBLICATIONS downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 17184710.6, mailed on Sep. 17, 2019, 7 pages.
Summons to Attend Oral Proceedings received for European Patent Application No. 19707557.5, mailed on Jan. 26, 2024, 6 pages.
Summons to Attend Oral Proceedings received for European Patent Application No. 21163791.3, mailed on May 3, 2023, 6 pages.
Summons to Oral Proceedings received for European Patent Application No. 17184710.6, mailed on May 10, 2023, 3 pages.
Supplemental Notice of Allowance received for U.S. Appl. No. 15/136,323, mailed on Jan. 31, 2018, 6 pages.
Supplemental Notice of Allowance received for U.S. Appl. No. 15/863,369, mailed on Aug. 8, 2018, 4 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Tech Stuff, "Telegram 4.0: Video Messages + Telescope, Payments and more . . . ", Available Online at: https://www.youtube.com/watch?v=y0alJRPH7nQ, May 20, 2017, 6 pages.
Techsmith, "Snagit ® 11 Snagit 11.4 Help", Online available at: <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at: <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Travel Tech Sports Channel, "New Whatsapp update—voice message recording made easy—Want to record long voice messages", Available Online at: https://www.youtube.com/watch?v=SEviqgsAdUk, Nov. 30, 2017, 13 pages.
Vivo India, "Bokeh Mode | Vivo V9", Available Online at: <https://www.youtube.com/watch?v=B5AIHhH5Rxs>, Mar. 25, 2018, 3 pages.
Whitacre, Michele, "Photography 101 | Exposure Meter", Online available at: https://web.archive.org/web/20160223055834/http://www.michelewhitacrephotographyblog.com, Feb. 23, 2016, 4 pages.
Wong, Richard, "Huawei Smartphone (P20/P10/P9, Mate 10/9) Wide Aperture Mode Demo", Available Online at: <https://www.youtube.com/watch?v=eLY3LsZGDPA>, May 7, 2017, 2 pages.
Wu et al., "Security Threats to Mobile Multimedia Applications: Camera-Based Attacks on Mobile Phones", IEEE Communications Magazine, Available online at: http://www.ieeeprojectmadurai.in/BASE/ANDROID/Security%20Threats%20to%20Mobile.pdf, Mar. 2014, pp. 80-87.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at: <http://www.xperiablog.net/2014/06/13/action-camera-extension-gives-smartwatchsmartband-owners-ability-to-control-sony-wireless-cameras/>, Jun. 13, 2014, 10 pages.
Yuan, Ye, "Iphone 4s Original Secrets", China Railway Press, 2012, 15 pages (Official Copy Only) {See Communication under Rule 37 CFR § 1.98(a) (3)}.
Corrected Notice of Allowance received for U.S. Appl. No. 17/992,789, mailed on Oct. 28, 2025, 4 pages.
Decision to Grant received for European Patent Application No. 24182717.9, mailed on Oct. 16, 2025, 4 pages.
Notice of Acceptance received for Australian Patent Application No. 2023282230, mailed on Oct. 17, 2025, 3 pages.
Notice of Allowance received for U.S. Appl. No. 18/892,251, mailed on Oct. 22, 2025, 8 pages.
Office Action received for Korean Patent Application No. 10-2024-7018082, mailed on Oct. 16, 2025, 20 pages (9 pages of English Translation and 11 pages of Official Copy).
Decision to Grant received for European Patent Application No. 19769316.1, mailed on Apr. 25, 2025, 4 pages.
Notice of Acceptance received for Australian Patent Application No. 2023226764, mailed on Apr. 11, 2025, 3 pages.
Decision to Grant received for Japanese Patent Application No. 2024-173257, mailed on Aug. 5, 2025, 3 pages (1 page of English Translation and 2 pages of Official Copy).
Notice of Allowance received for U.S. Appl. No. 18/423,234, mailed on Aug. 11, 2025, 6 pages.
Office Action received for Japanese Patent Application No. 2023-158354, mailed on Jun. 3, 2025, 6 pages (3 pages of English Translation and 3 pages of Official Copy).

* cited by examiner

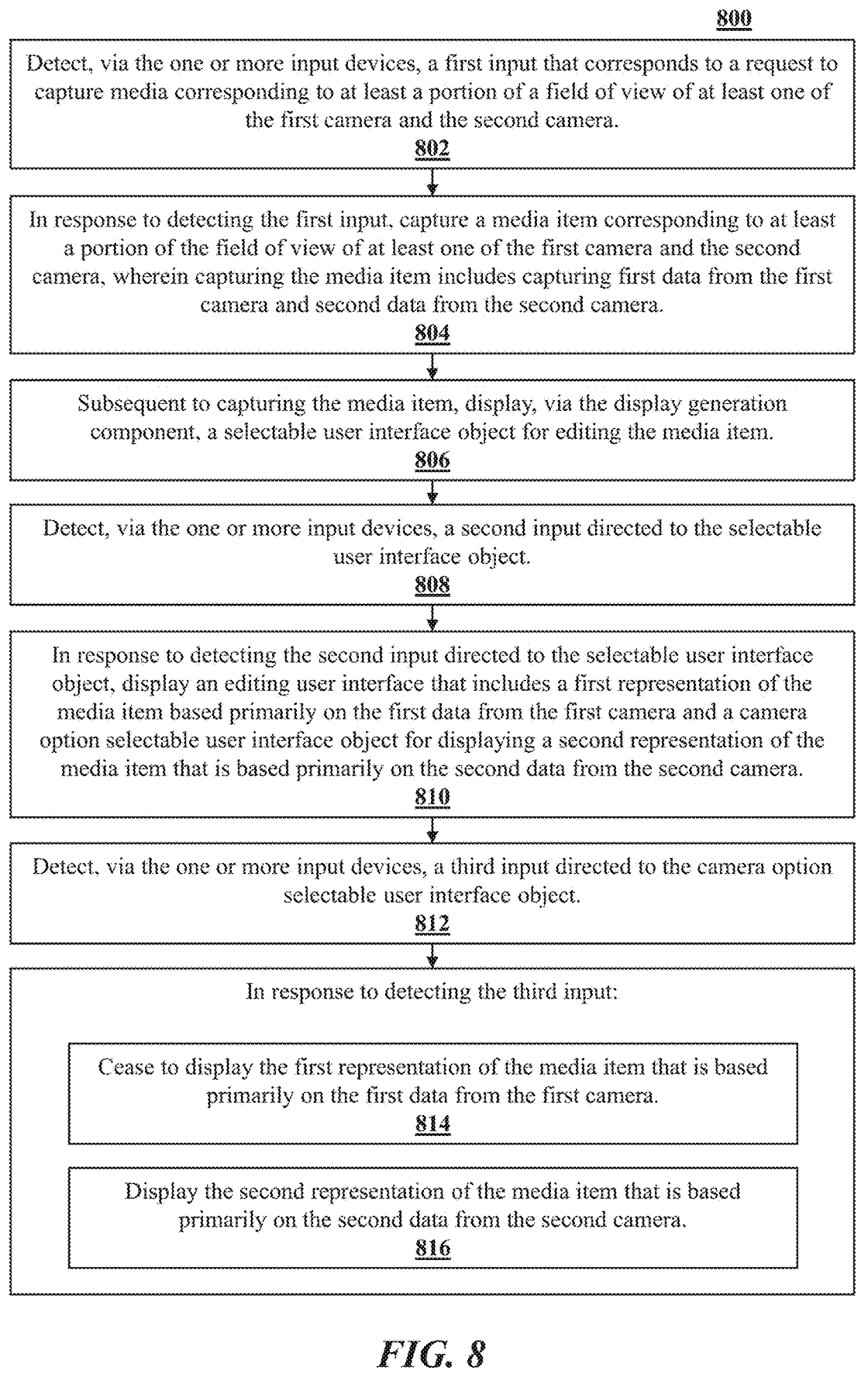

800

Detect, via the one or more input devices, a first input that corresponds to a request to capture media corresponding to at least a portion of a field of view of at least one of the first camera and the second camera.
802

In response to detecting the first input, capture a media item corresponding to at least a portion of the field of view of at least one of the first camera and the second camera, wherein capturing the media item includes capturing first data from the first camera and second data from the second camera.
804

Subsequent to capturing the media item, display, via the display generation component, a selectable user interface object for editing the media item.
806

Detect, via the one or more input devices, a second input directed to the selectable user interface object.
808

In response to detecting the second input directed to the selectable user interface object, display an editing user interface that includes a first representation of the media item based primarily on the first data from the first camera and a camera option selectable user interface object for displaying a second representation of the media item that is based primarily on the second data from the second camera.
810

Detect, via the one or more input devices, a third input directed to the camera option selectable user interface object.
812

In response to detecting the third input:

Cease to display the first representation of the media item that is based primarily on the first data from the first camera.
814

Display the second representation of the media item that is based primarily on the second data from the second camera.
816

*FIG. 8*

MULTI-TYPE MEDIA USER INTERFACE

CROSS-REFERENCE TO RELATED APPLICATIONS

This application claims priority to U.S. Provisional Patent Application No. 63/462,213, entitled "MULTI-TYPE MEDIA USER INTERFACE," filed on Apr. 26, 2023, the entire contents of which are hereby incorporated by reference in its entirety.

FIELD

The present disclosure relates generally to computer user interfaces, and more specifically to techniques and user interfaces for capturing and/or editing media items that can correspond to multiple media types and/or multiple cameras.

BACKGROUND

Many electronic devices incorporate one or more cameras for capturing visual media items, such as still photos, videos, and the like. Such devices typically include user interfaces to allow users to configure one or more parameters of media capture and to perform the media capture itself. Such devices may also provide user interfaces to edit or modify media, after capture.

BRIEF SUMMARY

Some techniques for capturing and/or editing media items that can correspond to multiple media types and/or multiple cameras using electronic devices, however, are generally cumbersome and inefficient. For example, some existing techniques use a complex and time-consuming user interface, which may include multiple key presses or keystrokes. Some existing techniques require users to select a single media type (e.g., photo or video) prior to capturing media, with the resulting media remaining fixed to that media type, after capture and/or requiring extensive modification (e.g., via dedicated editing programs) to change from one media type to another. Thus, existing techniques require more time than necessary, wasting user time and device energy. This latter consideration is particularly important in battery-operated devices.

Accordingly, the present technique provides electronic devices with faster, more efficient methods and interfaces for capturing and/or editing media items that can correspond to multiple media types and/or multiple cameras. Such methods and interfaces optionally complement or replace other methods for capturing and/or editing media items that can correspond to multiple media types and/or multiple cameras. Such methods and interfaces reduce the cognitive burden on a user and produce a more efficient human-machine interface. For battery-operated computing devices, such methods and interfaces conserve power and increase the time between battery charges. Such methods can also reduce the cognitive burden on a user associated with having to select a single media type, while also reducing the risk that a transient event is captured using an incorrect media type (e.g., capturing a still photo for an action-oriented event where a user might prefer video).

In some embodiments, an exemplary method is described. The method is performed at a computer system that is in communication with a display generation component and one or more input devices. The method includes: displaying, via the display generation component, an editing user interface for editing a respective media item that was previously captured, wherein the editing user interface includes a first set of one or more edit options to edit a first type of media; while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, an exemplary non-transitory computer-readable storage medium storing one or more programs configured to be executed by one or more processors of a computer system that is in communication with a display generation component and one or more input devices is described. The programs including instructions for: displaying, via the display generation component, an editing user interface for editing a respective media item that was previously captured, wherein the editing user interface includes a first set of one or more edit options to edit a first type of media; while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, an exemplary transitory computer-readable storage medium storing one or more programs configured to be executed by one or more processors of a computer system that is in communication with a display generation component and one or more input devices is described. The programs including instructions for: displaying, via the display generation component, an editing user interface for editing a respective media item that was previously captured, wherein the editing user interface includes a first set of one or more edit options to edit a first type of media; while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, a computer system that configured to communicate with a display generation component and one or more input devices is described. The computer system includes one or more processors and memory storing one or more programs configured to be executed by the one or more processors. The one or more programs including instructions for: displaying, via the display generation component, an editing user interface for editing a respective media item that was previously captured, wherein the editing user interface includes a first set of one or more edit options to edit a first type of media; while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, a computer system that configured to communicate with a display generation component and one or more input devices is described. The computer system includes: means for displaying, via the display generation component, an editing user interface for editing a respective media item that was previously captured, wherein the editing user interface includes a first set of one or more edit options to edit a first type of media; means for, while displaying the editing user interface, detecting, via the one or more input devices, a first input; and means for, in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, a computer program product, comprising one or more programs configured to be executed by one or more processors of a computer system that is in communication with a display generation component and one or more input devices is described. The one or more programs including instructions for: displaying, via the display generation component, an editing user interface for editing a respective media item that was previously captured, wherein the editing user interface includes a first set of one or more edit options to edit a first type of media; while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

In some embodiments, an exemplary method is described. The method is performed at a computer system that is in communication with a display generation component, one or more input devices a first camera, and a second camera. The method includes: detecting, via the one or more input devices, a first input that corresponds to a request to capture media corresponding to at least a portion of a field of view of at least one of the first camera and the second camera; in response to detecting the first input, capturing a media item corresponding to at least a portion of the field of view of at least one of the first camera and the second camera, wherein capturing the media item includes capturing first data from the first camera and second data from the second camera; subsequent to capturing the media item, displaying, via the display generation component, a selectable user interface object for editing the media item; detecting, via the one or more input devices, a second input directed to the selectable user interface object; in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and detecting, via the one or more input devices, a third input directed to the camera option selectable user interface object; and in response to detecting the third input: ceasing to display the first representation of the media item that is based primarily on the first data from the first camera; and displaying the second representation of the media item that is based primarily on the second data from the second camera.

In some embodiments, an exemplary non-transitory computer-readable storage medium storing one or more programs configured to be executed by one or more processors of a computer system that is in communication with a display generation component, one or more input devices a first camera, and a second camera is described. The programs including instructions for: detecting, via the one or more input devices, a first input that corresponds to a request to capture media corresponding to at least a portion of a field of view of at least one of the first camera and the second camera; in response to detecting the first input, capturing a media item corresponding to at least a portion of the field of view of at least one of the first camera and the second camera, wherein capturing the media item includes capturing first data from the first camera and second data from the second camera; subsequent to capturing the media item, displaying, via the display generation component, a selectable user interface object for editing the media item; detecting, via the one or more input devices, a second input directed to the selectable user interface object; in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and detecting, via the one or more input devices, a third input directed to the camera option selectable user interface object; and in response to detecting the third input: ceasing to display the first representation of the media item that is based primarily on the first data from the first camera; and displaying the second representation of the media item that is based primarily on the second data from the second camera.

In some embodiments, an exemplary transitory computer-readable storage medium storing one or more programs configured to be executed by one or more processors of a computer system that is in communication with a display generation component, one or more input devices a first camera, and a second camera is described. The programs including instructions for: detecting, via the one or more input devices, a first input that corresponds to a request to capture media corresponding to at least a portion of a field of view of at least one of the first camera and the second camera; in response to detecting the first input, capturing a media item corresponding to at least a portion of the field of view of at least one of the first camera and the second camera, wherein capturing the media item includes capturing first data from the first camera and second data from the second camera; subsequent to capturing the media item, displaying, via the display generation component, a selectable user interface object for editing the media item; detecting, via the one or more input devices, a second input directed to the selectable user interface object; in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and detecting, via the one or more input devices, a third input directed to the camera option selectable user interface object; and in response to detecting the third input: ceasing to display the first representation of the media item that is based primarily on the first data from the first camera; and displaying the second representation of the media item that is based primarily on the second data from the second camera.

In some embodiments, a computer system that configured to communicate with a display generation component, one or more input devices a first camera, and a second camera is described. The computer system includes one or more processors and memory storing one or more programs configured to be executed by the one or more processors. The one or more programs including instructions for: detecting, via the one or more input devices, a first input that corresponds to a request to capture media corresponding to at least a portion of a field of view of at least one of the first camera and the second camera; in response to detecting the first input, capturing a media item corresponding to at least a portion of the field of view of at least one of the first camera and the second camera, wherein capturing the media item includes capturing first data from the first camera and second data from the second camera; subsequent to capturing the media item, displaying, via the display generation component, a selectable user interface object for editing the media item; detecting, via the one or more input devices, a second input directed to the selectable user interface object; in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and detecting, via the one or more input devices, a third input directed to the camera option selectable user interface object; and in response to detecting the third input: ceasing to display the first representation of the media item that is based primarily on the first data from the first camera; and displaying the second representation of the media item that is based primarily on the second data from the second camera.

In some embodiments, a computer system that configured to communicate with a display generation component, one or more input devices a first camera, and a second camera is described. The computer system includes: means for detecting, via the one or more input devices, a first input that corresponds to a request to capture media corresponding to at least a portion of a field of view of at least one of the first camera and the second camera; means for, in response to detecting the first input, capturing a media item corresponding to at least a portion of the field of view of at least one of the first camera and the second camera, wherein capturing the media item includes capturing first data from the first camera and second data from the second camera; means for, subsequent to capturing the media item, displaying, via the display generation component, a selectable user interface object for editing the media item; means for, detecting, via the one or more input devices, a second input directed to the selectable user interface object; means for, in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and means for, detecting, via the one or more input devices, a third input directed to the camera option selectable user interface object; and means for, in response to detecting the third input: ceasing to display the first representation of the media item that is based primarily on the first data from the first camera; and displaying the second representation of the media item that is based primarily on the second data from the second camera.

In some embodiments, a computer program product, comprising one or more programs configured to be executed by one or more processors of a computer system that is in communication with a display generation component, one or more input devices a first camera, and a second camera is described. The one or more programs including instructions for: detecting, via the one or more input devices, a first input that corresponds to a request to capture media corresponding to at least a portion of a field of view of at least one of the first camera and the second camera; in response to detecting the first input, capturing a media item corresponding to at least a portion of the field of view of at least one of the first camera and the second camera, wherein capturing the media item includes capturing first data from the first camera and second data from the second camera; subsequent to capturing the media item, displaying, via the display generation component, a selectable user interface object for editing the media item; detecting, via the one or more input devices, a second input directed to the selectable user interface object; in response to detecting the second input directed to the selectable user interface object, displaying an editing user interface that includes a first representation of the media item based primarily on the first data from the first camera and a camera option selectable user interface object for displaying a second representation of the media item that is based primarily on the second data from the second camera; and detecting, via the one or more input devices, a third input directed to the camera option selectable user interface object; and in response to detecting the third input: ceasing to display the first representation of the media item that is based primarily on the first data from the first camera; and displaying the second representation of the media item that is based primarily on the second data from the second camera.

In some embodiments, an exemplary method is described. The method is performed at a computer system that is in communication with a display generation component, one or more input devices and a plurality of cameras that includes at least three cameras. The method includes: detecting, via the one or more input devices, an input directed to capturing a media item; in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

In some embodiments, an exemplary non-transitory computer-readable storage medium storing one or more programs configured to be executed by one or more processors of a computer system that is in communication with a display generation component, one or more input devices and a plurality of cameras that includes at least three cameras is described. The programs including instructions for: detecting, via the one or more input devices, an input directed to capturing a media item; in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

In some embodiments, an exemplary transitory computer-readable storage medium storing one or more programs configured to be executed by one or more processors of a computer system that is in communication with a display generation component, one or more input devices and a plurality of cameras that includes at least three cameras is described. The programs including instructions for: detecting, via the one or more input devices, an input directed to capturing a media item; in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

In some embodiments, a computer system that configured to communicate with a display generation component, one or more input devices and a plurality of cameras that includes at least three cameras is described. The computer system includes one or more processors and memory storing one or more programs configured to be executed by the one or more processors. The one or more programs including instructions for: detecting, via the one or more input devices, an input directed to capturing a media item; in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

In some embodiments, a computer system that configured to communicate with a display generation component, one or more input devices and a plurality of cameras that includes at least three cameras is described. The computer system includes: means for, detecting, via the one or more input devices, an input directed to capturing a media item; means for, in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

In some embodiments, a computer program product, comprising one or more programs configured to be executed by one or more processors of a computer system that is in communication with a display generation component and one or more input devices is described. The one or more programs including instructions for: detecting, via the one or more input devices, an input directed to capturing a media item; in response to detecting the input directed to capturing the media item: in accordance with a determination that a first set of context criteria are met, capturing the media item using a first subset of cameras of the plurality of cameras, wherein the first subset of cameras includes at least two cameras of the plurality of cameras; and in accordance with a determination that a second set of context criteria are met, wherein the second set of context criteria are different from the first set of context criteria, capturing the media item using a second subset of cameras of the plurality of cameras, wherein the second subset of cameras includes at least two cameras of the plurality of cameras, and wherein the first subset of cameras and the second subset of cameras are different.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for capturing and/or editing media items that can correspond to multiple media types and/or multiple cameras, thereby increasing the effectiveness, efficiency, and user satisfaction with such devices. Such methods and interfaces may complement or replace other methods for capturing and/or editing media items that can correspond to multiple media types and/or multiple cameras.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 8 is a flow diagram of a method for capturing and/or editing media that was captured using multiple different cameras.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for capturing and/or editing media items that can correspond to multiple media types and/or multiple cameras. In particular, there is a need for electronic devices for capturing and/or editing media that can be presented as multiple different media types, for capturing and/or editing media that was captured using multiple different cameras, and/or for selecting a subset of cameras with which to capture media. Such techniques can reduce the cognitive burden on a user who capturing and/or editing media items that can correspond to multiple media types and/or multiple cameras, thereby enhancing productivity. Further, such techniques can reduce processor and battery power otherwise wasted on redundant user inputs.

Figure 6A:
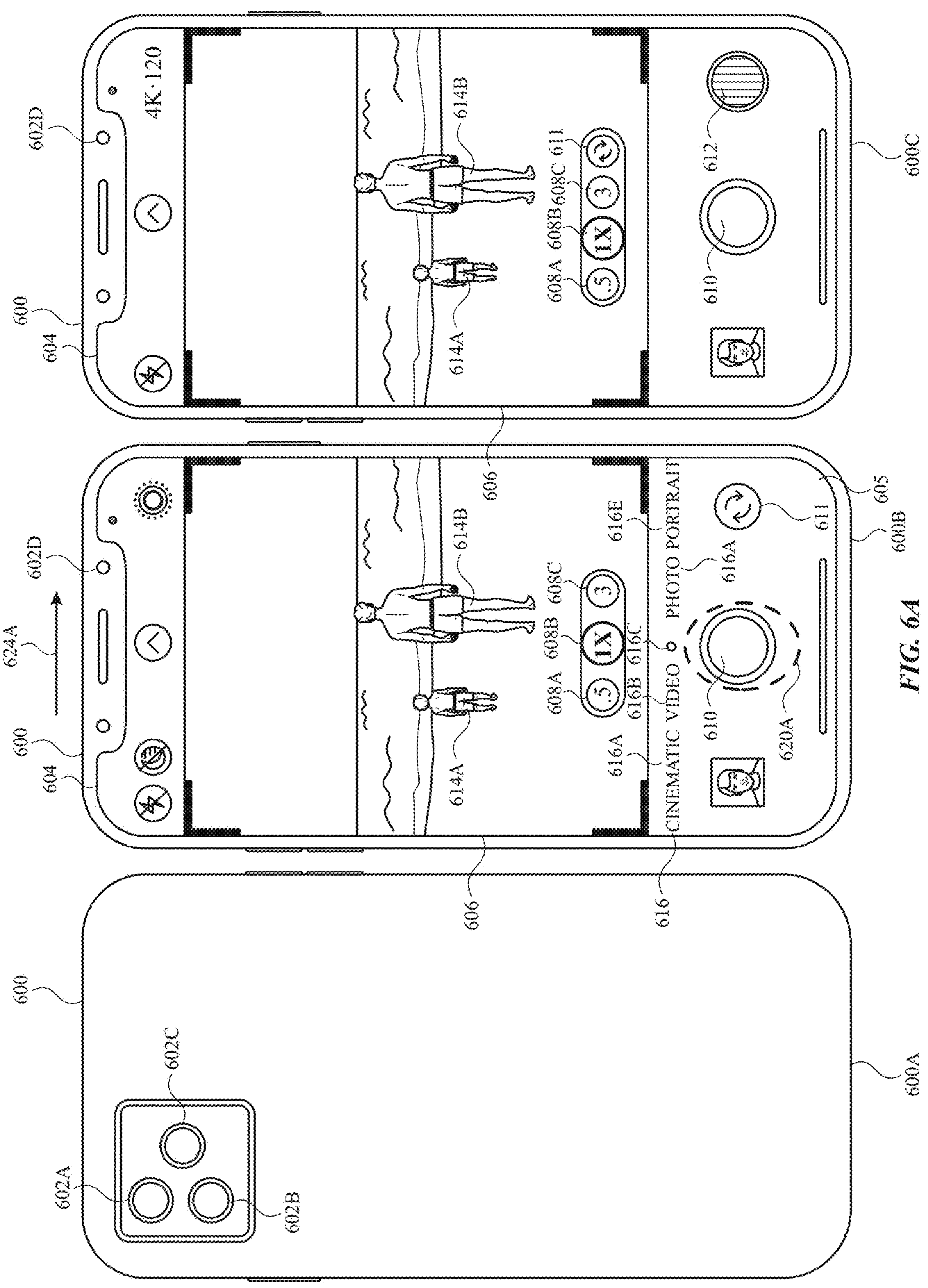
FIGS. 6A-6S illustrate exemplary user interfaces for capturing and/or editing media that can be presented as multiple different media types and/or that was captured using multiple different cameras.
Figure 6S:
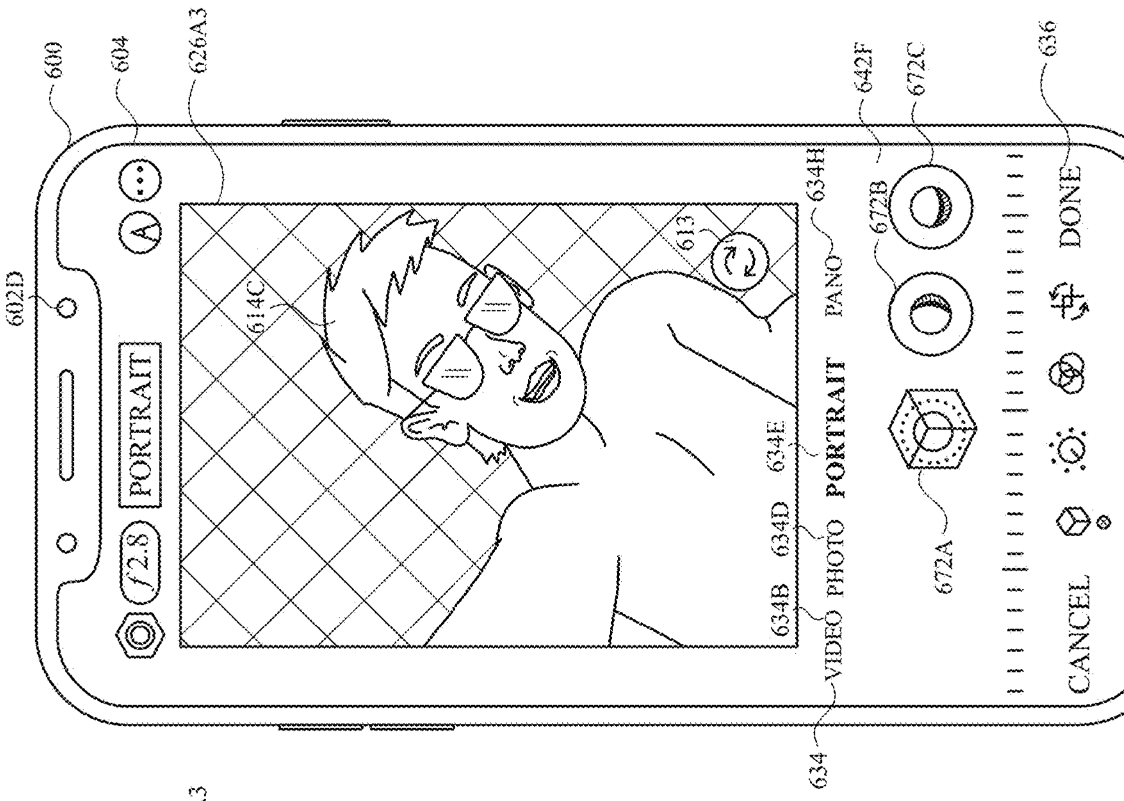
Figure 7:
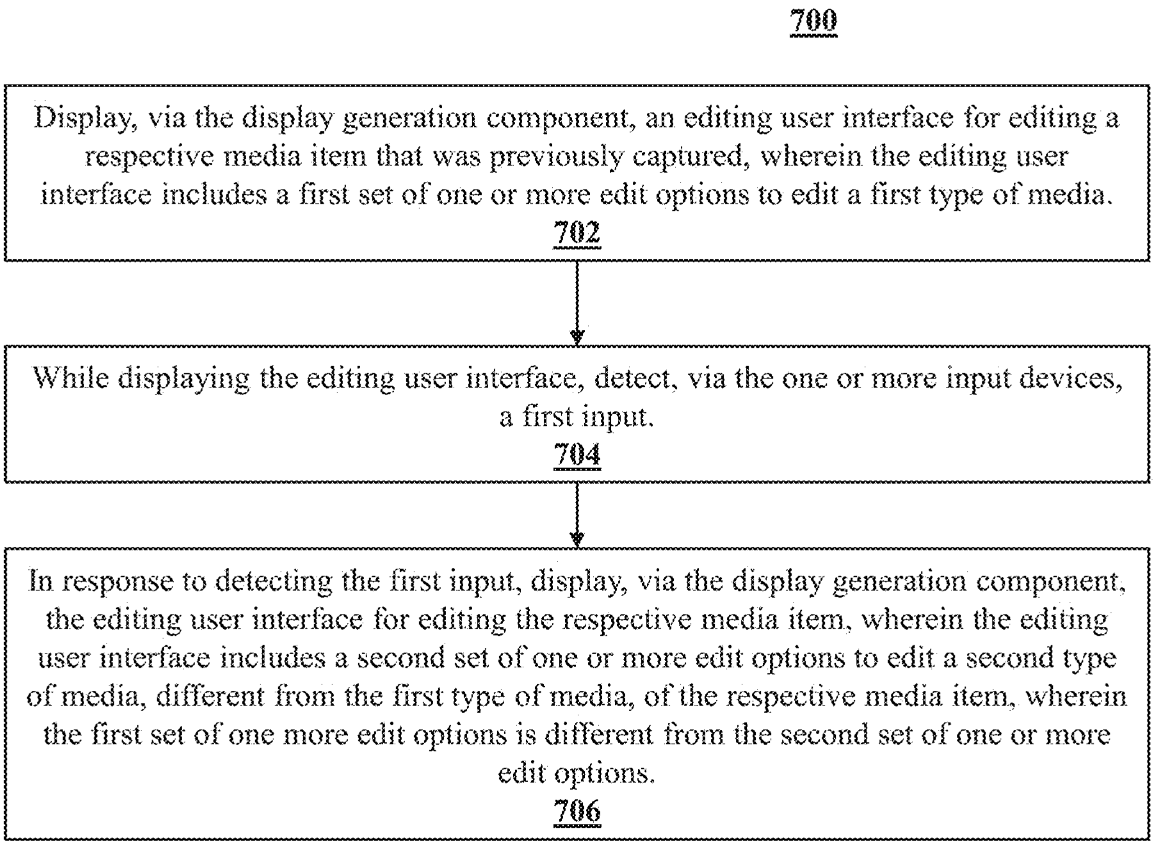
FIG. 7 is a flow diagram of a method for capturing and/or editing media that can be presented as multiple different media types.

Below, FIGS. 1A-1B, 2, 3, 4A-4B, and 5A-5B provide a description of exemplary devices for performing the techniques for capturing and/or editing media items that can correspond to multiple media types and/or multiple cameras. FIGS. 6A-6S illustrate exemplary user interfaces for capturing and/or editing media that can be presented as multiple different media types and/or that was captured using multiple different cameras. FIG. 7 is a flow diagram illustrating methods for capturing and/or editing media that can be presented as multiple different media types in accordance with some embodiments. FIG. 8 is a flow diagram of a method for capturing and/or editing media that was captured using multiple different cameras in accordance with some embodiments. The user interfaces in FIGS. 6A-6S are used to illustrate the processes described below, including the processes in FIGS. 7 and 8. FIGS. 9A-9F illustrate exemplary user interfaces for selecting a subset of cameras with which to capture media. FIG. 10 is a flow diagram illustrating methods for selecting a subset of cameras with which to capture media in accordance with some embodiments. The user interfaces in FIGS. 9A-9F are used to illustrate the processes described below, including the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
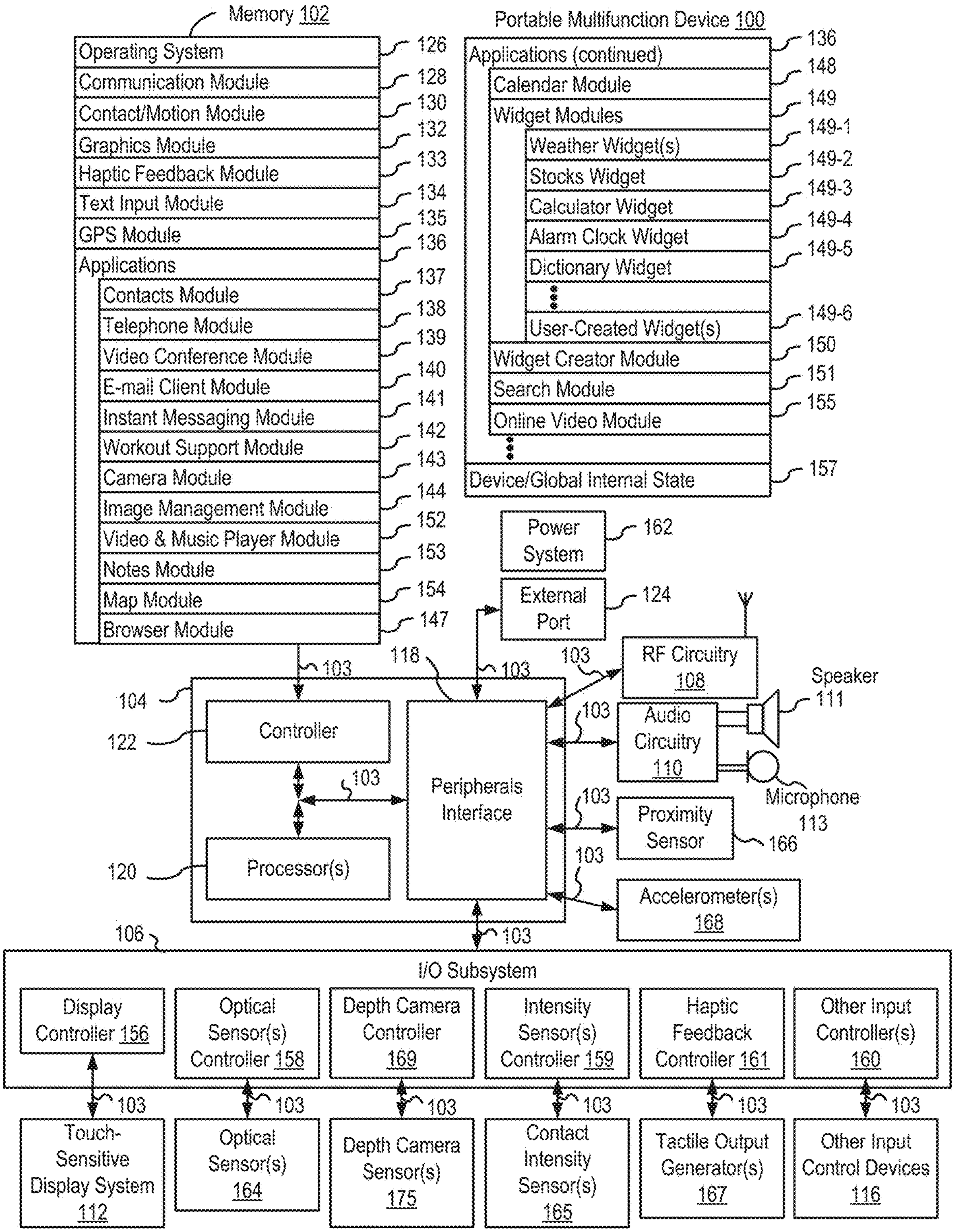
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three-dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "O" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
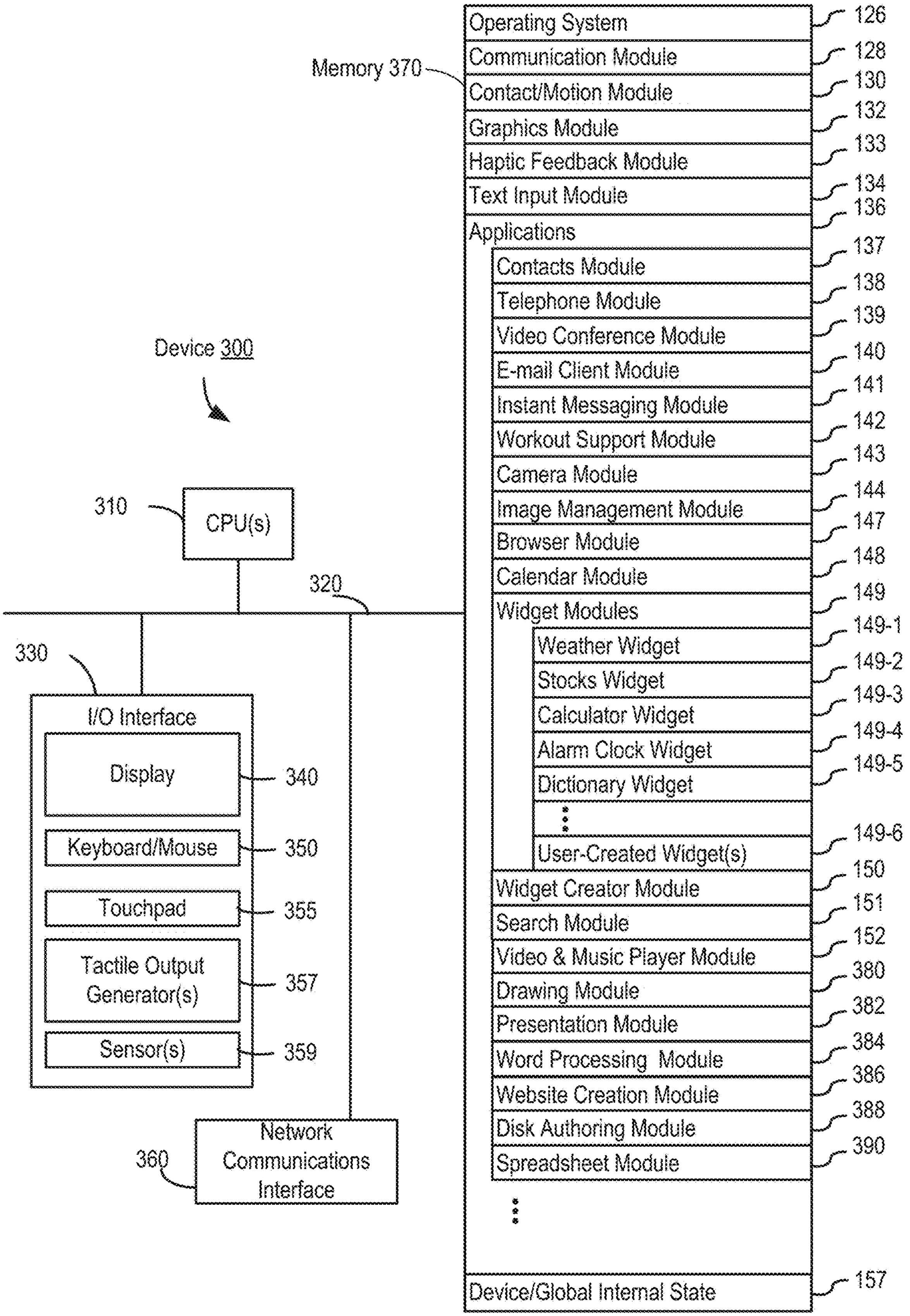
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
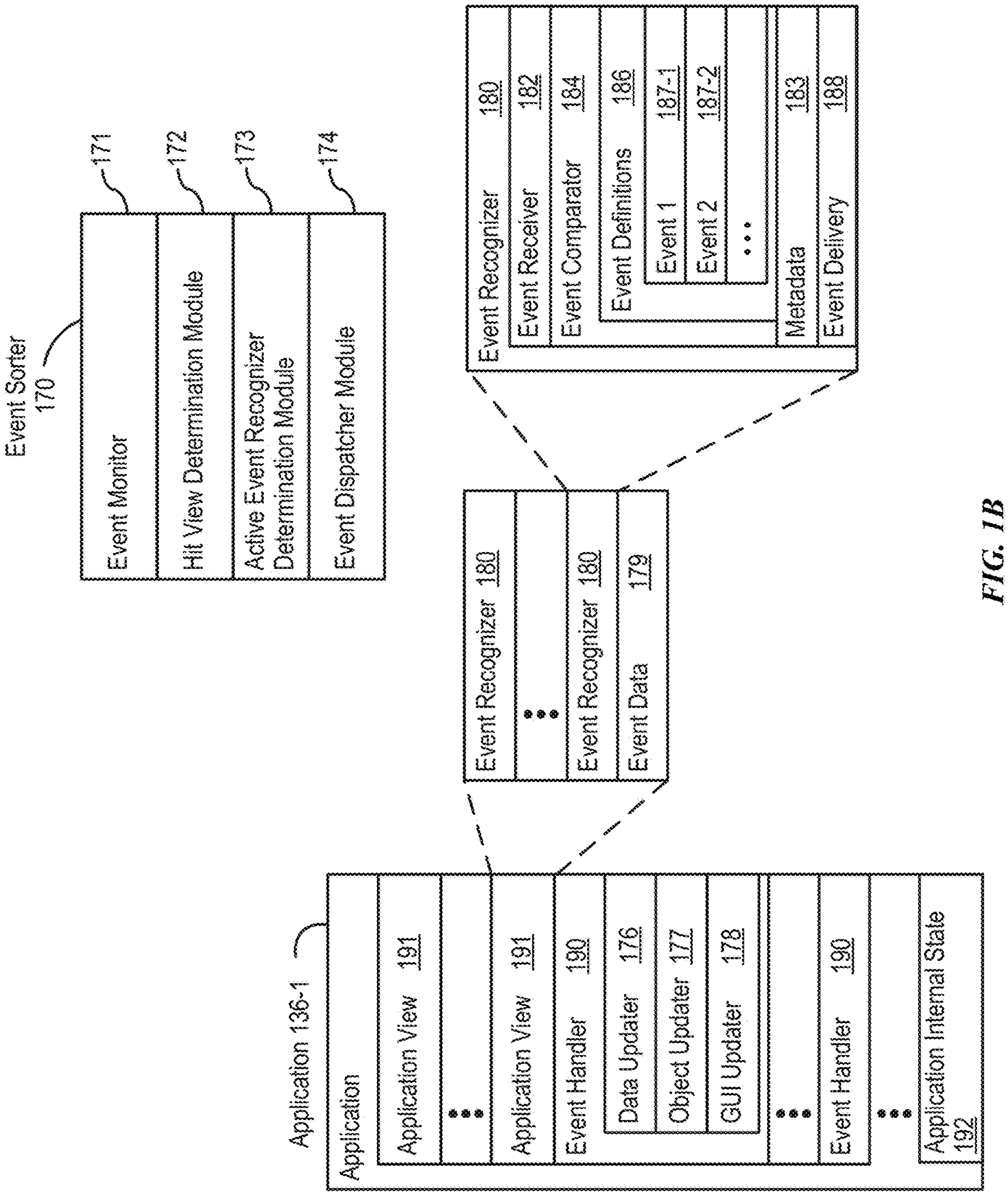
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
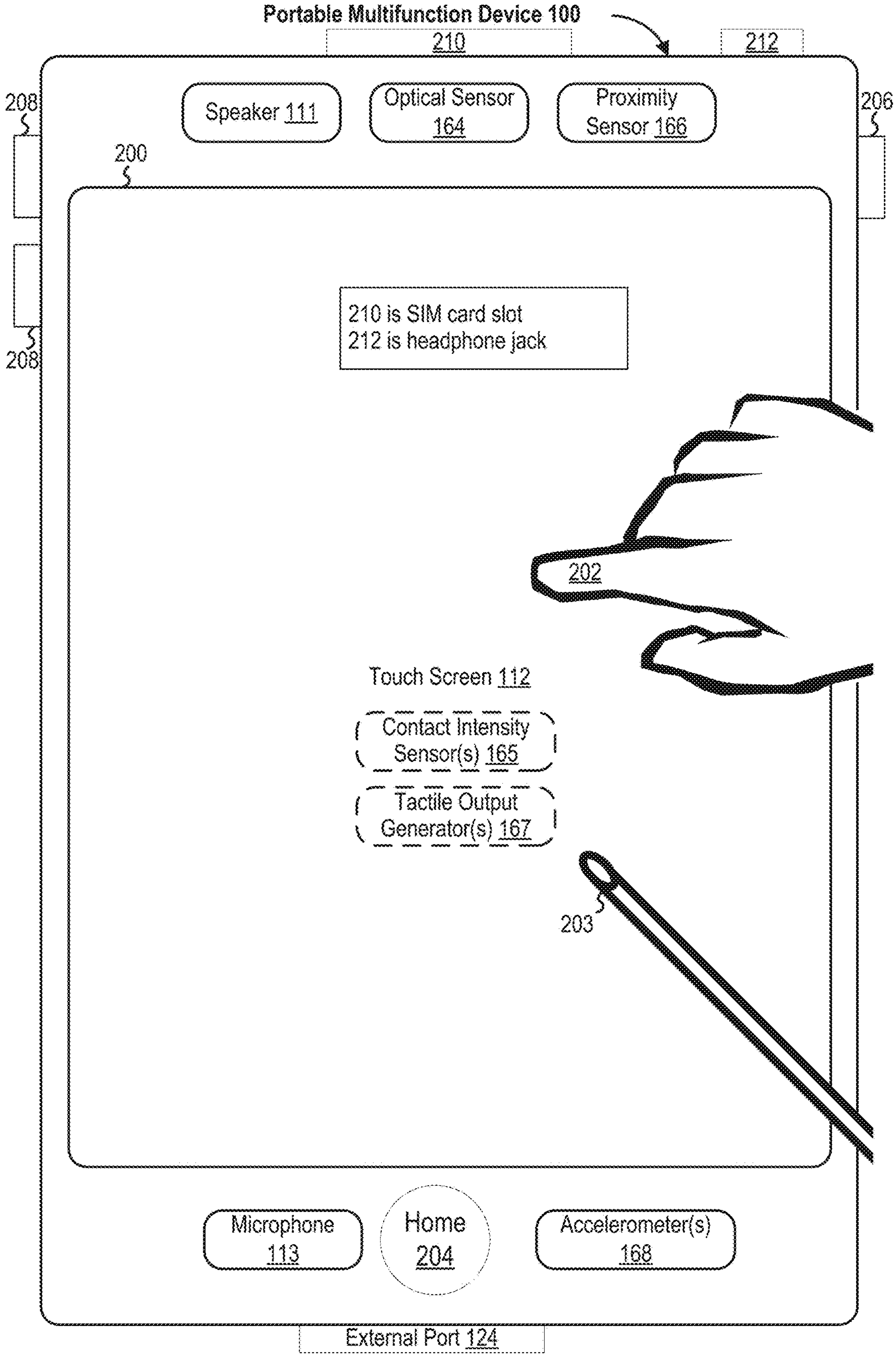
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
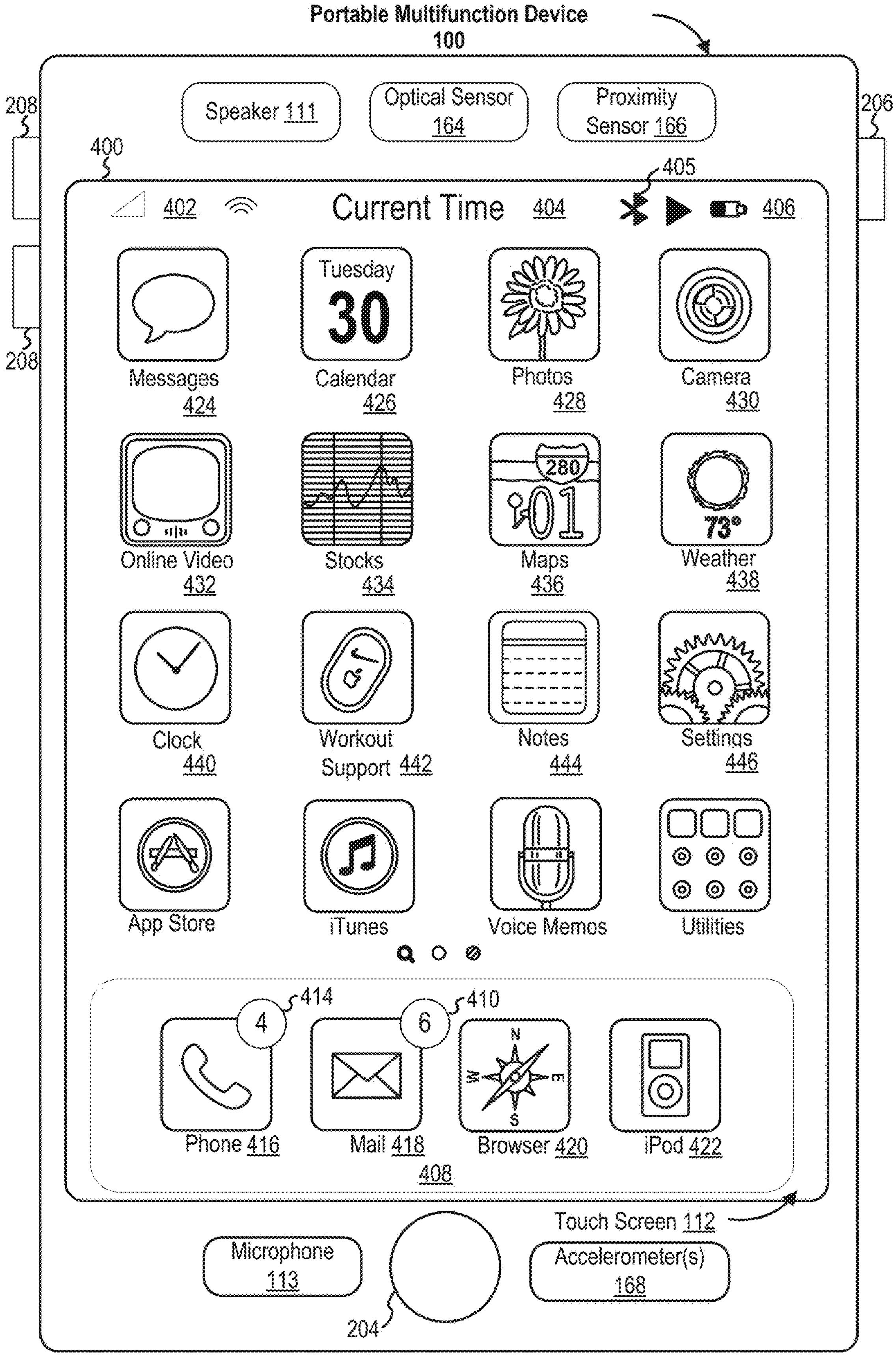
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
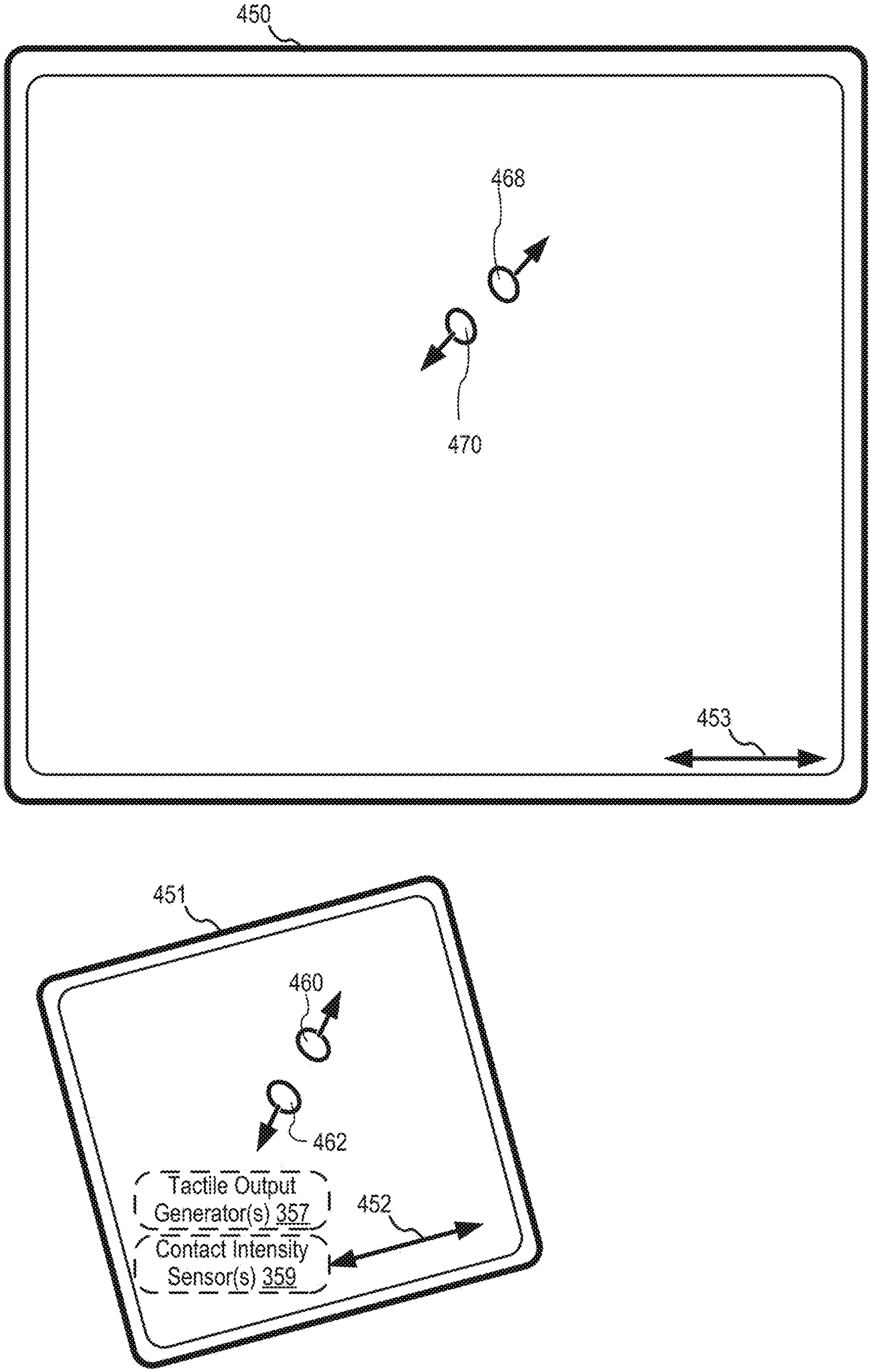
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
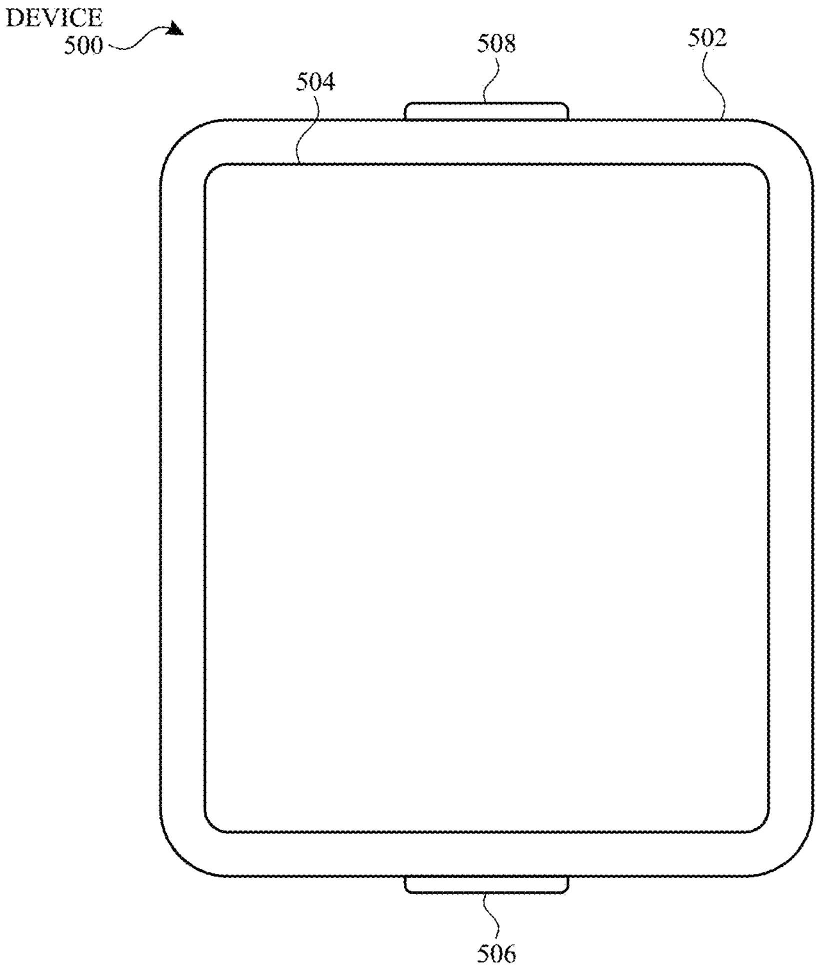
FIG. 5A illustrates a personal electronic device in accordance with some embodiments.
Figure 6C:
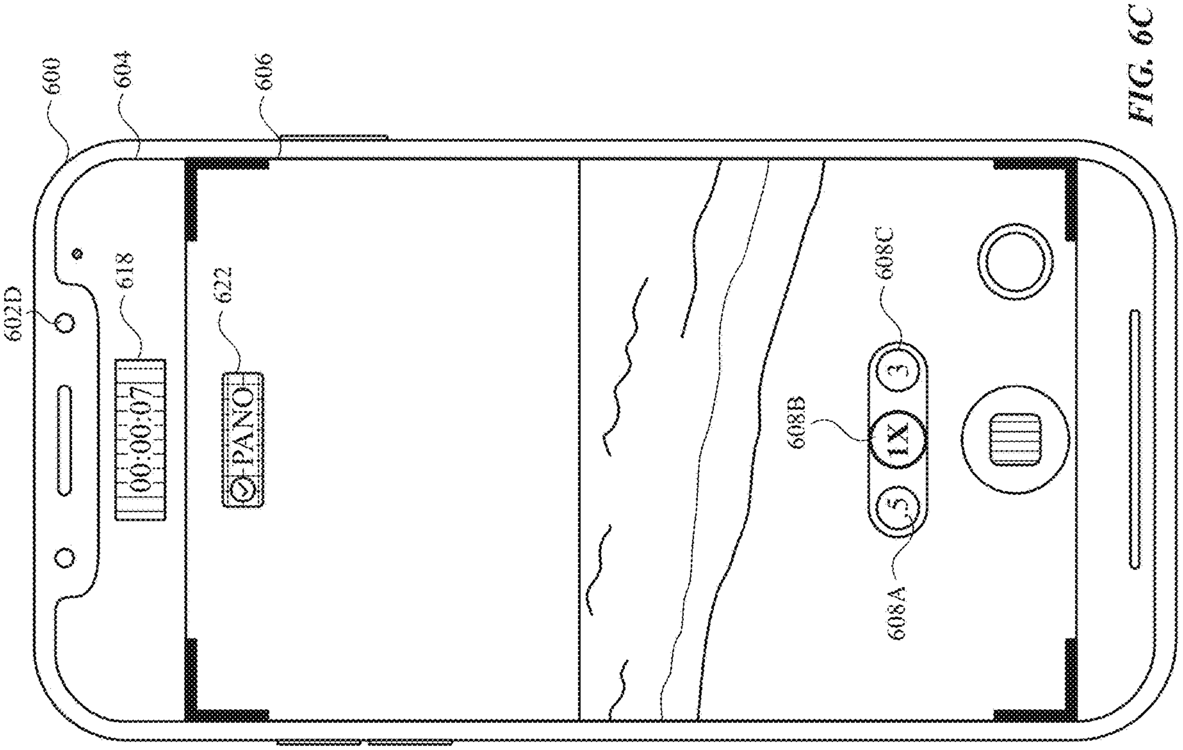

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
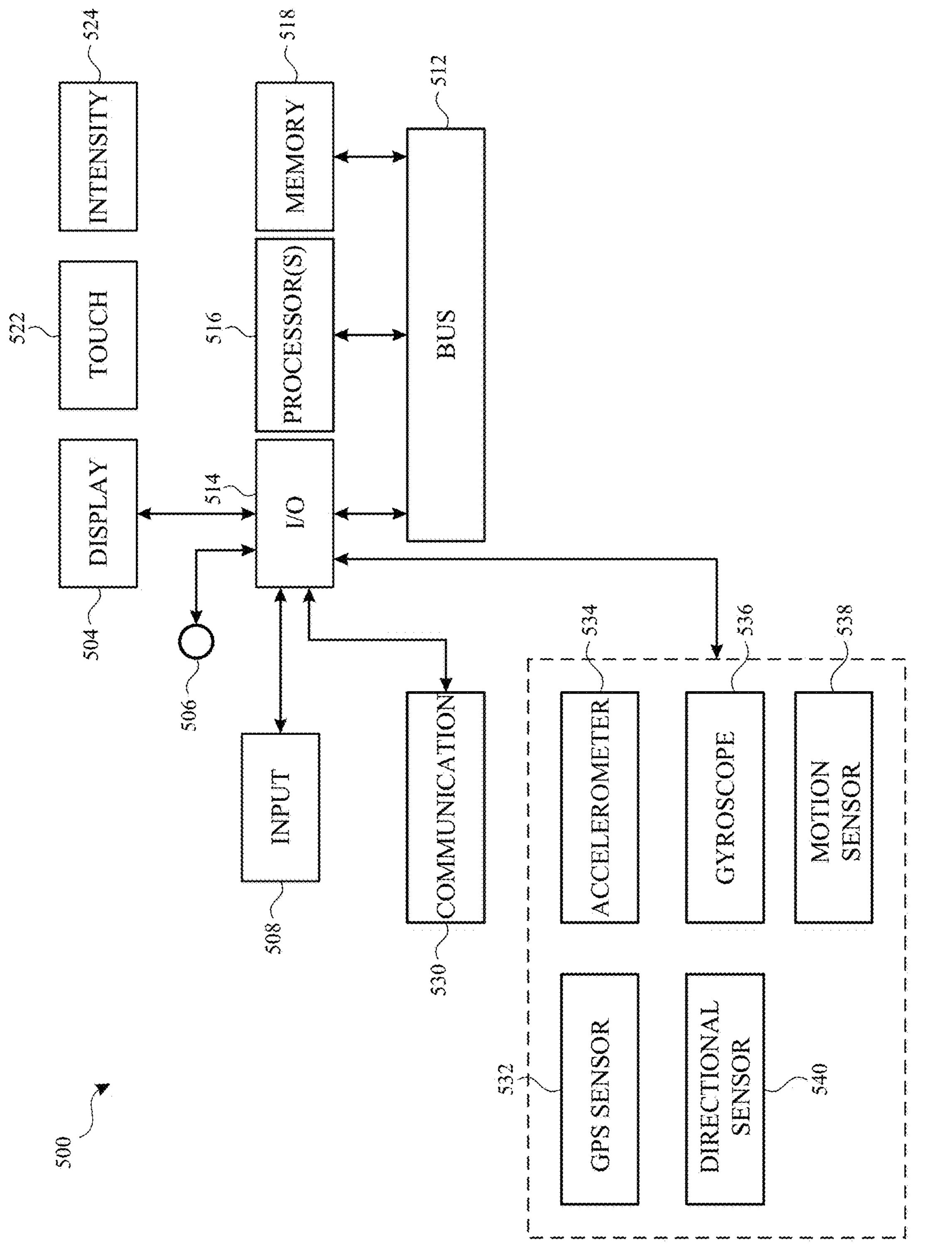
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, and/or 1000 (FIGS. 7, 8, and 10). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for capturing and editing media data, in accordance with some embodiments. The user interfaces in these figures are used to illustrate the processes described below, including the processes of FIGS. 7 and 8.

FIG. 6A depicts three different views (600A, 600B, and 600C) of computer system 600 (e.g., a smartphone, tablet, digital camera, or other computer system). View 600A illustrates the back of computer system 600 and includes cameras 602A, 602B, and 602C. In some embodiments computer system 600 includes fewer than three cameras (e.g., one camera or two cameras). In some embodiments, computer system 600 includes more than three cameras (e.g., four, five, or ten). In some embodiments, computer system 600 includes one or more features of devices 100, 300, and/or 500.

View 600B of FIG. 6A depicts the front of computer system 600. As shown in view 600B, computer system 600 includes front facing camera 602D and display 604, which is a touch-sensitive display. In some embodiments, computer system 600 includes multiple front-facing cameras. Also shown in view 600B, computer system 600 displays camera user interface 605 of a camera application. Camera user interface 605 includes digital viewfinder 606 in a portion of camera user interface 605. In view 600B of FIG. 6A, digital viewfinder 606 displays a preview of data from camera 602B, as computer system 600 is currently configured to capture media using camera 602B. Digital viewfinder 606 includes a representation of first subject 614A and second subject 614B. Digital viewfinder 606 further includes magnification selection graphical objects 608A, 608B, and 608C. Each magnification selection graphical object 608A, 608B, and 608C corresponds to cameras 602A, 602B, and 602C, respectively. Digital viewfinder 606 displays the selected magnification selection graphical object 608B in a larger format than unselected magnification selection graphical objects 608A and 608C. In some embodiments, the magnification selection graphical objects are displayed at the same size. Digital viewfinder 606 further includes camera swap graphical object 611 for switching the camera used in the preview in digital viewfinder 606 from one of the cameras (602A, 602B, or 602C) on the back of computer system 600 to camera 602D on the front of computer system 600, and vice versa.

In view 600B, computer system 600 also displays mode selection menu 616, which includes selectable graphical objects (e.g., 616A, 616B, 616C, 616D, and 616E) corresponding to various selectable camera modes. The selectable graphical objects of camera mode selection menu 616 can be selected to configure computer system 600 to capture media using different camera modes. For example, when computer system 600 detects selection of portrait (e.g., "PORTRAIT") mode graphical object 616E, computer system 600 configures the camera application to capture media with a synthetic depth-of-field effect that can help to emphasize a subject. In view 600B, computer system 600 is currently configured to capture media in a multi-format capture mode, as indicated by multi-format graphical object 616C being centered and emphasized. While the multi-format capture mode is selected, computer system 600 captures sufficient media data for the captured media data to be presented in multiple media types (e.g., photo, video, slow-motion media, variable frame rate media, time-lapse media, portrait media, panoramic media, and/or cinematic media) at a later point (e.g., in an edit mode).

View 600C depicts an alternative view of the front of computer system 600. Unlike view 600B, view 600C does not include camera mode selection menu 616, because computer system 600 in view 600C defaults to capturing data in the multi-format capture mode. In view 600C, computer system 600 captures media data (e.g., photo or video) in the multi-format capture mode when a request to capture media (e.g., a tap or long press on shutter icon 610) is detected. In some embodiments of view 600C, while in the multi-format capture mode, computer system 600 detects input (e.g., a tap or long press) on record button 612 to initiate capture of video data. In view 600C, digital viewfinder 606 further includes camera swap graphical object 611 for switching the camera used in the preview in digital viewfinder 606 from one of the cameras (602A, 602B, or 602C) on the back of computer system 600 to camera 602D on the front of computer system 600, and vice versa.

Returning to view 600B of FIG. 6A, computer system 600 detects input 620A (e.g., long press) and detects lateral movement 624A (e.g., movement of the computer system 600 to the right). In some embodiments, computer system 600 initiates capturing photo data in response to input 620A (e.g., tap or long press) on shutter icon 610. In some embodiments, computer system 600 initiates capturing video data in response to input 620A on shutter icon 610.

Figure 6B:
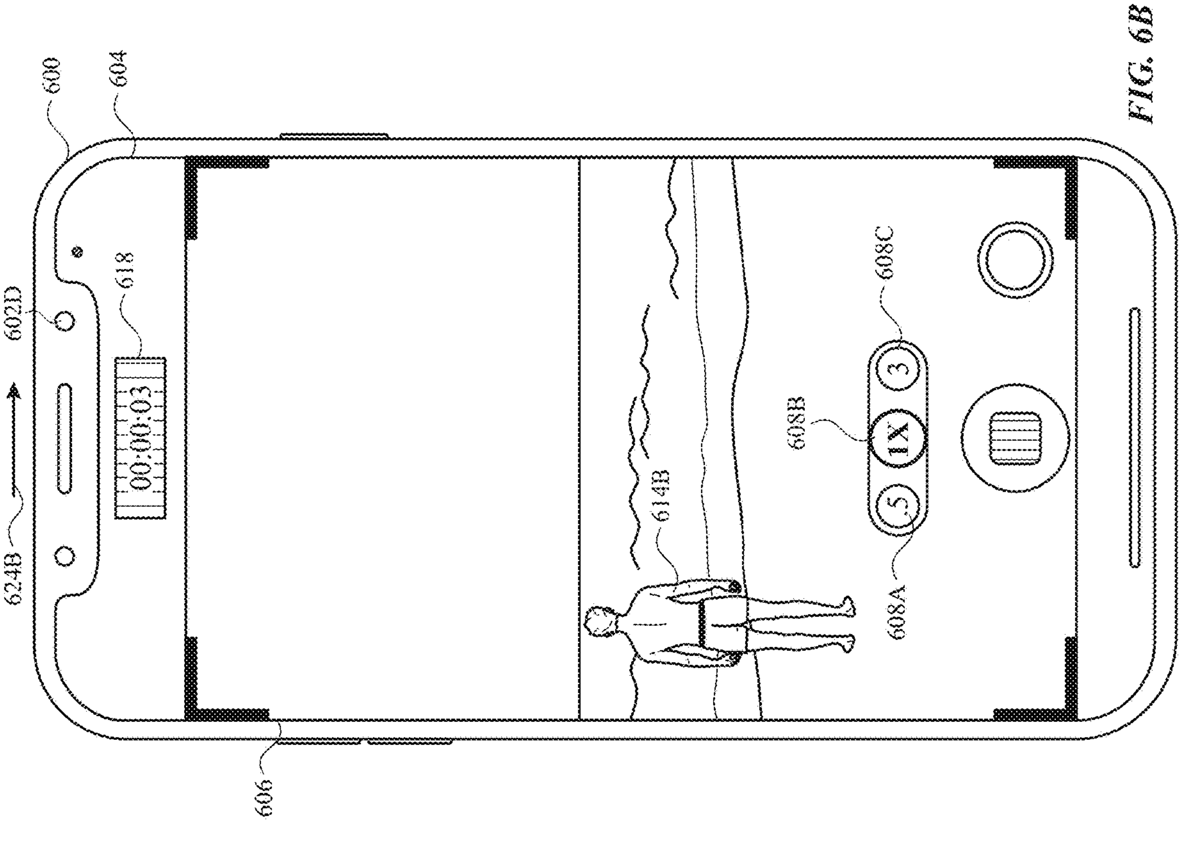
Figure 6E:
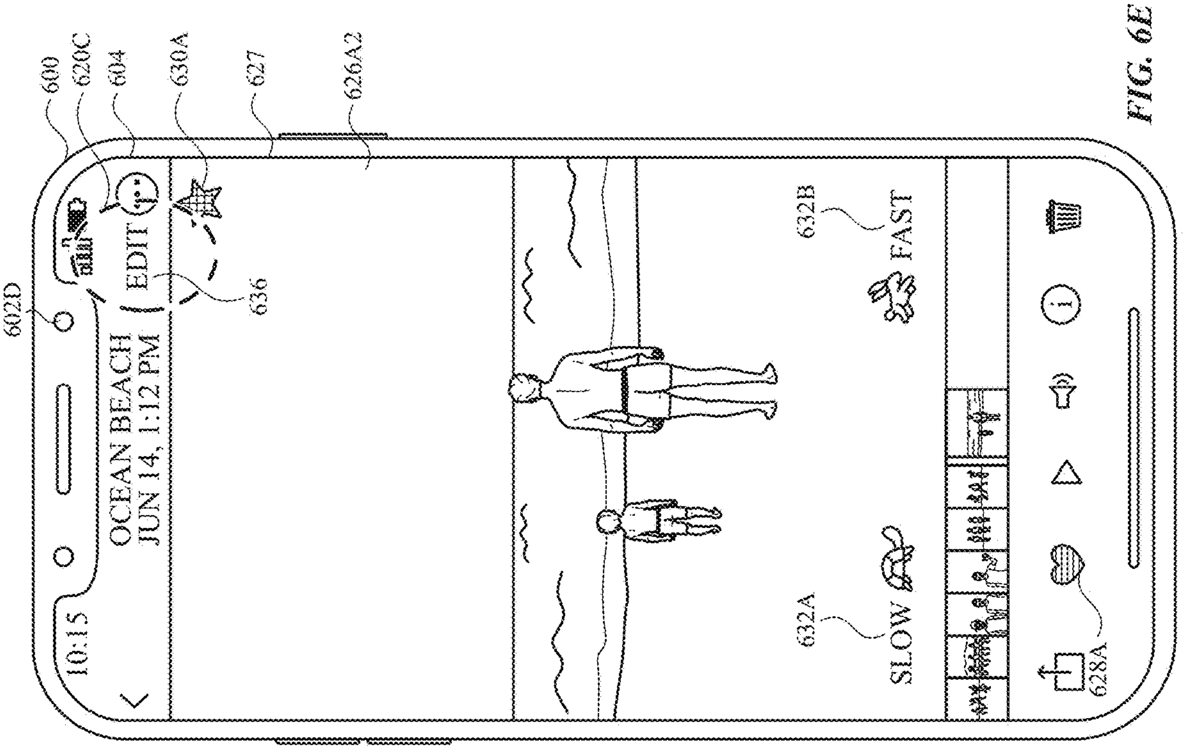

In FIG. 6B, in response to input 620A (e.g., a long press) in FIG. 6A, computer system 600 initiates media data capture, which has progressed for three seconds, as indicated by time indicator 618. Further, as a result of lateral movement input 624A in FIG. 6A, digital viewfinder 606 displays a different view of the environment as compared to view 600B of FIG. 6A, as computer system 600 has been panned to the right (e.g., subject 614B is more towards the left as compared to FIG. 6A and subject 614A is no longer visible). In some embodiments, the movement includes vertical and/or diagonal movement. In FIG. 6B, computer system 600 detects lateral movement input 624B to the right. In some embodiments, computer system 600 detects an input on magnification selection graphical objects 608A and/or 608C to change the preview of media data in digital viewfinder 606 to a representations of media data captured via the respective camera corresponding to magnification selection graphical objects 608A and/or 608C. In some embodiments, camera swap graphical object 611 is displayed in the digital viewfinder 606 during the capturing process. In some embodiments, computer system 600 detects an input on camera swap graphical object 611 to change the preview in digital viewfinder 606 to a representation of media data captured via front facing camera 602D.

In FIG. 6C, in response to lateral movement 624B, computer system 600 updates digital viewfinder 606 and neither first subject 614A nor second subject 614B are visible within digital viewfinder 606. At this point, computer system 600 captured an additional four seconds of video data, as indicated by time indicator 618. Moreover, in response to computer system 600 determining that enough video data has been captured to later display the captured video data in a panoramic mode (e.g., a panoramic photo mode), a panoramic graphical object 622 is displayed on display 604. In some embodiments, computer system 600 does not display panoramic graphical object 622 even though sufficient amount of data has been captured to display the captured video data in a panoramic mode. Panoramic graphical object 622 is visually emphasized within the digital viewfinder. In some embodiment, the visual emphasis includes highlighting, color fill, typeface, and/or a change in size. In some embodiments, panoramic graphical object (e.g., 622) is displayed outside of digital viewfinder 606.

Figure 6D:
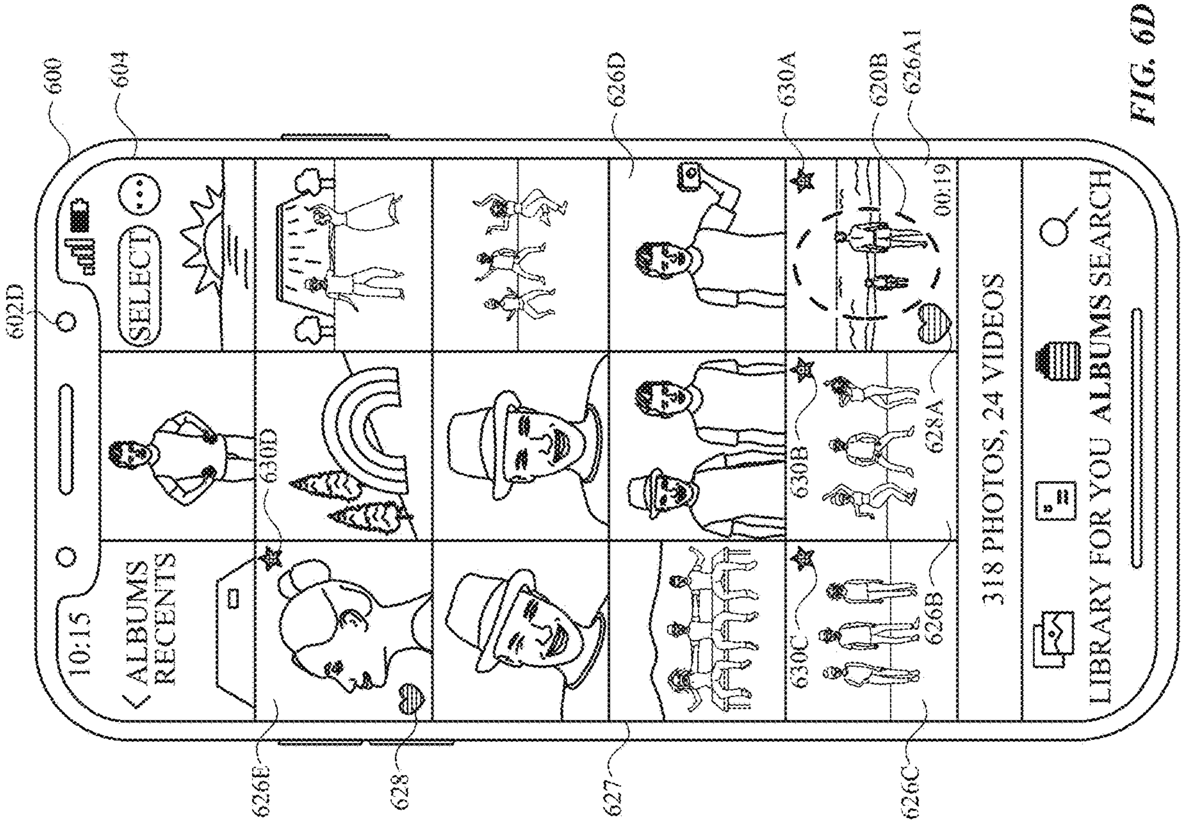

In FIG. 6D, computer system 600 displays gallery user interface 627 for viewing previously captured media data. Computer system 600 displays gallery user interface 627 in response to computer system 600 detecting activation of a photos application associated with computer system 600. Gallery user interface 627 includes chronologically organized thumbnail representations of previously captured media items (e.g., photos and/or videos), including first media item representation 626A1 that was captured in FIGS. 6A-6C as well as second media item representation 626B, third media item representation 626C, fourth media item representation 626D, and fifth media item representation 626E, each of which was previously captured (e.g., either via computer system 600 or a different device).

Gallery user interface 627 includes multi-media indicators 630A, 630B, 630C, and 630D for each respective media item that includes sufficient media data for the respective media item to be presented in multiple media types (e.g., photo, video, slow-motion media, variable frame rate media, time-lapse media, portrait media, panoramic media, and/or cinematic media). In some embodiments, even though a respective media item includes sufficient media data for the respective media item to be presented in multiple media types (e.g., photo, video, slow-motion media, variable frame rate media, time-lapse media, portrait media, panoramic media, and/or cinematic media), computer system 600 does not display a corresponding multi-media indicator.

In FIG. 6D, gallery user interface 627 further includes favorite indicator 628A corresponding to first media item representation 626A1 and favorite indicator 628B corresponding to fifth media item representation 626E. Favorite indicators 628A and 628B indicate that the respective media items were previously designated (e.g., via an input) as favorites. In some embodiments, for favorited respective media items, computer system 600 preserves (e.g., not deletes after a predetermined time) additional data that allows the respective media items to be presented in multiple media types. For example, because the fourth media item corresponding to fourth media item representation 626D was not favorited, even though fourth media item was captured with additional data that allowed for fourth media item to be presented in multiple media types, computer system 600 deleted the additional data that allowed for fourth media item to be presented in multiple media types, after a period of time. This is exemplified by the fact that fourth media item representation 626D lacks a multi-media indicator, even though it is a more recently captured media item than media item 626E. As a result, fourth media item representation 626D does not include a multi-media indicator. In some embodiments, computer system 600 deletes the additional data that allows a respective media item to be presented in multiple media types after a predetermined period of time. In some embodiments, computer system 600 deletes the additional data that allows a respective media item to be presented in multiple media types when storage capacity on computer system 600 decreases below a threshold amount.

FIG. 6D further depicts that, because sufficient time has not passed since the second media item corresponding to second media item representation 626B and the third media item corresponding to third media item representation 626C were captured, while not favorited, second media item and third media item still retain additional data that allows them to be presented in multiple media types. However, because the fifth media item that corresponds to fifth media item representation 626E was previously favorited, as indicated via favorite indicator 628B, even though the fifth media item was captured prior to the third media item and the fourth media item, computer system 600 preserved the additional data that allows for the fifth media item to be presented in multiple media types. Accordingly, fifth media item representation 626E includes multi-media indicator 630D. In some embodiments, computer system 600 preserves (e.g., saves and/or does not delete) the additional data that allows for a respective media item to be presented in multiple media types and also does not display a respective multi-media indicator corresponding to the respective media item. In some embodiments, even though a respective media item is favorited, computer system 600 deletes the additional data that allows for a respective media item to be presented in multiple media types after a second set of delete conditions are met. For example, in a situation where the first set of delete conditions is a week after capture, computer system 600 would delete additional data corresponding to unfavorited media item a week after capture, but retain the additional data for favorited media items past the week threshold. However, if the second delete condition was set to a month threshold, computer system 600 would delete the additional data corresponding to favorited media item a month after capture. In FIG. 6D, computer system 600 detects input 620B (e.g., a tap or long press) on first media item representation 626A1.

In response to input 620B, in FIG. 6E computer system 600 displays gallery user interface 627 that includes first media item representation 626A2, which is a larger representation of first media item representation 626A1. Gallery user interface 627 includes multi-media indicator 630A, because the first media item corresponding to first media item representation 626A2 includes additional data that allows for the first media item to be presented in multiple media types.

Gallery user interface 627 further includes edit graphical objects 632A and 632B displayed concurrently with first media item representation 626A2. In response to detecting activation of edit graphical object 632A, computer system 600 applies a slow loop effect to the first media item to provide a slower version of video data corresponding to first media item. Alternatively, in response to detecting activation of quick edit graphical object 632B, computer system 600 applies a quick loop effect to first media item to provide a faster version of media data corresponding to first media item. In some embodiments, additional edit graphical objects will include a loop effect, a bounce effect, and/or a long exposure effect, all of which can be applied to the first media item. Accordingly, the first media item can be edited while in gallery user interface 627 without entering a respective editing user interface, as shown in FIG. 6F, or needing to go into any submenus in gallery user interface 627. In some embodiments, computer system 600 detects an input on favorite indicator 628A to change the favorite status (e.g., make favorite or unfavorited) of the first media item. In FIG. 6E, computer system 600 detects input 620C (e.g., a tap or long press) on edit graphical object 636 to enter an editing user interface.

In FIG. 6F, in response to input 620C, computer system 600 displays video editing user interface 642A including first media item representation 626A3. Because the first media item includes additional data that allows for the first media item to be presented in multiple media types, video editing user interface 642A includes edit selection menu 634, which includes selectable graphical objects (e.g., 634A, 634B, 634D, 634E, and/or 634F) corresponding to various selectable media edit modes. Each respective selectable graphical object displayed within edit selection menu 634 can be selected to change the media edit type (e.g., photo, video, slow-motion media, variable frame rate media, time-lapse media, portrait media, panoramic media, and/or cinematic media) for the first media item. Computer system 600 displays the currently active media mode in a central position within edit selection menu 634. In some embodiments, computer system 600 does not displays the currently active media mode in a central position within edit selection menu 634. In some embodiments, edit selection menu 634 is similar to camera mode selection menu 616, described in FIG. 6A (e.g., includes objects with similar functions as described for camera mode selection menu 616).

In FIG. 6F, computer system 600 displays video (e.g., "VIDEO") mode graphical object 634B in the central position within edit selection menu 634. Because video edit mode is currently active, video editing user interface 642A includes editing options corresponding to the video media type including filmstrip 640. Filmstrip 640 includes representations 641 of the first media item over time. Video Editing user interface 642A further includes completion button 638. In response to detecting activation of completion button 638, computer system 600 saves (e.g., preserves and/or does not delete) any edits made to the first item. In FIG. 6F, because no edits have yet been made to the first item, completion button 638 is disabled and, consequently, visually distinguished (e.g., grayed out or made translucent) to signify that it is not selectable.

In some embodiments, when a respective media item (e.g., the media item that corresponds to fourth media item representation 626D) does not include additional data that allows for the respective media item to be presented in multiple media types (e.g., computer system 600 deleted the additional data or the respective media item was not initially captured while in the multi-media capture mode), computer system 600 would not display edit selection menu 634 within the video editing user interface 642A. Instead, a respective set of edit options for the respective media type for the respective media item would be displayed within video editing user interface 642A without edit selection menu 634. In FIG. 6F, computer system 600 detects input (e.g., tap or long press) 620E on cinematic (e.g., "CINEMETIC") mode and input 620D (e.g., tap or long press) on slo-mo (e.g., "SLO-MO" (e.g., a slow motion capture mode)) mode graphical object 634F.

Figure 6G:
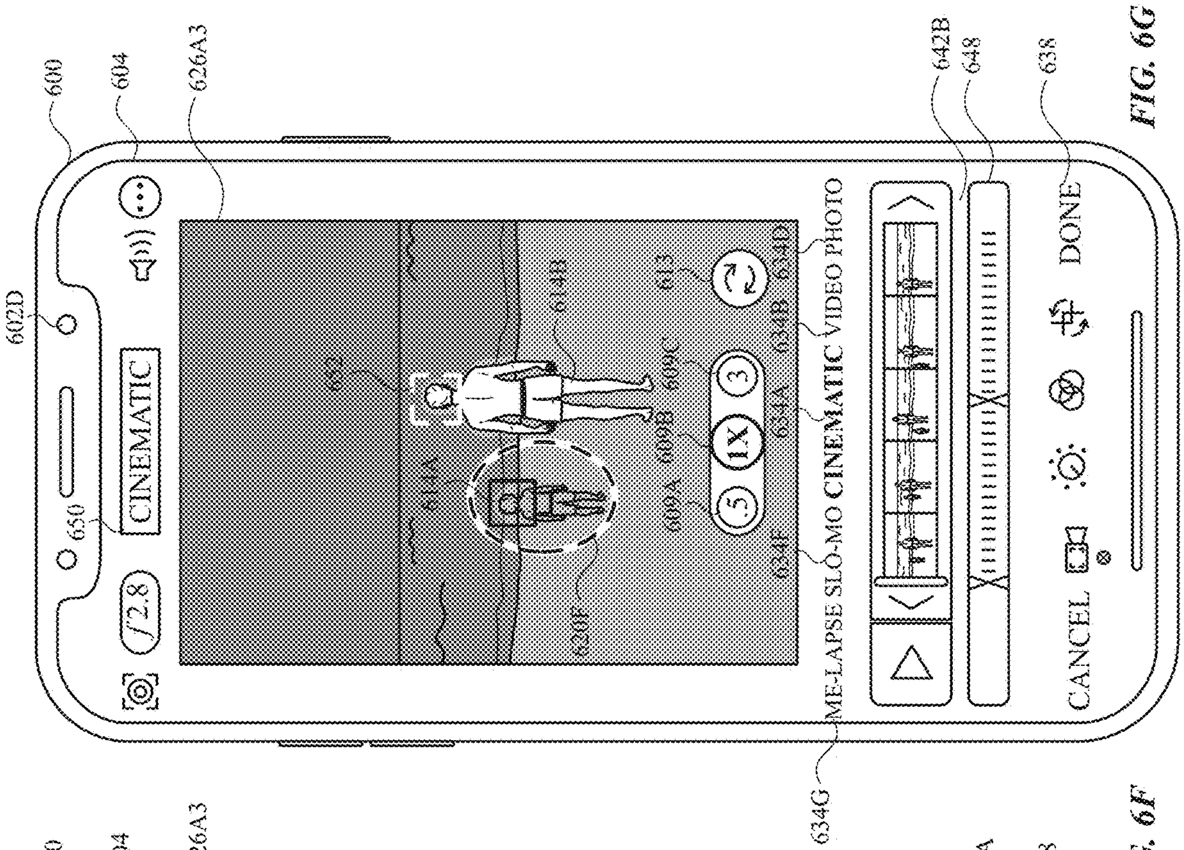
Figure 6F:
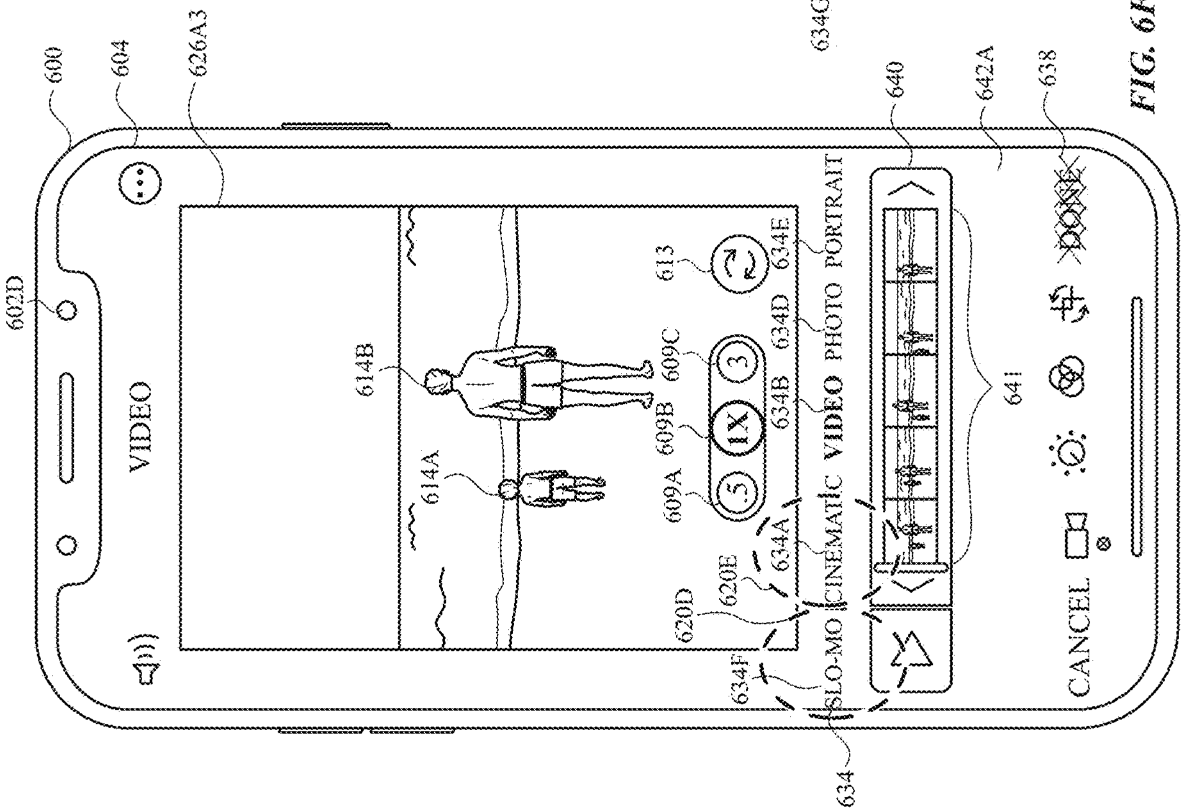
Figure 6I:
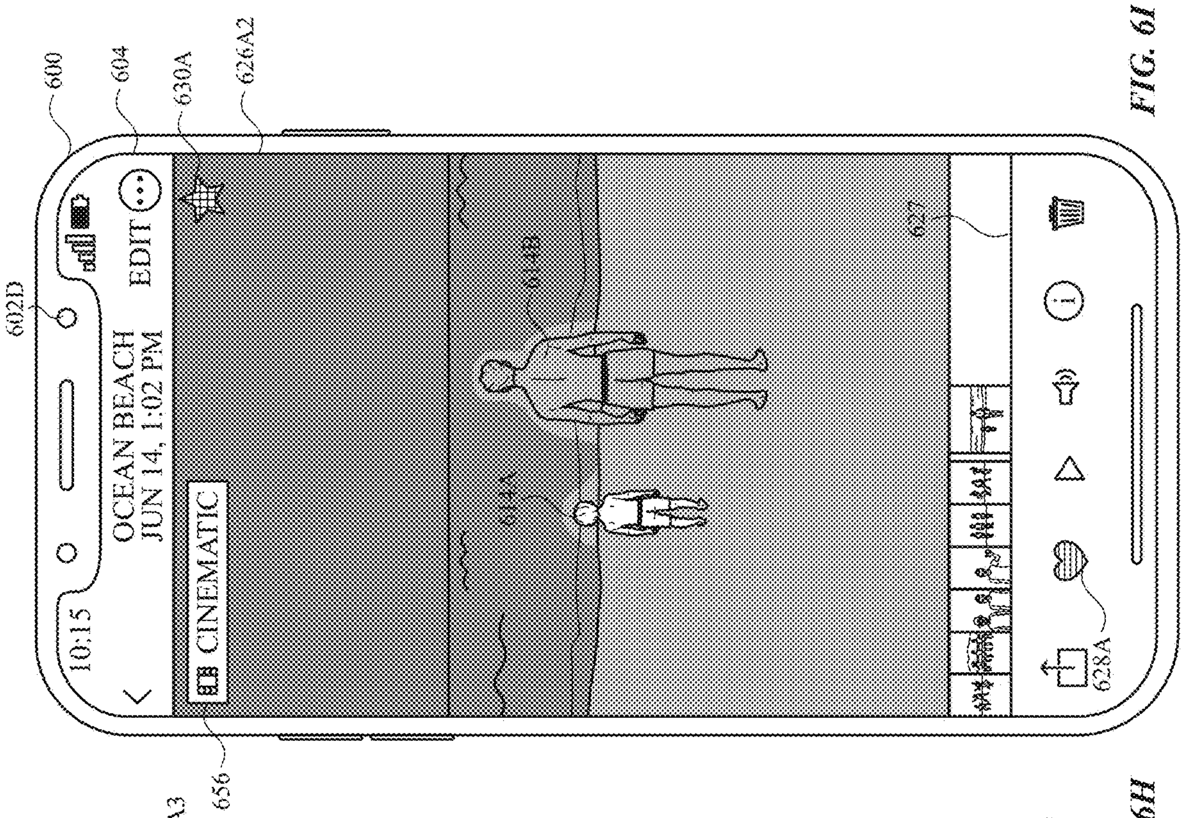

In FIG. 6G, in response to input 620E, computer system 600 displays cinematic editing user interface 642B for the cinematic media data type. Thus, in response to input 620E, computer system 600 transitions from displaying video editing user interface 642A in FIG. 6F for a video data type to cinematic editing user interface 642B in FIG. 6G for a cinematic data type. While in the cinematic editing user interface 642B for the cinematic media data type, a synthetic depth-of-field effect is applied to first media item representation 626A3 automatically (e.g., not in response to one or more inputs) and/or in response to a user input. When the synthetic depth-of-field effect is applied automatically, computer system 600 makes one or more determinations based on a set of criteria to determine how the synthetic depth-of-field effect is applied and applies the synthetic depth-of-field effect (e.g., without detecting an input to apply the synthetic depth-of-field effect). When the synthetic depth-of-field effect is applied in response to a user input, computer system 600 detects an input and applies the synthetic depth-of-field effect based on the type of input that was detected. In some embodiments, first media item representation 626A3 corresponds to a representation of a video media type that includes synthetic depth-of-field data.

Cinematic editing user interface 642B further includes cinematic media data indicator 650 to signify that the cinematic media edit mode is active and first media item representation 626A3. In some embodiments, a different media data indicators is displayed for different media edit modes (e.g., "video" is displayed for video edit mode, and/or "portrait" is displayed for portrait edit mode). Because the video data type for the first media item changed from video data type to cinematic data type, computer system 600 displays completion button 638 as selectable (e.g., not grayed out or otherwise visually indicated as available for input). At this point, computer system 600 can detect an input on completion button 638 and save the first media item as a cinematic media item instead of a video item.

While in the edit mode for a cinematic media data type, computer system 600 can detect an input to change a synthetic depth-of-field effect in the media item. In FIG. 6G, cinematic editing user interface 642B further includes focus bar 648 that depicts various focus transitions for the first media item. First media item representation 626A3 depicts second subject 614B in focus, as indicated via focus indicator 652. The background of first media item representation 626A3, including first subject 614A, is not in focus (e.g., blurry, hazy, and/or dim). In FIG. 6G, computer system 600 detects input 620F (e.g., a tap or long press) on first subject 614A to change focus.

Figure 6H:
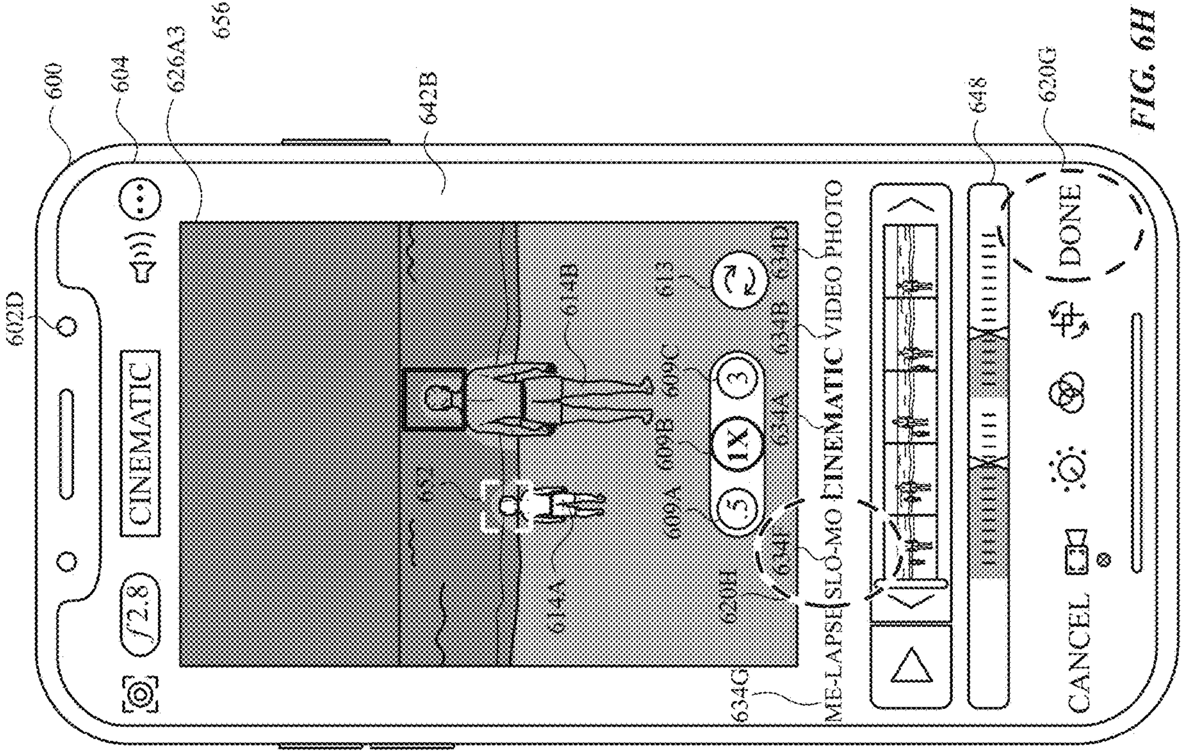
Figure 6K:
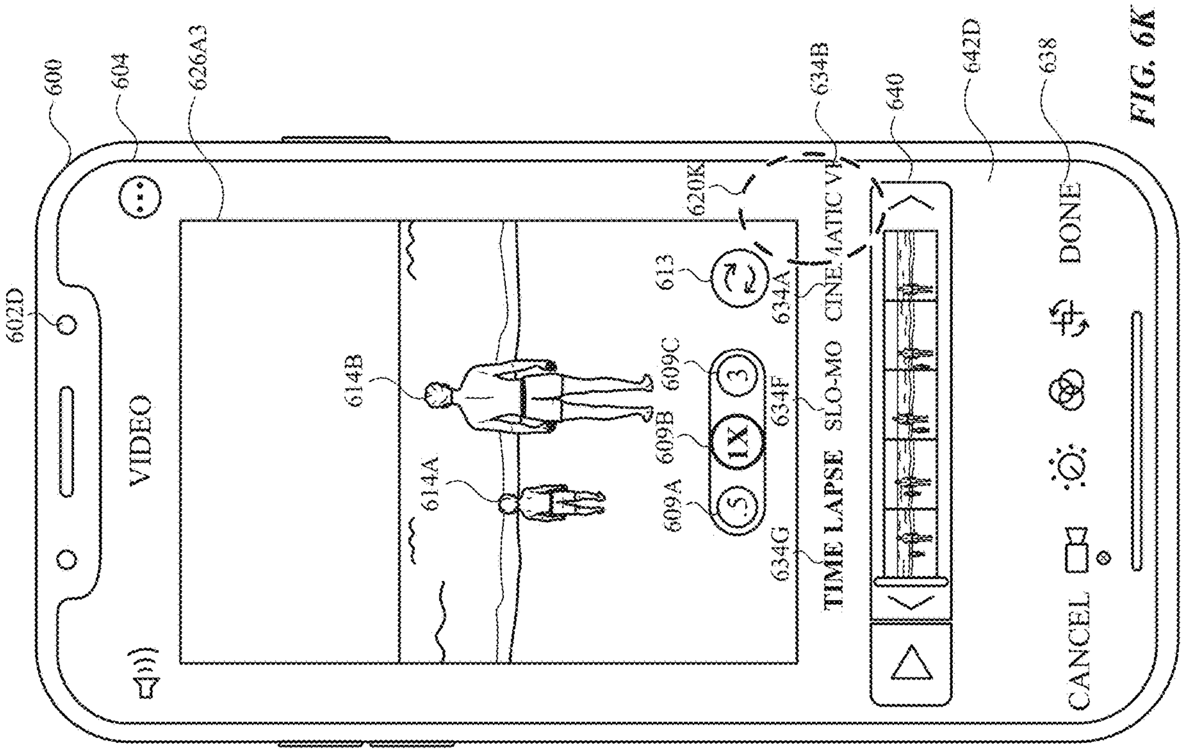

In FIG. 6H, in response to detecting input 620F, computer system 600 changes the focus within first media item representation 626A3. Specifically, computer system 600 blurs out the foreground of first media item representation 626A3 including second subject 614B and brings part of the background of first media item representation 626A3 including first subject 614B in focus (e.g., unblurs and/or sharpens), as indicated via focus indicator 652. Accordingly, computer system 600 updates focus bar 648 to reflect the changes in the focus of first media item. In FIG. 6G, computer system 600 detects input 620G (e.g., tap or long press) on completion button 638 to save the editing changes and input 620H (e.g., tap or long press) on slo-mo (e.g., "SLO-MO") mode graphical object 634F to change the editing mode to the slo-mo editing mode.

In FIG. 6I, in response to detecting input 620G, computer system 600 redisplays gallery user interface 627. Gallery user interface 627 includes first media item representation 626A2. However, now first media item representation 626A2 reflects the changes to the focus applied to the first media item in FIG. 6H. Because computer system 600 detected input 620G while in an edit mode for a cinematic media data type (e.g., last used edit mode), gallery user interface 627 includes first media item representation 626A2 as a cinematic media data type, as represented via cinematic indicator 656.

Figure 6J:
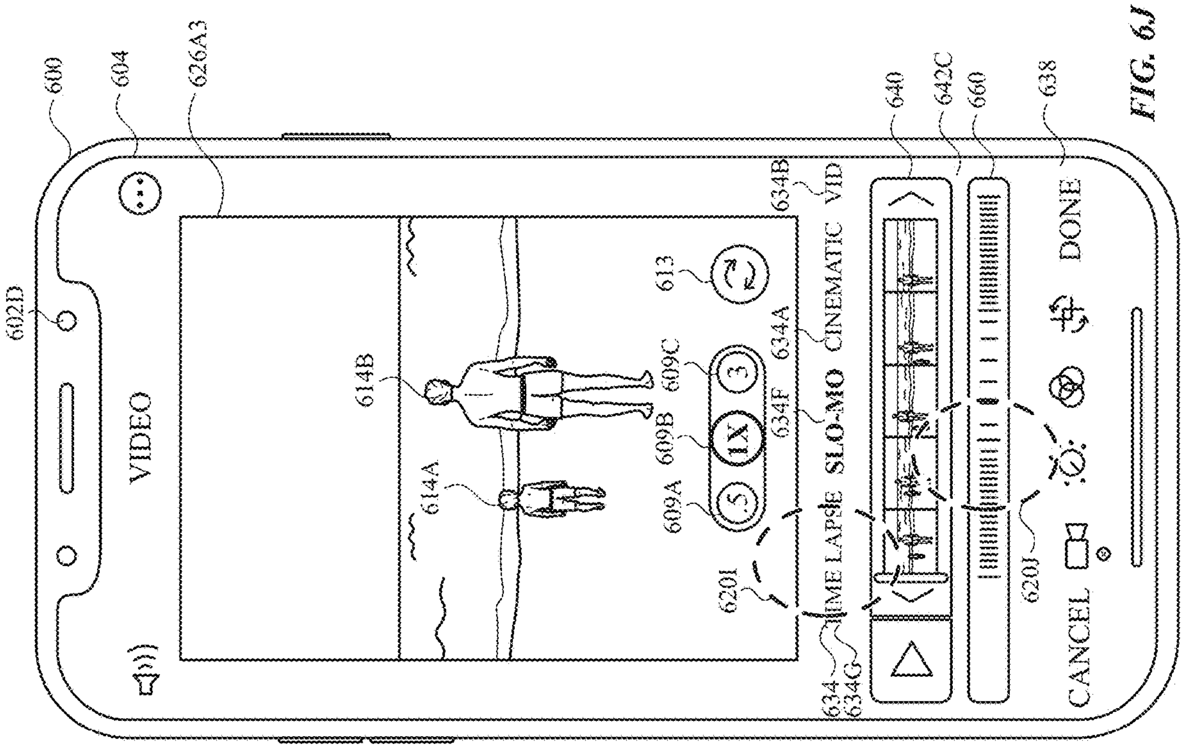
Figure 6M:
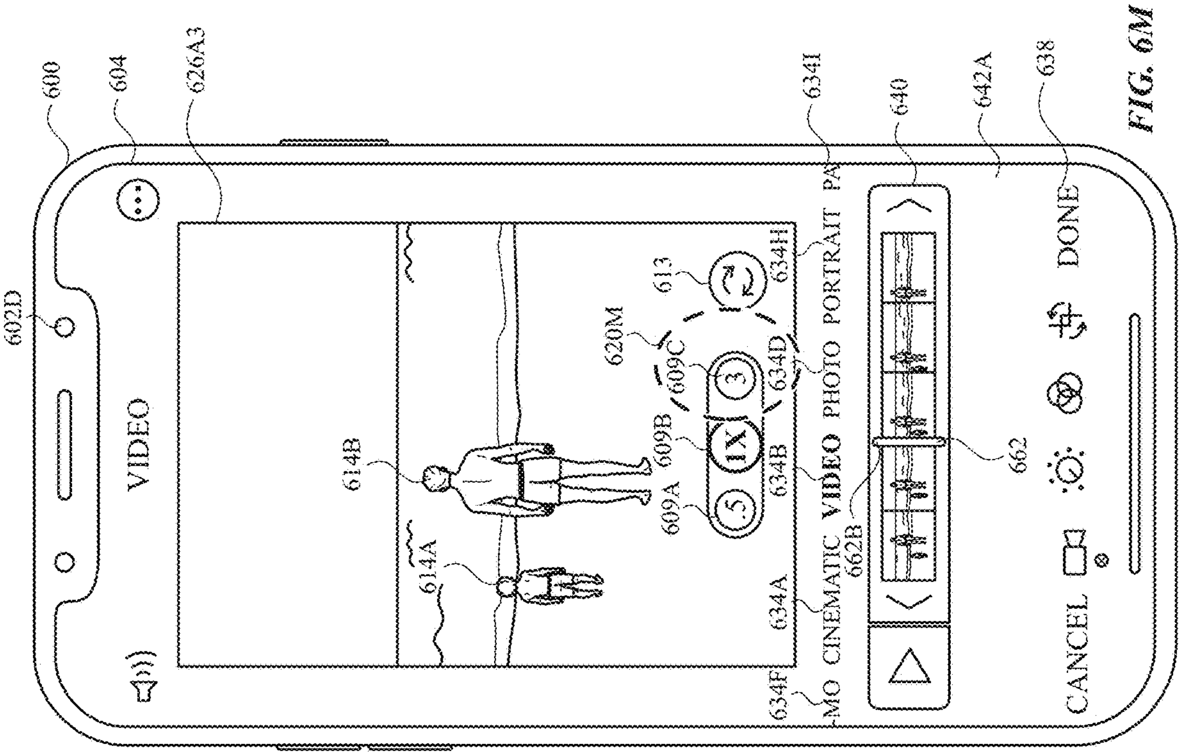

In FIG. 6J, in response to input 620D in FIG. 6F or input 620H in FIG. 6H, computer system 600 displays slo-mo editing user interface 642C for slo-mo media data type. Editing user interface 642C includes first media item representation 626A3 that corresponds to the first media item that includes portions of video data that can be played back in slow motion. Additionally, slo-mo editing user interface 642C includes "SLO-MO" graphical object 634F centrally located within edit selection menu 634 to indicate that it is presently selected. The remaining respective edit modes within edit selection menu 634 have shifted to the right, accordingly. Slo-mo editing user interface 642C further includes slow mode bar 660 for changing which portions of first media item will be presented in slow motion. In response to detecting drag gesture 620J within slow mode bar 660 to the left, computer system 600 changes the starting position of when slow motion video content will commence upon playback of the first media item. Computer system 600 also updates slow mode bar 660 accordingly to reflect the changes. As a result of the change, when computer system 600 plays back the media corresponding to the first media item, slow motion video content corresponding to the first media item will be played sooner that it would have been played had the change not been made. In some embodiments, a right drag gesture within slow mode bar 660 changes the starting position of when slow motion video content will commence upon playback of the first media item such that slow motion video data is played back later. In some embodiments, computer system 600 can detect an input (e.g., drag, swipe, or tap) at any portion of slow mode bar 660 to increase/decrease the amount of video content displayed in slow motion. In FIG. 6J, computer system 600 detects input 620I (e.g., tap or long press) on "TIME LAPSE" graphical object 634G.

In FIG. 6K, in response to input 620I, computer system 600 displays time-lapse editing user interface 642D for a time-lapse edit mode. Time-lapse editing user interface 642D includes first media item representation 626A2 that includes a time lapse effect. In FIG. 6K, computer system 600 detects input 620K (e.g., tap or long press) on video (e.g., "VIDEO") mode graphical object 634B to change the selected edit mode type.

Figure 6L:
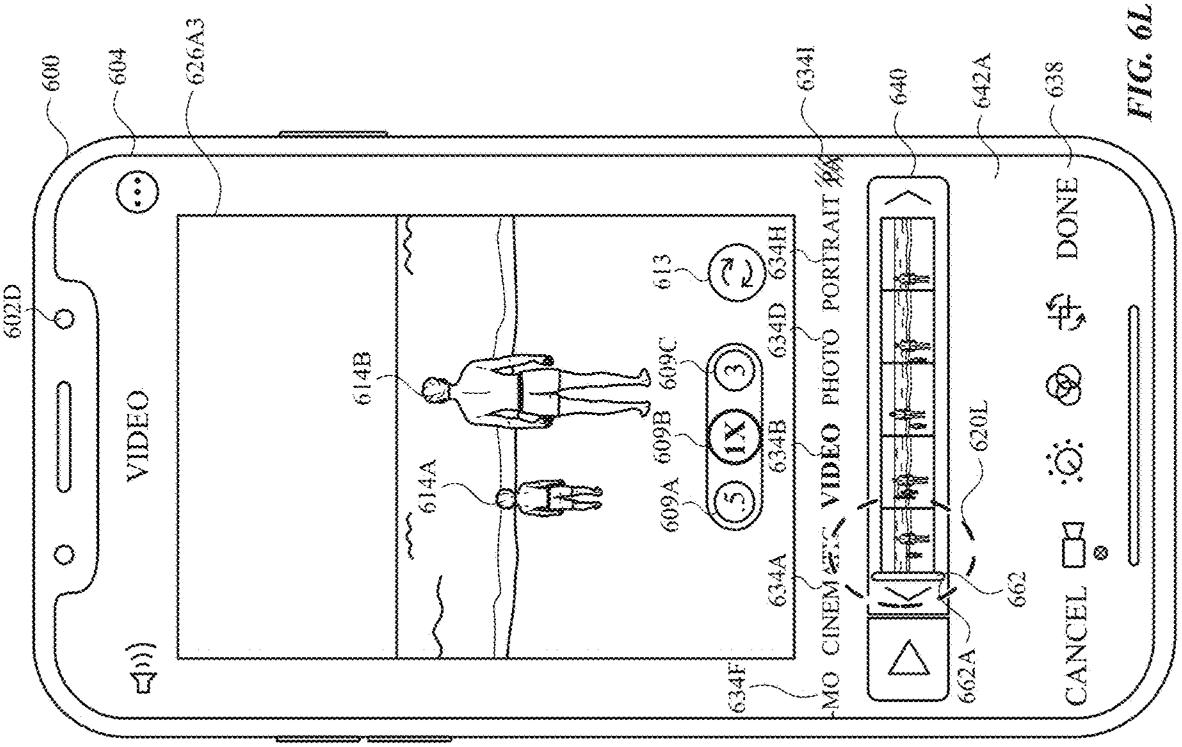

In FIG. 6L, in response to detecting input 620K, computer system 600 displays video editing user interface 642A. Video Editing user interface 642A includes edit selection menu 634 that includes panoramic mode graphical object 634I (e.g., "PA") that corresponds to the panoramic media data type in which media data can be stitched together to display a media item in wide (e.g., ultra-wide or ultra-ultra wide) format. Computer system 600 determines that additional data that allows first media item to be presented in panoramic mode is not available. As a result, computer system 600 displays panoramic mode graphical object 634H as inactive (e.g., grayed out and/or not selectable). In some embodiments, computer system 600 determines that data that allows first media item to be presented in panoramic mode is not available when the data has not been fully processed by computer system 600 or when the data has not been fully saved (e.g., downloaded and/or transferred) at computer system 600. FIG. 6L further depicts scrubber cursor 662 within filmstrip 640 to navigate (e.g., rewind or advance forward) through the video data corresponding to first media item. The position of scrubber cursor 662 correspond to the current position of the video corresponding to the first media item. In FIG. 6K, computer system 600 detects drag gesture 620L to advance the video content for first media item from first position 662A to second position 662B.

In FIG. 6M, computer system 600 determines that additional data that allows first media item to be presented in panoramic mode is now available. As a result, computer system 600 displays panoramic mode graphical object 634H as active (e.g., not grayed out and/or selectable). Video editing user interface 642A further includes magnification selection graphical objects 609A, 609B, and 609C. In FIG. 6M, each magnification selection graphical object 609A, 609B, and 609C corresponds to media data captured via cameras 602A, 602B, and 602C, respectively. In some embodiments, computer system 600 includes other magnification selection graphical objects that do not correspond to any of the cameras of computer system 600. For example, a magnification selection graphical object can correspond to media data captured by a camera on a device different from computer system 600. Computer system 600 displays second magnification selection graphical object 609B more prominently than first magnification selection graphical object 609A and third magnification selection graphical object 609C, because magnification selection graphical object 609B is presently selected. Because magnification selection graphical object 609B is presently selected, the displayed first media item representation 626A3 corresponds to the media data captured via camera 602B at the 1× magnification level. Video Editing user interface 642A further includes camera swap graphical object 613 for switching the media data used to display first media item representation 626A3 from one of the media data captured via cameras (602, 602B, or 602C) on the back of computer system 600 to media data captured via camera 602D on the front of computer system 600, and vice versa. In FIG. 6M, computer system 600 detects input 620M (e.g., a tap or long press) on third magnification selection graphical object.

Figure 6O:
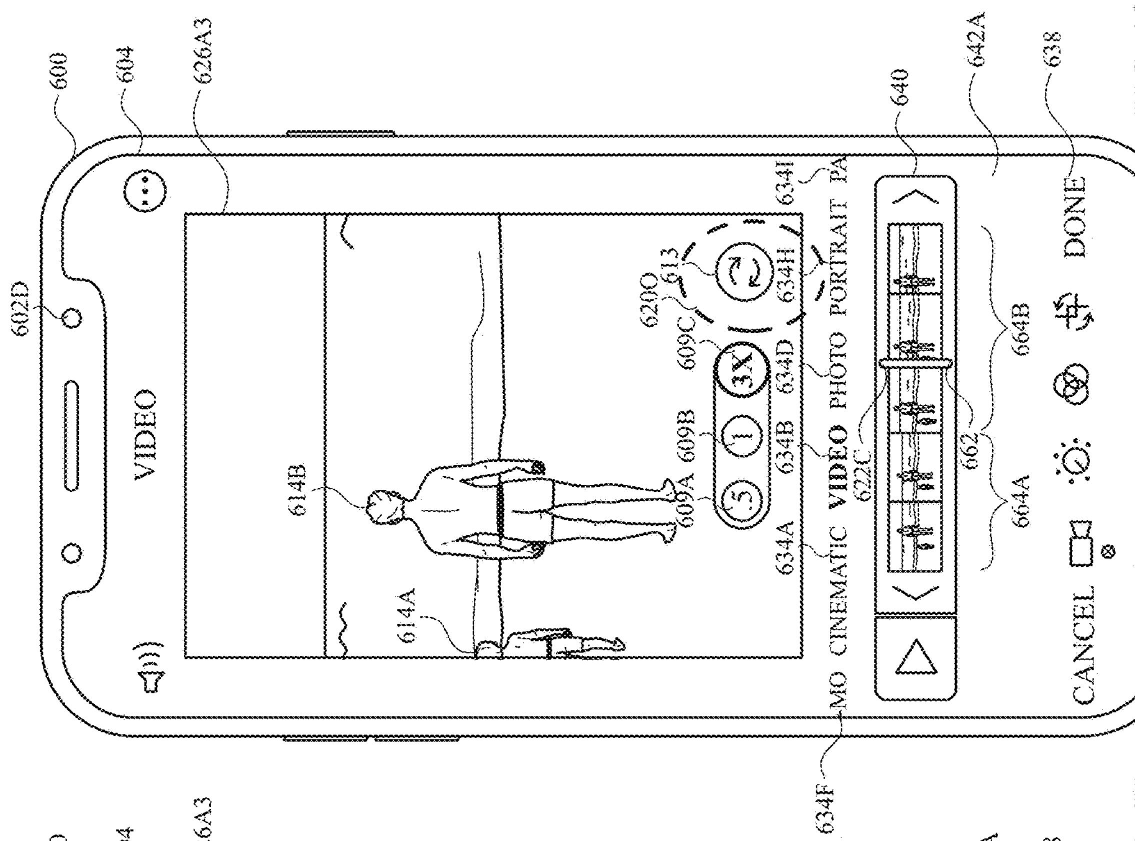
Figure 6N:
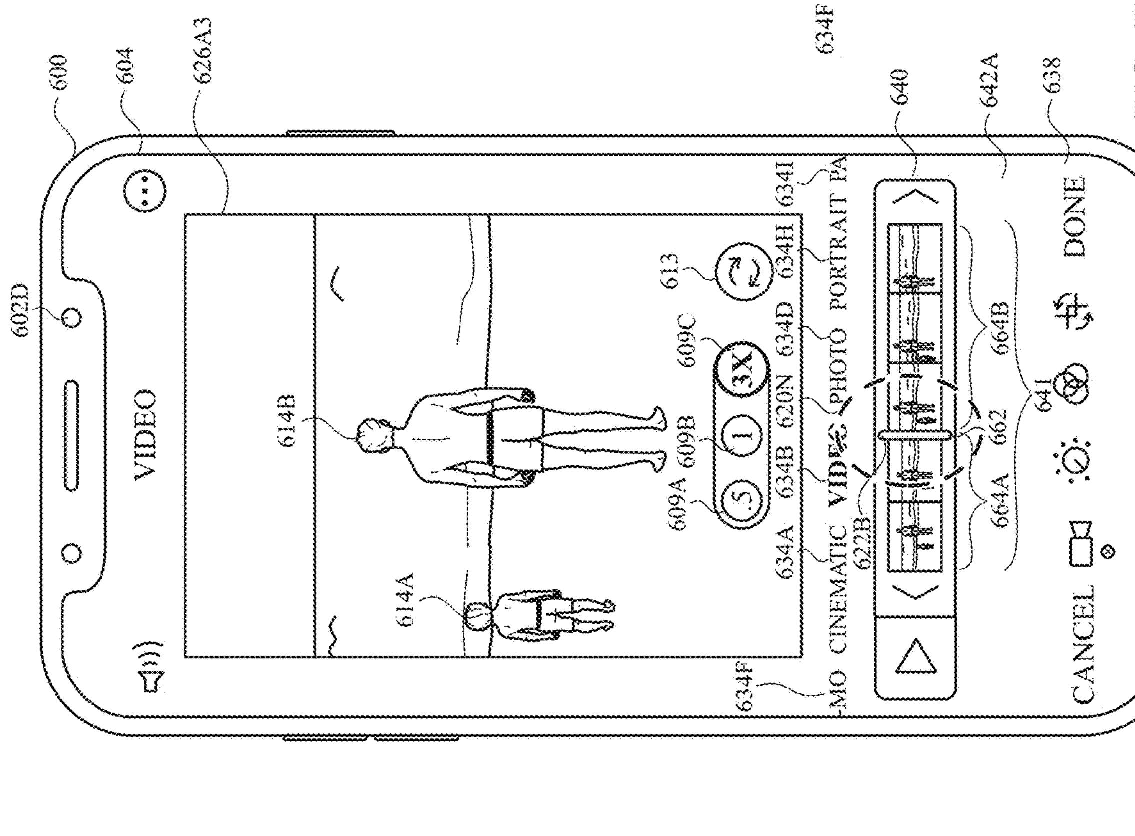
Figure 6Q:
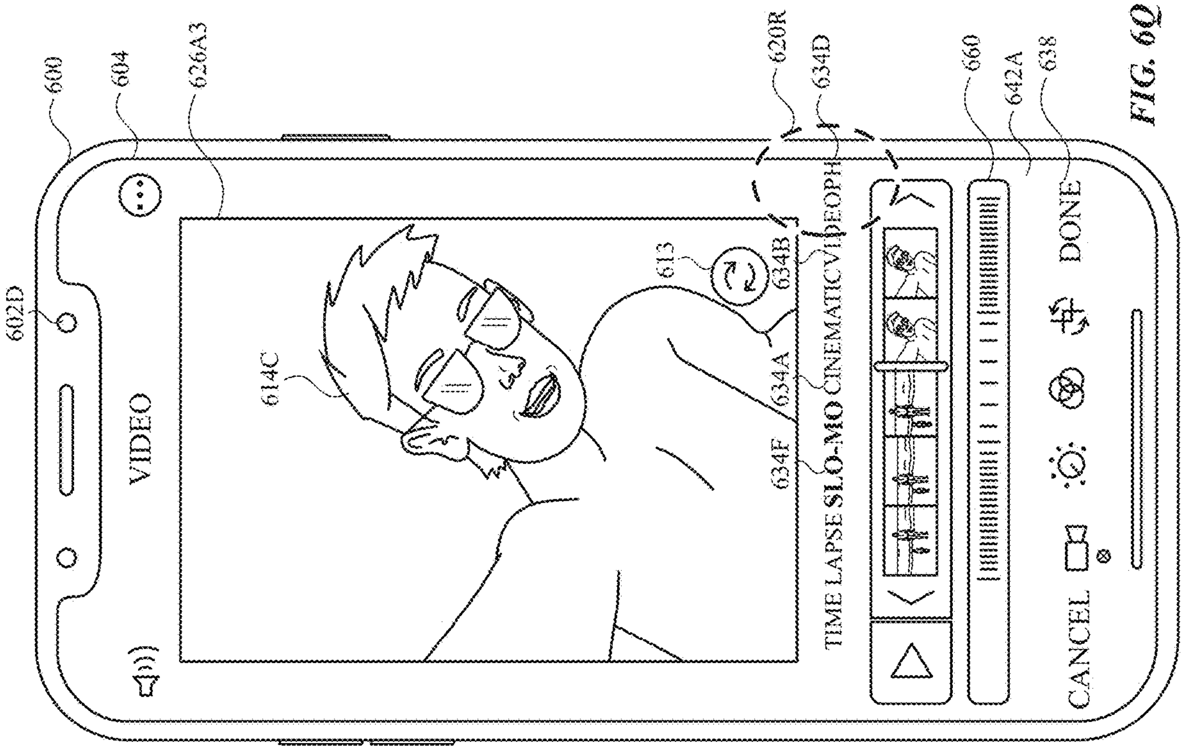

In FIG. 6N, in response to input 620M, computer system 600, starting from second position 662B, updates the video corresponding to first media item to use the media data captured via camera 602C at the 3× magnification level. As a result, video editing user interface 642A displays second subject 614B at a larger size compared to second subject 614B in FIG. 6M. Additionally, to reflect the updated changes, computer system 600 visually updates the representations 641 of first media item over time within filmstrip 640. As a result, filmstrip representation 664A of the video corresponding to the first media item to the left of scrubber cursor 662 remains unchanged. However, filmstrip representation 664B of the video corresponding to the first media item to the right of scrubber cursor 662 is updated (e.g., displayed larger and/or displayed with greater magnification) to reflect media data captured via camera 602C at the 3× magnification level. In some embodiments computer system 600 updates the video corresponding to the first media item and the filmstrip 640 to reflect change in the media item starting at second position 622B until the next predetermined point (e.g., edit position and/or location) in the video (e.g., not until the end of video corresponding the first media item). In FIG. 6N, computer system 600 detects drag gesture 620N on scrubber cursor 662 to move the scrubber cursor 662 to third position 662C, as shown in FIG. 6O.

In FIG. 6O, in response to drag gesture 620N, computer system 600 updates first media item representation 626A3 to corresponds to third position 662C within the video data of the first media item. Consequently, FIG. 6O depicts the video corresponding to the first media item advancing further in the video to third position 662C. In FIG. 6O, computer system 600 detects input (e.g., tap or long press) 6200 on camera swap graphical object 613.

Figure 6P:
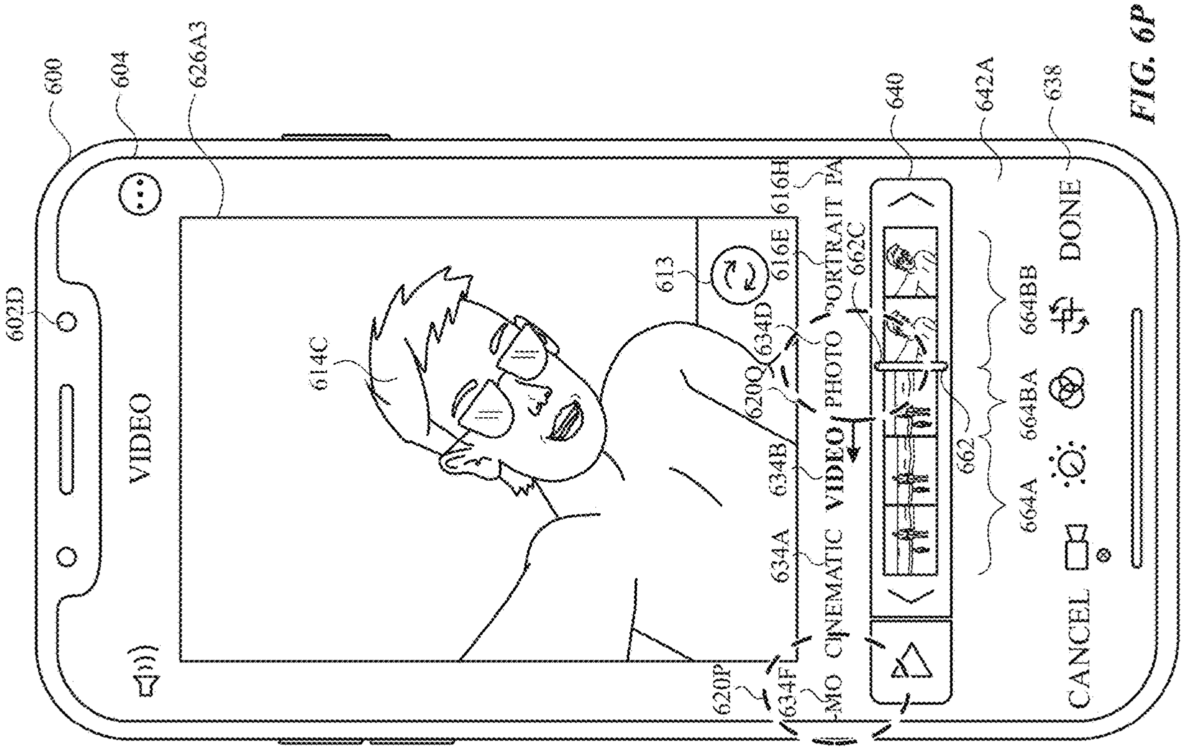

In FIG. 6P, in response to input 6200, computer system 600, starting from third position 662C, updates the video corresponding to first media item to use the media data captured via camera 602D (e.g., front facing camera). As a result, video editing user interface 642A now displays third subject 614C that was captured as part of the additional data while capturing the first media item in FIGS. 6A-6C. Moreover, video editing user interface 642A stops displaying magnification selection graphical objects 609A, 609B, and 609C that correspond to media data captured via cameras 602A, 602B, and 602C, because the first media item does not include additional data that would allow for optically zooming in on third subject 614C displayed with first media item representation 626A3. In some embodiments, video editing user interface 642A continues to display magnification selection graphical objects 609A, 609B, and 609C that correspond to media data captured via cameras 602A, 602B, and 602C, respectively, and/or other magnification selection graphical objects (e.g., digital zoom) that do not correspond to any specific camera, after selection of camera swap graphical object 613.

Additionally, in response to detecting input 6200, computer system 600 updates filmstrip 640 to reflect the editing changes. Consequently, fourth filmstrip representation 664BB of the video corresponding to the first media item to the right of scrubber cursor 662 is updated to reflect media data captured via camera 602D. However, filmstrip representation 664A of the video corresponding to the first media item to the left of scrubber cursor 662 as well as filmstrip representation 664BA of the video corresponding to the first media item to the left of scrubber cursor 662 remain unchanged. In some embodiments, in response to detecting input 6200, computer system 600 updates the video and the filmstrip 640 to reflect change in the first media item starting at third position 662C until the next predetermined point (e.g., edit position and/or location) in the video (e.g., not until the end of video corresponding the first media item). FIG. 6N, further depicts computer system 600 detecting input 620P (e.g., tap or long press) and swipe gesture 620Q.

In FIG. 6Q, in response to detecting input 620P, computer system 600 displays slo-mo editing user interface 642C. Slo-mo editing user interface 642C includes the previously edited media item, as depicted via filmstrip 640. Because computer system 600 detected drag gesture 620J in FIG. 6J, slow mode bar 660 reflects the change in FIG. 6Q. FIG. 6Q further includes input 620R (e.g., tap or long press) on photo graphical object 634D corresponding to photo edit mode.

Figure 6R:
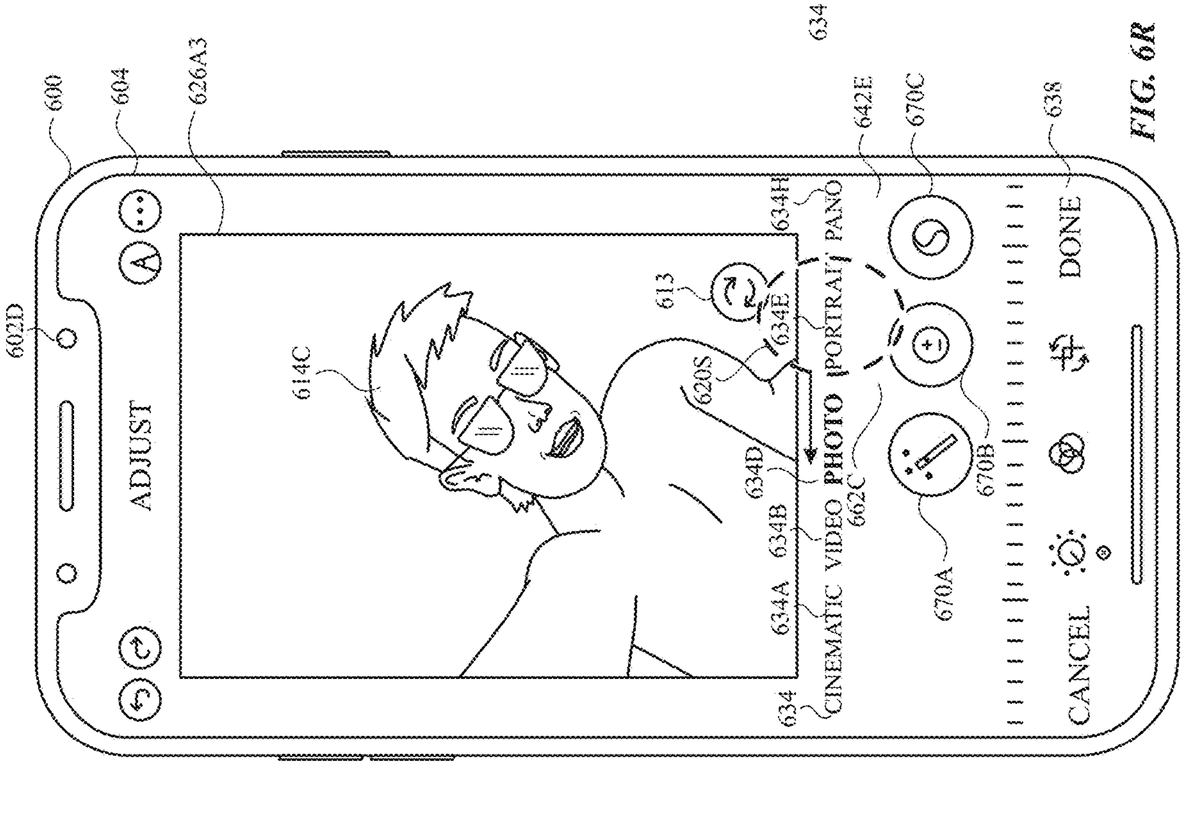

In FIG. 6R, in response to detecting input 620R in FIG. 6Q or in response to detecting swipe gesture 620Q in FIG. 6P, computer system 600 displays photo editing user interface 642E for the photo media data type. Photo editing user interface 642E includes first media item representation 626A3 that is now represented as a still image, as evident by the lack of filmstrip 640 that was visible while computer system 600 displayed video editing user interface 642A. Additionally, computer system 600 is in an editing mode for a photo media data type, photo editing user interface 642E includes various photo specific editing tools 670A, 670B, 670C. Computer system 600 does not display editing tools 670A, 670B, 670C while computer system 600 displays video editing user interface 642A. In some embodiments editing tools 670A, 670B, 670C are also displayed in other editing modes (e.g., video media data type, portrait media data type, time lapse media data type, and/or cinematic media data type). In FIG. 6R, computer system 600 further detects swipe gesture 620S at an area corresponding to edit selection menu 634 to change the selected media edit mode. In some embodiments, a swipe gesture (e.g., 620S) is detected outside of edit selection menu 634 to change the selected edit mode.

In FIG. 6S, in response to detecting input 620S, computer system 600 displays portrait editing user interface 642F for portrait media data type. Portrait editing user interface 642F includes first media item representation 626A3 that is represented as a still image. In response to entering the portrait editing user interface 642F, computer system 600 applied (e.g., automatically and/or without detecting a specific input) a depth of field effect to first media item representation 626A3. As a result, the background of first media item representation 626A3 is blurred out, while the foreground, which includes third subject 614C, is in focus. Portrait editing user interface 642F further includes various portrait specific editing tools 672A, 672B, 672C for changing a property of the depth effect applied to first media item representation 626A3. Computer system 600 does not display editing tools 672A, 672B, 672C when a non-portrait editing user interface is displayed. In some embodiments editing tools 672A, 672B, 672C are displayed in other media data editing modes (e.g., video media data type, portrait media data type, time lapse media data type, and/or cinematic media data type). In some embodiments, in response to detecting an input on completion graphical object 638, computer system 600 saves the changes/edits made to first media item and computer system 600 redisplays gallery user interface 627, which would include a representation of first media item in the state it was at the time computer system 600 detected selection of completion graphical object 638. For example, if first media item was represented as a video media item at the time computer system 600 detected selection of completion graphical object 638, computer system 600 would display a representation of first media data as a video media item in gallery user interface 627. On the other hand, if first media item was represented as a still image media item at the time computer system 600 detected selection of completion graphical object 638, computer system 600 would display a representation of first media data as a still image media item in gallery user interface 627.

FIG. 7 is a flow diagram illustrating a method for capturing and/or editing media that can be presented as multiple different media types using a computer system in accordance with some embodiments. Method 700 is performed at a computer system (e.g., 100, 300, 500, and/or 600) that is in communication with display generation component (e.g., 604) (e.g., a display controller and/or a touch-sensitive display system) and one or more input devices (e.g., touch-sensitive portion of display 604) (e.g., a touch-sensitive surface, a touchscreen, a button, and/or a microphone). Some operations in method 700 are, optionally, combined, the orders of some operations are, optionally, changed, and some operations are, optionally, omitted.

In some embodiments, the electronic device (e.g., 600) is a computer system. The computer system is optionally in communication (e.g., wired communication and/or wireless communication) with a display generation component (e.g., 604) and with one or more input devices (e.g., touch-sensitive portion of display 604). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system.

Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for capturing and/or editing media that can be presented as multiple different media types. The method reduces the cognitive burden on a user for capturing and/or editing media that can be presented as multiple different media types, thereby creating a more efficient human-machine interface. For battery-operated computing devices, enabling a user to capture and/or edit media that can be presented as multiple different media types faster and more efficiently conserves power and increases the time between battery charges.

The computer system (e.g., 600) displays (702), via the display generation component (e.g., 604), an editing user interface (e.g., 642A) for editing a respective media item (e.g., 626A1) that was previously captured (e.g., the respective media item has data sufficient for it to be presented in multiple media types: e.g., photo, video, slow-motion media, variable frame rate media, time-lapse media, portrait media, panoramic media, and/or cinematic media) (in some embodiments the respective media item is simultaneously captured media of multiple types. In some embodiments the respective media item is media of multiple types captured on the computer system in response to detecting a input to capture the media.), wherein the editing user interface includes a first set of one or more edit options (e.g., 640 and other options shown in FIG. 6F) to edit (e.g. modify) a first type of media (e.g., photo, video, slow-motion media, variable frame rate media, time-lapse media, portrait media, panoramic media, and/or cinematic media) (e.g., the first set of one or more edit options are media item editing options for the first type of media presented: a video length edit option for videos, slow-motion length edit option for slow motion videos, and/or markup option for photos) (in some embodiments the editing user interface includes a representation of the respective media item).

While displaying the editing user interface, the computer system detects (704), via the one or more input devices, a first input (e.g., 620E) (e.g., a selection of an option (e.g., an affordance, button, graphical element, graphical object, and/or icon) that, when selected via the one or more input devices, initiates a process for displaying a second set of one or more edit options (e.g., an option that corresponds to the second type of media)).

In response to detecting the first input, the computer system displays (706), via the display generation component, the editing user interface for editing the respective media item, wherein the editing user interface includes a second set of one or more edit options (e.g., 642B, 648, and other options shown in FIG. 6G) (e.g., the second set of one or more edit options are media item editing options for the second type of media presented: a video length edit option for videos, slow-motion length edit option for slow motion videos, markup options for photos) to edit a second type of media (e.g., photo, video, slow-motion media, variable frame rate media, time-lapse media, portrait media, panoramic media, and/or cinematic media), different from the first type of media, of the respective media item, wherein the first set of one more edit options is different from the second set of one or more edit options (e.g., the first set of one or more edit options includes an option that is not included in the second set of one or more edit options or vice versa (e.g., the first set of one or more edit options includes a photo markup option not present in the video edit options)) (in some embodiments the editing user interface maintains display of a representation of the previously captured media item as the editing interface displays the first set of one or more edit options and the second set of one or more edit options.). Providing different sets of editing options for different types of media for the same respective media item provides the user with the ability to access different editing options that correspond to different media types for the same respective media item, which provides the user with the flexibility to edit different types of media for that same respective media item. Doing so provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Moreover, displaying respective edit controls for each respective media type provides for a limited number (e.g., only the controls associated for the respective media type) of edit controls to be displayed at a time, and, in turn, reduces the total clutter on the display. Displaying only the necessary controls for each of the respective media types enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Additionally, providing a user with the ability to change a media type of a respective media item allows the user with greater flexibility of not needing to decide which camera mode to use during capture. As a result, a user is able to focus on framing a scene and be concerned with specific system settings for the capture (e.g., frame rate, zoom level, and/or media type) as these setting, and others, can be eddied post capture. Additionally, allowing a user to focus on capturing the scene without worrying about the capture mode type allows the user to not worry about possibly missing a transient/fleeting moment as the user will be able to edit the media/mode type after the capture.

In some embodiments, the second type of media includes (e.g., includes upon playback) a synthetic depth-of-field effect applied to a plurality of frames of the respective media item (e.g., as seen in FIG. 6G) (e.g., image and/or video data), wherein the first type of media does not include the synthetic depth-of-field effect (e.g., as seen in FIG. 6F) applied to the plurality of frames of the respective media item. In some embodiments the synthetic (e.g., computer-generated), depth-of-field effect adjusts captured video such that it appears that the one or more frames of the video have been captured with a camera that has a different aperture (e.g., physical aperture and/or effective aperture) and/or focal length (e.g., physical focal length and/or effective focal length) than the aperture and/or focal length of the one or more cameras (e.g., the one or more cameras that actually captured the video). In some embodiments applying the synthetic depth-of-field effect to emphasize the first subject in video relative to a second subject in the plurality of frames of the video includes applying an amount of blur (or synthetic bokch) to the second subject that is greater than the amount of blur (or synthetic bokch) applied to the first subject. In some embodiments when playing back the captured media, the second subject appears to be blurred more than the first subject. In some embodiments the changes in the synthetic depth of field effect over time are representative of changes in video recorded that capture the movement of the first subject over time. Providing the user with the capability to change the editing mode from a standard type of media (e.g., video and/or photo) editing mode to a cinematic type of media editing mode provides the user with greater flexibility when editing the respective media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of one or more edit options to edit (e.g. modify) the first type of media (e.g., video or photo) does not include an option to modify a speed (e.g., rate and/or frame rate) of playback of at least a portion (e.g., less than the whole) of the respective media item (e.g., as seen in FIG. 6F), and wherein the second set of one or more edit options to edit the second type of media (e.g., slow motion media) includes an option (e.g., 660) to modify the speed of playback of at least a portion of the respective media item (e.g., as seen in FIG. 6J). Providing the user with the capability to change the editing mode from a standard type of media (e.g., video or photo) editing mode to a slow motion (e.g., slo-mo) type of media editing mode provides the user with greater flexibility when editing respective media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of one or more edit options to edit (e.g. modify) the first type of media (e.g., video or photo) includes a first playback selectable user interface object (e.g., 640 in FIG. 6F) (e.g., an affordance), that when activated, initiates playback of a first set of a plurality of portions (e.g., frames, and/or data) of the respective media item at a first time interval (e.g., 00001 seconds, 0.01 seconds, 0.1 seconds, 1 second, 2 seconds, or 5 minutes), and wherein the second set of one or more edit options to edit (e.g. modify) the second type of media (e.g., time lapse) includes a second playback selectable user interface object, that when activated, causes playback of at least a second set of a plurality of portions (e.g., frames, data) of the respective media item at a second time interval (e.g., 0.001 seconds, 0.01 seconds, 0.1 seconds, 1 second, 2 seconds, or 5 minutes), different from the first time interval (e.g., 640 in FIG. 6K). In some embodiments the first set of the plurality of portions (e.g., frames and/or data) of the respective media item at least partially overlap the second set of the plurality of portions (e.g., frames and/or data) of the respective media item. In some embodiments the first set of the plurality of portions (e.g., frames) of the respective media item is fully distinct from the second set of the plurality of portions (e.g., frames) of the respective media item. Providing the user with the capability to change the editing mode from a standard type of media (e.g., video) editing mode to a time lapse type of media editing mode provides the user with greater flexibility when editing respective media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, subsequent to detecting the first input and while displaying the editing user interface, the computer system detects, via the one or more input devices, a second input (e.g., 620H) (e.g., a selection of an option (e.g., an affordance, button, graphical element, graphical object, and/or icon) that, when selected via the one or more input devices, initiates a process for displaying a second set of one or more edit options (e.g., an option that corresponds to the second type of media)); and in response to detecting the second input, the computer system displays, via the display generation component, the editing user interface for editing the respective media item, wherein the editing user interface includes a third set of one or more edit options (e.g., 660 and other options of FIG. 6J) (e.g., the third set of one or more edit options are media item editing options for the third type of media presented: a video length edit option for videos, slow-motion length edit option for slow motion videos, markup options for photos) to edit a third type of media (e.g., time-lapse, slow motion, cinematic, video, photo, portrait, and/or panoramic), different from the first type of media and the second type of media, of the respective media item, wherein the first set of one more edit options is different from the second set of one or more edit options and the third set of one or more edit options (e.g., compare options of FIGS. 6J, 6F, and 6K) (e.g., the first set of one or more edit options includes an option that is not included in the second set of one or more edit options or vice versa (e.g., the first set of one or more edit options includes a photo markup option not present in the video edit options)), the first set of one or more edit options includes an option that is not included in the third set of one or more edit options or vice versa (e.g., the first set of one or more edit options includes a photo markup option not present in the cinematic edit options)) (in some embodiments the second set of one or more edit options and the third set of one or more edit options include the same set of options. In some embodiments the second set of one or more edit options includes an option that is not included in the third set of one or more edit options or vice versa. In some embodiments the editing user interface maintains display of a representation of the respective media item as the editing interface displays the first set of one or more edit options and the second set of one or more edit options.). Providing the user with the capability to change the editing mode to a third type of editing mode provides the user with greater flexibility when editing respective media item, which enhances the operability of the system and makes the user interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that a set of discarding criteria is satisfied, the computer system discards (e.g., deleting) a portion of additional data (e.g., data that is sufficient for the media item to be presented in multiple media types: e.g., time-lapse, slow-motion, cinematic, video, photo, portrait, and/or panoramic) corresponding to the respective media item (e.g., as discussed with reference to FIG. 6D); and in accordance with a determination that the set of discarding criteria is not satisfied, forgoing discarding the portion of additional data corresponding to the respective media item (e.g., as discussed with reference to FIG. 6D). In some embodiments a media gallery user interface includes a set of one or more representations (e.g., thumbnails) corresponding to a set of previously captured media items (e.g., video and/or photo). In some embodiments a media gallery user interface includes a thumbnail representation (among a plurality of thumbnail representations that represent a plurality of media items) that corresponds to previously captured photos and/or videos. In some embodiments the media gallery user interface includes a first representation (e.g., thumbnail) of a first previously captured media item (e.g., the respective media item), wherein: in accordance with a determination that the set of discarding criteria is satisfied, the first representation of the first previously captured media item does not include a first visual indicator (e.g., an affordance, button, graphical element (e.g., square, triangle, and/or any graphical shape), graphical object, and/or icon) that designates (e.g., indicates and/or specifics) that additional data (e.g., data that is sufficient for the media item to be presented in multiple media types: e.g., time-lapse, slow-motion, cinematic, video, photo, portrait, and/or panoramic) corresponding to the first previously captured media item is available; and in accordance with a determination that the set of discarding (e.g., deleting and/or removing) criteria is not satisfied, the first representation of the first previously captured media item includes a first visual indicator (e.g., an affordance, button, graphical element (e.g., square triangle and/or any graphical shape), graphical object, and/or icon) that additional data (e.g., data that is sufficient for the media item to be presented in multiple media types: e.g., time-lapse, slow-motion, cinematic, video, photo, portrait, and/or panoramic) corresponding to the first previously captured media item is available. In some embodiments accordance with a determination that the set of discarding criteria is satisfied, the system discards/deletes the additional data corresponding to the respective media item from a memory of the computer system (e.g., not the remote storage device). In some embodiments in accordance with a determination that the set of discarding criteria is satisfied, system discards/deletes the additional data corresponding to the respective media item from the memory of a computer system in addition to the remote storage. Discarding or deleting unnecessary (e.g., no longer needed) capture data corresponding to the respective media item enhances the operability of the system by reducing the necessary storage capacity for the system as well as improves the operability of the system by freeing up additional storage space that can be used to capture/store addition media data.

In some embodiments, the set of discarding criteria includes a first criterion that is satisfied when a predetermined amount of time (e.g., 1 second, 1 minute, 5 minutes, 10 minutes, 1 hour, 2 hours, 10 hours, 1 day, 5 days, 10 days, 1 week, 4 weeks, 1 month, 4 months, 1 year, 10 years, or 20 years) has elapsed subsequent to (e.g., since and/or after) capturing the respective media item (e.g., as discussed with reference to FIG. 6D). Discarding or deleting unnecessary (e.g., no longer needed) capture data corresponding to the respective media data after a time period enhances the operability of the system by reducing the necessary total storage capacity for the system as well as improves the operability of the system by freeing up additional storage space that can be used to capture/store addition media data.

In some embodiments, the set of discarding criteria includes a second criterion that is satisfied when the respective media item was not edited (in some embodiments was not selected for editing (e.g., whether edits were made and/or saved or not) (e.g., a characteristic (e.g., size, color, and/or type) of the media item has been changed) within a respective amount of time (e.g., 1 second, 1 minute, 5 minutes, 10 minutes, 1 hour, 2 hours, 10 hours, 1 day, 5 days, 10 days, 1 week, 4 weeks, 1 month, 4 months, 1 year, 10 years, or 20 years) after capturing the respective media item (e.g., as discussed with reference to FIG. 6D). Discarding or deleting unnecessary (e.g., no longer needed) capture information corresponding to the respective media item after only if the user has not edited the media item within a time period enhances the operability of the system by reducing the necessary storage capacity for the system as well as improves the operability of the system by freeing up additional storage space that can be used to capture/store addition media data.

In some embodiments, one or more media items that have been edited within the respective amount of time continue to be associated with additional data corresponding to the respective media item (e.g., data that is sufficient for the media item to be presented in multiple media types: e.g., time-lapse, slow-motion, cinematic, video, photo, portrait, and/or panoramic) after the respective amount of time (e.g., as discussed with reference to FIG. 6D) (e.g., because the additional data corresponding to the respective media item is not deleted in accordance with the discarding criteria). Preserving/saving additional capture data corresponding to the respective media item for an extend time period only if a user has edited the media item enhances the operability of the system by reducing the necessary total storage capacity for the system (e.g., the system will retain only the data that is necessary) as well as improves the operability of the system by freeing up additional storage space which can be used to capture/store addition media data.

In some embodiments, the set of discarding criteria includes a fourth criterion that is satisfied when the respective media item is not marked (e.g., user identified and/or selected) as a favorite (e.g., selected, via an input on an affordance, as being liked) (e.g., as discussed with reference to FIG. 6D). In some embodiments a user identifies (e.g., marks) a media item as a favorite within the media gallery user interface via a user input on a graphical object (e.g., heart, square, circle, and/or any graphical object) corresponding to the first previously captured media. In some embodiments when a time threshold is reached since the media item was captured if the media item has been marked as a favorite, the corresponding additional data is retained (e.g., to allow for more flexible future editing of the media item) while if the media item has not been marked as a favorite, the corresponding additional data is discarded (e.g., to reduce the amount of data that is being stored and free up additional storage space for other purposes). Discarding or deleting unnecessary (e.g., no longer needed and/or necessary) capture information corresponding to a respective media item that has not been marked as favorite enhances the operability of the system by reducing the necessary storage capacity for the system as well as improves the operability of the system by freeing up additional storage space that can be used to capture/store addition media data.

In some embodiments, the set of discarding criteria includes a fifth criterion that is satisfied when the respective media item does not meet a view frequency threshold (e.g., as discussed with reference to FIG. 6D) (e.g., 1 view, 3 views, 5 views, 10 views, or 100 views within a predetermined period of time). In some embodiments the view frequency is incremented in response to the respective media item being accessed and/or displayed within the media gallery user interface. In some embodiments the view frequency is incremented in response to the respective media item being accessed and/or displayed via a first application different from the media gallery (e.g., not the media gallery). In some embodiments when a time threshold is reached since the media item was captured if the media item has been viewed more than a threshold amount (e.g., based on a number of distinct times the media item has been opened, a duration for which the media item has been viewed, or some other media item viewing metric), the corresponding additional data is retained (e.g., to allow for more flexible future editing of the media item) while if the media item has not been viewed more than the threshold amount, the corresponding additional data is discarded (e.g., to reduce the amount of data that is being stored and free up additional storage space for other purposes). Discarding or deleting unnecessary (e.g., no longer needed) capture information corresponding to a respective media item that has not been accessed (e.g., viewed and/or selected) a predetermined amount of timed within a predetermined amount of time enhances the operability of the system by reducing the necessary storage capacity for the system as well as improves the operability of the system by freeing up additional storage space that can be used to capture/store addition media data.

In some embodiments, the additional data includes data from a first camera (e.g., 602A) and data from a second camera (e.g., 602B) different from the first camera, and wherein discarding the portion of additional data includes discarding the data from the second camera (e.g., while retaining the data from the first camera). In some embodiments the computer system includes a plurality of cameras including the first camera and the second camera. In some embodiments each of the plurality of cameras have fixed, but different, focal lengths. In some embodiments the focal length, field of view, and optical magnification properties of an optical system is fixed for each of the plurality of cameras, but one or more of the fixed focal lengths, the fixed field of view, and/or the optical magnification properties are different between a first camera and a second camera of the plurality of cameras. In some embodiments a first camera of the plurality of cameras is positioned on the front side of computer system and the second camera of the plurality of cameras is positioned on the back side of the computer system. In some embodiments the first camera and the second camera correspond to a second (e.g., auxiliary and/or remote) computer system deafferent from the computer system. The respective media item including additional information from a plurality of cameras provides the user with greater flexibility when editing the respective media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the additional data includes first data for presenting the respective media item at a first frame rate and second data for presenting the respective media item at a second frame rate that is higher than the first frame rate, and wherein discarding the portion of additional data includes discarding the second data for presenting the respective media item at the second frame rate that is higher than the first frame rate (e.g., as discussed with reference to FIG. 6D) (e.g., while retaining the first data for presenting the respective media item at a first frame rate). The respective media item including data for presenting the respective media item at a first frame rate and data for presenting the respective media item at a second frame different from the first frame rate provides the user with greater flexibility when editing the respective media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Discarding or deleting unnecessary (e.g., no longer needed) data corresponding to the second frame rate that corresponds to a higher frame rate than the data for presenting the respective media item at the first frame rate enhances the operability of the system by reducing the necessary storage capacity for the system as well as improves the operability of the system by freeing up additional storage space that can be used to capture/store addition media data.

In some embodiments, the editing user interface includes a mode selection graphical object (e.g., 634) (e.g., wheel, cube, sphere, circle, ribbon, carousel, or any other graphical form), that, when selected (e.g., tap, swipe, or long press), initiates a change of an editing mode (e.g., time-lapse, slow-motion, cinematic, video, photo, portrait, and/or panoramic) for the respective media item from a first type of editing mode (e.g., time-lapse, slow-motion, cinematic, video, photo, portrait, and/or panoramic) to a second type of editing mode (e.g., time-lapse, slow-motion, cinematic, video, photo, portrait, and/or panoramic) that is different from the first type of editing mode (e.g., as shown in the transition from FIG. 6F to 6G based on input 620E). In some embodiments the mode selection graphical object is a representations of a wheel, cube, sphere, circle, ribbon, carousel, or any other graphical form. In some embodiments the mode selection graphical object includes selectable representations of different editing modes (e.g., time-lapse, slow-motion, cinematic, video, photo, portrait, and/or panoramic). In some embodiments in response to an input (e.g., tap, swipe, or long press) directed to one of the selectable representations of editing modes, a set of one or more edit options for the respective image type is displayed. In some embodiments the first type of editing mode corresponds to the first type of media that includes the first set of one or more edit options or the second type of media that includes the second set of one or more edit options. In some embodiments the second type of editing mode corresponds to the first type of media that includes the first set of one or more edit options or the second type of media that includes the second set of one or more edit options. Displaying a graphical object that a user can use to transition between various edit modes provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. In some embodiments, the first input (e.g., tap, swipe, or long press) corresponds to an input on the mode selection graphical object (e.g., as shown in FIG. 6F). In some embodiments the input starts on the mode selection graphical object that and terminates outside of the mode selection graphical object. In some embodiments the input starts on the mode selection graphical object that and terminates within the boundaries of the mode selection graphical object. Detecting inputs on the displayed a graphical object to transition between various edit modes provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, prior to detecting the first input (in some embodiments prior to performing editing operations using the editing user interface), displaying the editing user interface for editing the respective media item that was previously captured without displaying the mode selection graphical object. In some embodiments while displaying the editing user interface without the mode selection graphical object, detecting an input that initiates the display of the mode selection graphical object. Forgoing to display the graphical object to change the edit modes prior to entering the edit mode provides the user with greater flexibility when editing the media item and reduces clutter on the display, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the mode selection graphical object: in accordance with a determination that a dynamic mode criteria are satisfied, includes a respective mode type graphical indication (634I) ((e.g., an affordance, button, graphical element, graphical object, and/or icon) that, when selected via the one or more input devices, initiates a process for displaying edit options corresponding to the respective mode type (e.g., time-lapse, slow-motion, cinematic, video, photo, portrait, and/or panoramic)); and in accordance with a determination that the dynamic mode criteria are not satisfied, does not include the respective mode type graphical indication (e.g., as discussed with reference to FIG. 6L for 634I). In some embodiments the dynamic mode criteria include a first criterion that is satisfied subsequent to a time period (e.g., 1 second, 3 second, 5 second, 1 minute, 10 minutes, or any other time period) lapsing. In some embodiments the dynamic mode criteria include a second criterion that is satisfied in accordance with a determination that image analysis (e.g., processing) of the respective media item has completed (e.g., at the computer system and/or at an auxiliary device). In some embodiments the dynamic mode criteria include a third criterion that is satisfied in accordance with a determination that a software update has occurred, wherein the software update adds a new media type (e.g., hyper slow motion, night mode, and/or sky mode) for editing. Providing dynamic edit modes after meeting a predetermined criteria enhances the operability of the system and makes the user-system interface more efficient (e.g., by helping the user to provide proper inputs, reducing user mistakes when operating/interacting with the system, allows the user to work with new edit modes) which, additionally, reduces power usage and improves battery life of the system by enabling the user to use the system more quickly and efficiently.

In some embodiments, in accordance with a determination that a first media item (e.g., video) includes a first threshold amount of lateral (e.g., horizontal/vertical data and/or data that corresponds to lateral movement of the capturing capture during capture (e.g., capture of a video that includes lateral movement of the camera) data, the computer system displays, via the display generation component, a panoramic graphical object (e.g., 634H as seen in FIG. 6S or 622 as seen in FIG. 6C) ((e.g., an affordance, button, graphical element, and/or icon) that indicates that a sufficient amount of data is present for a panoramic image (e.g., panoramic mode type); and in accordance with a determination that the first media item (e.g., video) does not include the first threshold amount of lateral (e.g., horizontal or vertical) data, forgoing displaying the panoramic graphical object. In some embodiments the first threshold amount of lateral (e.g., horizontal or vertical) data is data that is sufficient to create and/or edit a panoramic image. In some embodiments the panoramic graphical object is part of the mode selection graphical object (e.g., wheel, cube, sphere, circle, ribbon, carousel, or any other graphical form). In some embodiments while displaying, via the display generation component, the panoramic graphical object, detecting an input corresponding to the panoramic graphical object; and in response to detecting the input corresponding to the panoramic graphical object, displaying an editing user interface for a panoramic media (e.g., mode) type. In some embodiments the editing user interface for the panoramic media type include a representation of the first media item as a panoramic media type (e.g., a media item that has more lateral (e.g., horizontal or vertical) data than a photo media item). Displaying an indication that respective media item includes sufficient lateral data for a panoramic image data type enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displaying the panoramic graphical object includes displaying an animation of (e.g., visually transitioning) the panoramic graphical object from a first graphical state to a second graphical state (e.g., 622 as discussed with reference to FIG. 6C). In some embodiments the first graphical state and/or the second graphical state correspond to at least one of the shape, color, border, outline, hue, contrast, highlighting, shading, and/or font). In some embodiments the animation is displayed to indicate that the respective media item is being analyzed to generate a panoramic media type for the item. Displaying an animation of the graphical indication being created provides the user with improved feedback about the status of the media capture. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the panoramic graphical object is displayed while displaying the editing user interface for editing the respective media item that was previously captured. In some embodiments the respective media item corresponds to the first media item. Displaying the graphical object in an editing view provides the user with improved feedback about the status of the media item while editing. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying a capture user interface (e.g., digital viewfinder) for capturing a second media item (e.g., video): in accordance with a determination that the second media item includes a second threshold amount of lateral (e.g., horizontal/vertical data and/or data that corresponds to lateral movement of the capturing capture during capture (e.g., capture of a video that includes lateral movement of the camera); In some embodiments the first and second amounts of lateral data are the same) data, the computer system displays, via the display generation component, a second panoramic graphical object (e.g., 622 of FIG. 6C) ((e.g., an affordance, button, graphical element, and/or icon); In some embodiments the panoramic graphical object and the second panoramic graphical object are the same and/or have the same appearance) that indicates that a second sufficient amount of data is present for a second panoramic image (e.g., panoramic mode type); and in accordance with a determination that the second media item (e.g., video) does not include the second threshold amount of lateral (e.g., horizontal or vertical) data, forgoing displaying the second panoramic graphical object (e.g., as discussed with reference to FIG. 6B in comparison to FIG. 6C). In some embodiments the second threshold amount of lateral (e.g., horizontal or vertical) data is data that is sufficient to create and/or edit a panoramic image. In some embodiments the second panoramic graphical object is part of the mode selection graphical object (e.g., wheel, cube, sphere, circle, ribbon, carousel, or any other graphical form). In some embodiments the second threshold amount of lateral data corresponds the first threshold amount of lateral data. In some embodiments the second media item corresponds to the respective media item. In some embodiments the panoramic graphical object includes the textual suggestion (e.g., "Panorama") that indicates that the second sufficient amount of data is present for a panoramic image. In some embodiments the second sufficient amount of data corresponds to the first sufficient amount of data. Displaying the graphical object in a capture view provides the user with improved feedback about the status of the media item during capture. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying a representation (e.g., 626A1) (e.g. preview) of the respective media item (in some embodiments in a media gallery user interface that includes representations of a plurality of media items that includes the respective media item), wherein the representation of the respective media item includes an indication (e.g., 630A) (e.g., an icon, text, outline, highlighting, and/or shading) that the respective media item includes additional data (e.g., data that is sufficient for the media item to be presented in multiple media types: e.g., photo, video, and/or slow-motion media). In some embodiments the representation of the respective media item is displayed without displaying representations of other media items. In some embodiments the representation of the respective media item is displayed prior to displaying the editing user interface. Displaying the indication that the respective media item includes additional data, data that is sufficient for the media item to be presented in multiple media types, provides the user with improved feedback about the status of the media item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while capturing (e.g., recording, storing in memory, displaying a representation of the third media item via a digital viewfinder, and/or being configured to capture) a third media item: in accordance with a determination that third media item is being captured (e.g., recorded, stored in memory, and/or a representation of the third media item being displayed via a digital viewfinder) in a first mode (e.g., non multi-capture mode, one of time-lapse, slow-motion, cinematic, video, photo, portrait, and/or panoramic), the computer system displays a multi-capture graphical object (616C) (e.g., an affordance, button, graphical element, and/or icon), that when activated, initiates a process to capture (e.g., store in memory, record, and/or display via the digital viewfinder) the third media item in a second mode, different from the first mode, wherein capturing the third media item in the second mode includes capturing data sufficient for the third media item to be presented as multiple media types (e.g., non multi-capture mode, one of time-lapse, slow-motion, cinematic, video, photo, portrait, and/or panoramic) during an edit mode. In some embodiments capturing item in the first mode does not include capturing data (e.g., data not captured) sufficient for the third media item to be presented in multiple media types during an edit mode. In some embodiments the third media item corresponds to the respective media item. In some embodiments capturing the third media item in the first mode occurs subsequent to activation of a shutter/record graphical object. In some embodiments capturing the third media item in the first mode occurs prior to activation of a shutter/record graphical object while the displaying a representation of data in a digital viewfinder. In some embodiments the multi-capture graphical object is displayed in the second mode/and or the first mode. In some embodiments the multi-capture graphical object continues to be displayed when the system changes from the first mode to the second mode. Displaying the multi-capture graphical object in a capture user interface enhances the operability of the system and makes the user-system interface more efficient (e.g., by helping the user to provide proper inputs, reducing user mistakes when operating/interacting with the system, and notifying the user multi capture mode is available) which, additionally, reduces power usage and improves battery life of the system by enabling the user to use the system more quickly and efficiently.

In some embodiments, while capturing the third media item: in accordance with the determination that third media item is being captured in the first mode (e.g., non multi-capture mode, one of time-lapse, slow-motion, cinematic, video, photo, portrait, and/or panoramic), displaying, via the display generation component (e.g., a display controller and/or a touch-sensitive display system), a first set of configuration graphical objects for modifying a first set of one or more settings (e.g., controls and/or parameters) corresponding to capturing media in the first mode; and in accordance with a determination that third media item is being captured in second mode (e.g., multi-capture mode), different from the first mode, displaying, via the display generation component (e.g., a display controller and/or a touch-sensitive display system), a second set of configuration graphical objects for modifying a first set of one or more settings (e.g., controls and/or parameters) corresponding to capturing media in the second mode, wherein the second set of configuration graphical objects includes fewer graphical objects than the first set of configuration graphical objects. In some embodiments the second set of configuration graphical objects includes no graphical objects that cause a modification of the capturing. In some embodiments while displaying, via the display generation component (e.g., the display controller and/or the touch-sensitive display system), settings (e.g., controls and/or parameters) corresponding to capturing media in the first mode, detecting a first respective input corresponding to a first configuration graphical object from the first set of configuration graphical objects, and in response to detecting the first respective input, modifying a first respective setting (e.g., control and/or parameter) corresponding to capturing media in the first mode. In some embodiments while displaying, via the display generation component (e.g., the display controller and/or the touch-sensitive display system), settings (e.g., controls and/or parameters) corresponding to capturing media in the second mode, detecting a second respective input corresponding to a second configuration graphical object from the second set of configuration graphical objects, and in response to detecting the second respective input, modifying a second respective setting (e.g., control and/or parameter) corresponding to capturing media in the second mode. In some embodiments while displaying, via the display generation component (e.g., the display controller and/or the touch-sensitive display system), settings (e.g., controls and/or parameters) corresponding to capturing media in the first mode, detecting a third respective input corresponding to a third configuration graphical object from the first set of configuration graphical objects, and in response to detecting the third respective input, displaying a third set of configuration graphical objects for modifying a third set of one or more settings (e.g., controls and/or parameters) corresponding to capturing media in the first mode. In some embodiments while displaying, via the display generation component (e.g., the display controller and/or the touch-sensitive display system), settings (e.g., controls and/or parameters) corresponding to capturing media in the second mode, detecting a fourth respective input corresponding to a fourth configuration graphical object from the second set of configuration graphical objects, and in response to detecting the fourth respective input, displaying a fourth set of configuration graphical objects for modifying a fourth set of one or more settings (e.g., controls and/or parameters) corresponding to capturing media in the second mode. Displaying fewer configuration graphical objects while in the second capture mode compared to the graphical objects displayed while in the first capture mode, enhances the operability of the system and makes the user-system interface less cluttered and more efficient (e.g., by helping the user to provide proper inputs, reducing user mistakes when operating/interacting with the system, and notifying the user multi capture mode is available) which, additionally, reduces power usage and improves battery life of the system by enabling the user to use the system more quickly and efficiently.

In some embodiments, the third media item, when captured in the first mode (e.g., a mode corresponding to video mode 616B), includes data sufficient for presenting the third media item (e.g., presenting in the editing user interface) as a first media type (e.g., time-lapse, slow-motion, cinematic, video, photo, portrait, and/or panoramic) without including data sufficient for presenting the third media item as a second media type (e.g., as any additional media types other than the first media type), different from the first media type. In some embodiments data captured in a first mode is captured with image data from one, two, three, five, and/or all of the cameras of the computer system. Capturing data in a specific data mode (e.g., first mode, non-multi-capture mode, one of time-lapse, slow-motion, cinematic, video, photo, portrait, and/or panoramic), without including data sufficient for presenting the third media item as a second media type the enhances the operability of the system by reducing the necessary storage capacity.

In some embodiments, while displaying an editing interface for editing a respective media item that was previously captured, the computer system detects, via the one or more input devices, a fourth input (e.g., 620G) (e.g., a selection of an option (e.g., an affordance, button, graphical element, graphical object, and/or icon) that, when selected via the one or more input devices, initiates a process for displaying a second set of one or more edit options (e.g., an option that corresponds to the second type of media)); in response to detecting the fourth input: in accordance with a determination that the fourth input is detected while displaying the editing user interface that includes the first set of one or more edit options to edit the first type of media (e.g., time-lapse, slow-motion, cinematic, video, photo, portrait, and/or panoramic), the computer system displays a representation (e.g., preview) of the respective media item, wherein the representation of the media item corresponds to the first type of media (e.g., time-lapse, slow-motion, cinematic, video, photo, portrait, and/or panoramic); and in accordance with a determination that the fourth input is detected while displaying the editing user interface that includes the second set of one or more edit options to edit the second type of media, the computer system displays a representation of the respective media item, wherein the representation of the respective media item corresponds to the second type of media (e.g., as shown in the difference between how media item 626A1 is shown in FIG. 6E and FIG. 6I) (e.g., time-lapse, slow-motion, cinematic, video, photo, portrait, and/or panoramic). In some embodiments in response to detecting the fifth input, ceasing displaying the editing user interface. Displaying a representation of the respective media item based on type of media that was being edited at the time exit request was detected, enhances the predictability and operability of the system, enhances the visual feedback to the user and makes the user-system interface more efficient (e.g., by helping the user to provide proper inputs, reducing user mistakes when operating/interacting with the system, and allows the user to see the representation of the respective edited image) which, additionally, reduces power usage and improves battery life of the system by enabling the user to use the system more quickly and efficiently.

Note that details of the processes described above with respect to method 700 (e.g., FIG. 7) are also applicable in an analogous manner to the methods described below. For example, a media item captured using method 800 can be edited using one or more techniques of method 700. For another example, a media item edited according to method 700 can have been captured using method 1000. For brevity, these details are not repeated below.

FIG. 8 is a flow diagram illustrating a method for capturing and/or editing media that was captured using multiple different cameras using a computer system in accordance with some embodiments. Method 800 is performed at a computer system (e.g., 100, 300, 500, and/or 600) that is in communication with display generation component (e.g., 604) (e.g., a display controller and/or a touch-sensitive display system), one or more input devices (e.g., touch-sensitive surface of 604) (e.g., a touch-sensitive surface, a touchscreen, a button, and/or a microphone), a first camera (e.g., 602A), and a second camera (e.g., 602B, 602C, or 602D). In some embodiments the first camera and the second camera have fixed, but different, focal lengths. In some embodiments the focal length, field of view, and optical magnification properties of an optical system is fixed for each of the cameras, but the fixed focal length is different between the first camera and the second camera. In some embodiments the first camera is positioned on the front side of computer system and the second camera is positioned on the back side of the computer system. In some embodiments the computer system has more than two cameras (e.g., three, five, or ten)). Some operations in method 800 are, optionally, combined, the orders of some operations are, optionally, changed, and some operations are, optionally, omitted.

In some embodiments, the electronic device (e.g., 600) is a computer system. The computer system is optionally in communication (e.g., wired communication, wireless communication) with a display generation component (e.g., 604) and with one or more input devices (e.g., touch-sensitive portion of display 604). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an intuitive way for capturing and/or editing media that was captured using multiple different cameras. The method reduces the cognitive burden on a user for capturing and/or editing media that was captured using multiple different cameras, thereby creating a more efficient human-machine interface. For battery-operated computing devices, enabling a user to capture and/or edit media that was captured using multiple different cameras faster and more efficiently conserves power and increases the time between battery charges.

The computer system (e.g., 600) detects (802), via the one or more input devices (e.g., touch-sensitive portion of display 604), a first input (e.g., 620A) (e.g., a tap gesture, long press, double-tap gesture, or a hand gesture) that corresponds to a request to capture (e.g., store in memory) media corresponding to at least a portion of a field of view (e.g., the field of view corresponding to 606) of at least one of the first camera (e.g., 602A) and the second camera (e.g., 602D) (in some embodiments the media item has data sufficient for it to be presented in multiple media types: e.g., photo, video, and/or slow-motion media) (in some embodiments the media item is simultaneously captured media of multiple types) (in some embodiments a media item stored as a single file that includes data from the first and second cameras).

In response to detecting the first input, the computer system captures (804) a media item (e.g., media item corresponding to 626A1) corresponding to at least a portion of the field of view of at least one of the first camera and the second camera, wherein capturing the media item includes capturing (e.g., concurrently, simultaneously, and/or at the same time) first data (e.g., media data) from the first camera (e.g., 602A) and second data (e.g., media data) from the second camera (e.g., 602D); (in some embodiments the first input is detected at a selectable user interface object. In some embodiments the first input is detected as a result of the user making a hand and/or finger gesture in the air.).

Subsequent to capturing the media item, the computer system displays (806), via the display generation component, a selectable user interface object (e.g., 636) (e.g., an edit affordance) for editing (e.g., modifying, changing the appearance of, and/or revising) the media item.

The computer system detects (808), via the one or more input devices, a second input (e.g., 620C) (e.g., a tap gesture, long press, double-tap gesture, or a hand gesture) directed to the selectable user interface object.

In response to detecting the second input directed to the selectable user interface object, the computer system displays (810) an editing user interface (e.g., 642A) that includes (e.g., that concurrently includes) a first representation (e.g., 626A3 of FIG. 6O) (e.g., an image, photograph, or video displayed via the display generation component) of the media item based primarily on the first data from the first camera (e.g., 602A) (e.g., more than 50%, 60%, 70%, 80%, or 80% the first representation is based on the first data from the first camera and/or a primary region (e.g., a central region and/or a center) of the first representation is based on the first data from the first camera) (in some embodiments the first representation is not primarily based on the second data from the second camera and/or less than 50%, 40%, 30%, 20%, or 10% of the data of the first representation is based on the second data from the second camera; In some embodiments the first representation is not based on any data from the second data from the second camera; In some embodiments a primary region (e.g., a central region and/or a center) of the first representation is not based on the second data from the second camera) and a camera option selectable user interface object (e.g., 613) (in some embodiments the camera option selectable user interface object can be a set of one, two, four, or any number of selectable user interface objects) for displaying a second representation (e.g., 626A3 of FIG. 6P) (e.g., an image, photograph, or video displayed via the display generation component) of the media item that is based primarily on the second data from the second camera (e.g., 602D) (e.g., more than 50%, 60%, 70%, 80%, or 80% the second representation is based on the second data from the second camera and/or a primary region (e.g., a central region or a center) of the second representation is based on the second data from the second camera) (in some embodiments the second representation is not primarily based on the first data from the first camera and/or less than 50%, 40%, 30%, 20%, or 10% of the data of the second representation is based on the first data from the first camera; In some embodiments the second representation is not based on any data from the first data from the first camera; In some embodiments a primary region (e.g., a central region, or a center) of the second representation is not based on the first data from the first camera).

The computer system detects (812), via the one or more input devices, a third input (e.g., 6200) (e.g., a tap gesture, long press, double-tap gesture, or a hand gesture) directed to the camera option selectable user interface object.

In response to detecting the third input: the computer system ceases (814) to display the first representation of the media item (e.g., 626A3 of FIG. 6O) that is based primarily on the first data from the first camera; and the computer system displays (816) the second representation of the media item (e.g., 626A3 of FIG. 6P) that is based primarily on the second data from the second camera. In some embodiments the first representation of the media item is displayed concurrently with the camera option selectable user interface object for displaying the second representation of the media item. In some embodiments the camera option selectable user interface object for displaying the second representation of the media item corresponds to a selectable user interface object to flip between the first camera and the second camera. In some embodiments the selectable user interface object for displaying the second representation of the media item corresponds to an optical zoom level which corresponds to a fixed focal length camera (e.g., the first camera corresponds to a first zoom level and the second camera corresponds to a different zoom level). In some embodiments the media item is captured by a second computer system (e.g., an external electronic device) and is then sent/transmitted/saved to the computer system for editing.). Capturing a media item with data from both a first and second camera and then providing a camera option selectable user interface object that causes a transition from a first representation of the media item that is primarily based on the first data from the first camera to a second representation of the media item that is primarily based on the second data from the second camera provides the user with more robust media capture that includes data from multiple cameras and allows the user to access different representations of the captured media data, which provides additional control options without cluttering the UI with additional displayed controls. Doing so also assists the user with composing media capture events and reduces the risk that transient media capture opportunities are missed due to characteristics (e.g., orientation, zoom level, and/or sensor size) of a first camera that can be different from the characteristics of the second camera, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first camera (e.g., 602A) is oriented in a first direction (e.g., a direction directed away from the back of the computer system (e.g., a back-facing camera)); and the second camera (e.g., 602D) is oriented in a second direction, different from the first direction (e.g. a direction directed away from a front of the computer system (e.g., a front-facing camera) (in some embodiments the first direction and the second direction differ by at least 45°, 90°, 135°, or 180° (e.g., are opposite directions)). In some embodiments selecting the selectable user interface object causes the representation of the media item to switch between data from cameras having different orientations (e.g., front to back). In some embodiments the first camera is first respective camera of a first set of cameras (e.g., one or more) positioned (e.g., oriented) on the opposite side (e.g., back side) of the computer system relative to a primary display and/or a touch-sensitive display of the computer system. In some embodiments the second camera is a second respective camera of a second set of cameras (e.g., one or more) positioned (e.g., oriented and/or located) on the same side of the computer system relative to the primary display and/or the touch-sensitive display of the computer system. Capturing a media item with data from cameras with different orientations assists the user with composing media capture events and reduces the risk that transient media capture opportunities are missed due to misorientation of a camera. Doing so also provides the user with greater flexibility when editing the media item, by providing an option to display a representation of the media item from a different orientation.

In some embodiments, the media item includes video data (e.g., as shown in FIGS. 6O and 6P) (e.g., moving visual data captured over time); and the editing user interface includes a video position user interface object (e.g., 640 at the position corresponding to 662C in FIG. 6P) (e.g., a filmstrip, a position scrubber bar, and/or a playback position bar) that indicates a plurality of points in time (e.g., timestamps within the video data (e.g., 1 minute or 1 minute and 30 seconds)) within the video data (in some embodiments including an indication of a current playback position within the video data). In such embodiments, after detecting the third input (in some embodiments in response to detecting the third input), the computer system displays a graphical indication (e.g., an icon, border effect, and/or thumbnails that transition from one representation to another) of a first point in time of the plurality of points in time within the video data that corresponds to a transition from displaying the first representation of the media item to displaying the second representation of the media item. In some embodiments the graphical indication of the first point in time is overlaid on a portion of the video position user interface object; In some embodiments the graphical indication of the first point in time is integrated into (e.g., a part of) the video position user interface object; In some embodiments the graphical indication of the first point in time is transition within a visual filmstrip from representations that are based on the first data from the first camera to representations that are based on the second data from the second camera.

Displaying a graphical indication of a first point in time of the plurality of points in time within the video data that corresponds to a transition from displaying the first representation of the media item to displaying the second representation of the media item provides improved visual feedback regarding the point of transition within the video (e.g., allowing the user to reverse the transition).

In some embodiments, the first representation of the media item includes a depth-of-field effect (e.g., as seen in FIG. 6H) (e.g., a simulated depth effect and/or a bokch effect (e.g., an effect that presents elements (e.g., a subject and/or a background) within the representation that are at different depths with different levels of sharpness and/or blurring)) that is not included in the second representation of the media item (e.g., as seen in FIG. 6P). In some embodiments the second representation of the media item includes a depth-of-field effect (e.g., a simulated depth effect) that is not included in the first representation of the media item. In some embodiments the first representation of the media item includes a simulated lighting effect (e.g., simulated studio lighting, spot lighting, and/or contour lighting) that is not included in the second representation of the media item. Transitioning between a representation that includes a depth-of-field effect and one that does not provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the depth-of-field effect is a simulated depth-of-field effect that is based on data from a plurality of cameras (e.g., 602A and 602B) (e.g., the first camera and the second camera) that are in communication with the computer system. In some embodiments the simulated depth-of-field effect is based on the first data from the first camera and the second data from the second camera. Providing the user with the capability to display the media item with a representation that includes a simulated depth-of-field effect that is based on data from a plurality of cameras provides the user with greater flexibility when editing representations of the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first data from the first camera includes data captured at a first zoom level (e.g., 1× corresponding to 609B) (e.g., 1×, 2×, or 10×) (in some embodiments the first camera is a fixed focal length camera that captures data with a first level of optical zoom; In some embodiments the first zoom level is a digital zoom level); the second data from the second camera includes data captured at a second zoom level that is different from the first zoom level (e.g., 3X corresponding to 609C) (in some embodiments the second camera is a fixed focal length camera that captures data with a second level of optical zoom; In some embodiments the second zoom level is a digital zoom level); and the first representation of the media item is at the first zoom level and the second representation of the media item is at the second zoom level. Capturing a media item with data from cameras with different zoom levels assists the user with composing media capture events and reduces the risk that transient media capture opportunities are missed due to an improper zoom level of a camera. Doing so also provides the user with greater flexibility when editing the media item, by providing an option to display a representation of the media item at a different zoom level.

In some embodiments, the media item includes video data (e.g., moving visual data captured over time); and displaying the second representation of the media item includes displaying a transition (e.g., a gradual transition and/or an animated transition) that progresses over a first period of time (e.g., 0.25 seconds, 0.5 seconds, 1 second, or 2 seconds) from the first zoom level of the first representation of the media item to the second zoom level of the second representation of the media item, wherein the transition includes displaying a third representation of the media item that is at a third zoom level that is between the first zoom level and the second zoom level (e.g., as discussed with reference to FIGS. 6M and 6N) (e.g., the first zoom level is 1× and the second zoom level is 3×, with the third zoom level being 2×, or the first zoom level is 2× and the second zoom level is 1× and the third zoom level is 1.5×). Displaying a progressive transition of zoom levels provides the user with improved visual feedback as to the selected transition (e.g., by extending the period over a more noticeable duration of time), which provides improved visual feedback.

In some embodiments, the media item includes video data (e.g., moving visual data captured over time); the first representation of the media item is a representation of the video data in a first video playback mode (e.g., as in FIG. 6F) (e.g., standard speed playback, timelapse playback, slow-motion playback, and/or cinematic video playback (e.g., video playback with depth-of-field effects)); and the second representation of the media item is a representation of the video data in a second video playback mode (e.g., as in FIG. 6G different from the first video playback mode (e.g., as discussed with reference to the transition between FIGS. 6F and 6G). Providing the user with the capability display the media item with representations in different video modes provides the user with greater flexibility when editing representations of the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, prior to detecting the first input, the computer system displays via the display generation component, a media capture user interface (e.g., 605) that includes: a still media capture selectable user interface object (e.g., 616A) that, when selected, causes the computer system to be configured to capture still media (e.g., a still image or a photograph); and a video media capture selectable user interface object (e.g., 616B) that, when selected, causes the computer system to be configured to capture video media (e.g., moving visual data captured over time (e.g., standard video, timelapse video, slow motion video, and/or cinematic video (e.g., video one depth-of-field effects)). In some embodiments when the computer system is configured to capture still media, the computer system captures the media with a first set of cameras and when the computer system is configured to capture video media, the computer system captures the media with a second set of cameras that is different from (e.g., that includes or excludes one or more cameras that are in or not in the first set of cameras) the first set of cameras. Providing the user with selectable objects to configure media capture in a still or video mode, prior to initiating capture, assists the user with composing media capture events and reduces the risk that transient media capture opportunities are missed due to the computer system being improperly configured, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after capturing the media item (e.g., corresponding to 626A1) (e.g., before displaying the first representation and/or the second in the editing user interface), displaying a fourth representation of the media item (e.g., 626A1) (in some embodiments in a media gallery user interface that includes representations of a plurality of media items that includes the media item), wherein the fourth representation of the media item includes an indication (e.g., 630A) (e.g., an icon or text) that the media item includes data that can be used to perform a first type of editing operation (e.g., an operation corresponding to input 6200) (e.g., a camera transition operation and/or a mode transition operation (e.g., still to video or a 1st video mode to a 2nd video mode)) on the media item (in some embodiments a second media item of the plurality of media items in the media gallery user interface that does not include data that can be used to perform the first type of editing operation on the second media item does not include the indication). Displaying an indication (e.g., an icon or text) that the media item includes data that can be used to perform a first type of editing operation indicates to the user that the operation can be performed on the media item, which provides improved visual feedback.

In some embodiments, the computer system is in communication with a third camera (e.g., 602C) (e.g., a camera having an orientation, a zoom level, and/or a sensor size that is different than that of the first camera and/or the second camera); and capturing the media item includes capturing (e.g., concurrently, simultaneously, and/or at the same time as the first data and/or the second data is captured) third data from the third camera. In some embodiments the first camera and second camera are rear-facing cameras, and the third camera is a front-facing camera. Capturing a media item with data from a first, second, and third cameras provides the user with more robust media capture that includes data from at least three cameras and allows the user to access different representations of the captured media data, which provides additional control options without cluttering the UI with additional displayed controls. Doing so also assists the user with composing media capture events and reduces the risk that transient media capture opportunities are missed due to characteristics (e.g., orientation, zoom level, and/or sensor size) of a first camera that can be different from the characteristics of the second camera or a third camera, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Doing so also provides the user with greater flexibility when editing the media item, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, after capturing the media item (e.g., before displaying the first representation and/or the second in the editing user interface), displaying a media viewer user interface (e.g., 627) (e.g., a user interface accessible from a gallery view that includes representations of a plurality of media items, including the first media item) that concurrently includes: a fifth representation of the media item (e.g., 626A2); and an editing selectable user interface object (e.g., 632A or 632B) that, when selected, causes a second type of editing operation (e.g., a playback speed increase or decrease operation, a camera transition operation, and/or a mode transition operation (e.g., still to video or a 1st video mode to a 2nd video mode)) to be performed on the media item. In some embodiments the selectable user interface object for editing the media item is displayed in the media viewer user interface. Providing the user with one or more editing options from a media viewer user interface (e.g., without having to access the editing user interface) reduces the number of inputs needed to perform an operation and provides feedback as to the availability of those editing options.

Note that details of the processes described above with respect to method 800 (e.g., FIG. 8) are also applicable in an analogous manner to the methods described above and below. For example, a media item captured using method 800 can be edited using one or more techniques of method 700. For another example, a media item can be captured using both the techniques of method 800 and 1000. For brevity, these details are not repeated below.

FIGS. 9A-9F illustrate exemplary user interfaces for capturing media data, in accordance with some embodiments. The user interfaces in these figures are used to illustrate the processes described below, including the processes of FIG. 10.

Figure 9A:
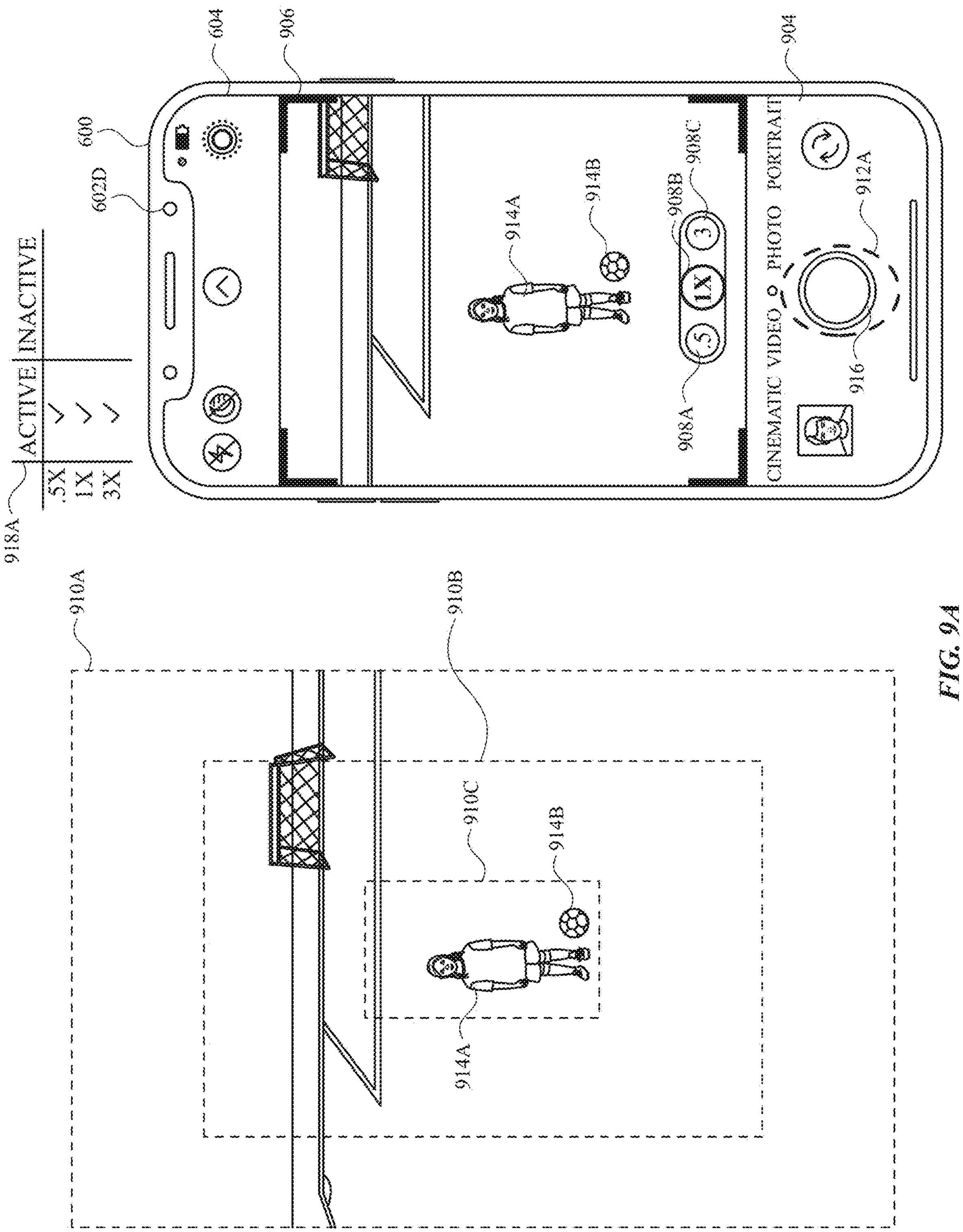
FIGS. 9A-9F illustrate exemplary user interfaces for selecting a subset of cameras with which to capture media.
Figure 10:
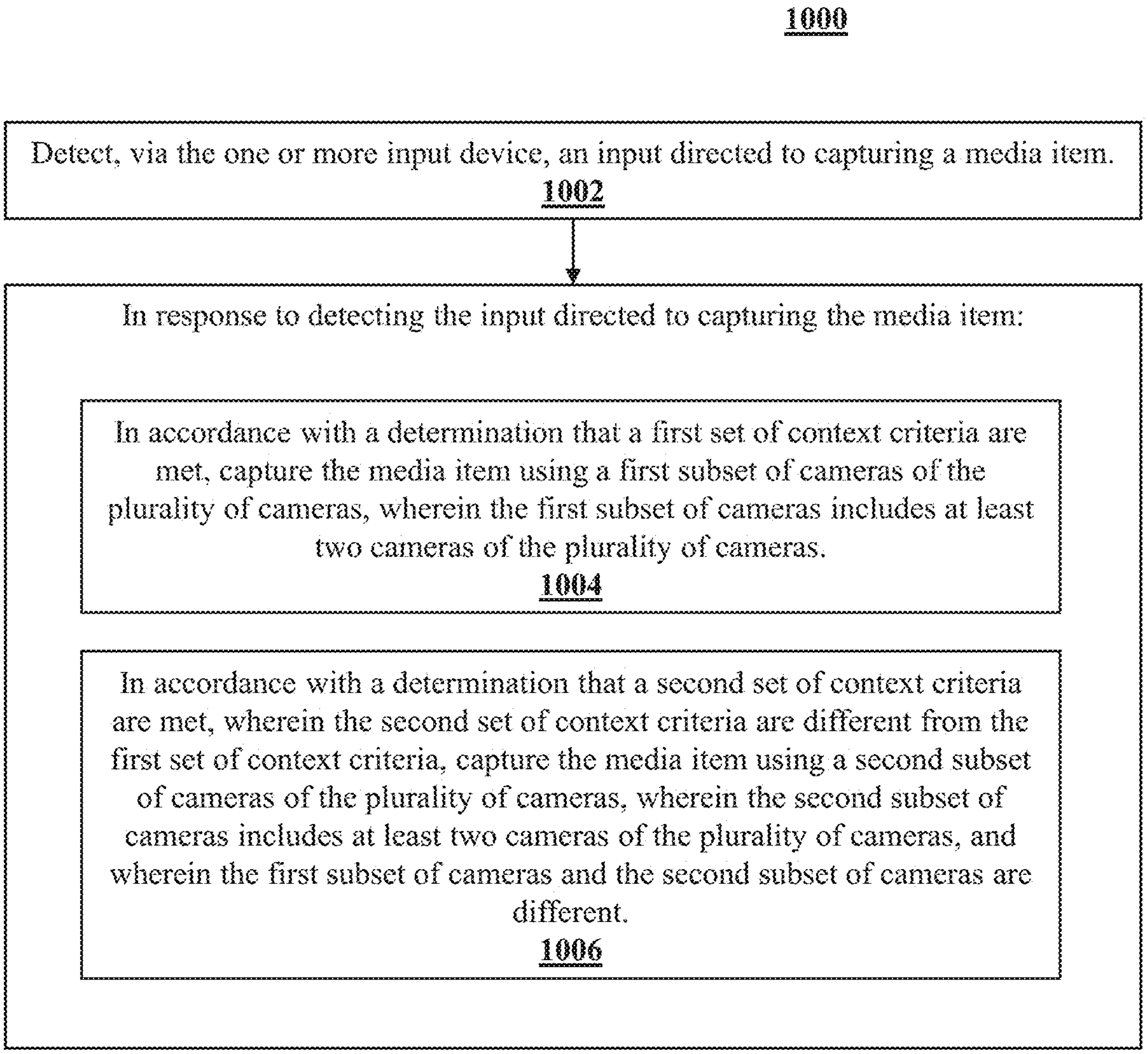
FIG. 10 is a flow diagram of a method for selecting a subset of cameras with which to capture media.

FIG. 9A depicts the front of computer system 600. Computer system 600 displays camera user interface 904 of a camera application. Camera user interface 904 includes digital viewfinder 906 in a portion of camera user interface 904. Digital viewfinder 906 displays a preview of data from a first camera (e.g., camera 602B in FIG. 6A) of computer system 600 that is currently configured to capture media using the camera. Digital viewfinder 906 includes a representation of first subject 914A and second subject 914B. Digital viewfinder 906 further includes magnification selection graphical objects 908A, 908B, and 908C. Each magnification selection graphical object 908A, 908B, and 908C corresponds to three different cameras (e.g., cameras 602A, 602B, or 602C in FIG. 6A) of computer system 600. Computer system 600 also includes front camera 602D on the front of computer system 600. In some examples, the first camera (e.g., 602A), a second camera (e.g., 602B), a third camera (e.g., 602C), and front camera 602D have fixed, but different, focal lengths. In some examples, the focal length, field of view, and/or optical magnification properties of the optical system is fixed for each of the four cameras. In some embodiments, in addition to having different fixed focal lengths, the four cameras have different fixed fields of view and different fixed optical magnification properties.

FIG. 9A further depicts three different fields of view of the physical environment for each respective camera of the three different cameras (e.g., cameras 602A, 602B, or 602C in FIG. 6A) on the back of computer system 600. Field of view 910A corresponds to the first camera (e.g., 602A) of computer system 600 (e.g., a 0.5× magnification). Field of view 910B corresponds to the second camera (e.g., 602B) of computer system 600 (e.g., a 1× magnification). Field of view 910C corresponds to the third camera (e.g., 602C) (e.g., 3× magnification). Furthermore, digital viewfinder 906 displays the selected magnification selection graphical object 908B in a larger format than unselected magnification selection graphical objects 908A and 908C. In some embodiments, the magnification selection graphical objects are displayed at the same size. In some embodiments, the respective field of views of at least two of the cameras of the respective cameras (e.g., cameras 602A and 602D) do not overlap.

In FIG. 9A, table 918A illustrates which respective cameras of computer system 600 are actively capturing data (e.g., at the point in time corresponding to FIG. 9A). In some embodiments, computer system 600 continually detects (e.g., before and after detecting selection of shutter icon 916), via one or more sensors of computer system 600, environment data and context data corresponding to computer system 600 as well as content data captured within respective fields of view (e.g., 910A, 910B, and/or 910C) of the respective cameras of computer system 600. Based on all or some of this detected information, in some embodiments, computer system 600 automatically (e.g., without user input and/or selection) selects cameras for media capture. As indicated in table 918A, computer system 600 selected respective cameras that correspond to the 0.5×, 1×, and 3× magnifications (e.g., cameras 602A, 602B, and 602C in FIG. 6A) for media capture. In some embodiments, computer system 600 captures media data from front camera 602D concurrently with data from the one or more respective cameras (e.g., cameras 602A, 602B, and/or 602C in FIG. 6A) on the back of computer system 600.

In FIG. 9A, computer system 600 captures media data in the background from the respective cameras (e.g., cameras 602A, 602B, and 602C in FIG. 6A) on the back of computer system 600 even before computer system 600 detects an input on shutter icon 916. In some embodiments, computer system 600 captures media data from all the available cameras on computer system 600 prior to selection of shutter icon 916 regardless of the context or environment of computer system 600. In some embodiments, computer system 600 captures media data from at least one camera of the respective cameras (e.g., cameras 602A, 602B, 602C, in FIGS. 6A and 602D) of computer system 600 before the camera application is displayed (e.g., before the camera application has been started/launched). In some embodiments, computer system 600 automatically (e.g., without detecting a user input) selects which respective cameras (e.g., one or a plurality) to use to capture media data based on the content within a respective field of view (e.g., 910A, 910B, and/or 910C) of the respective cameras of computer system 600 (e.g., cameras 602A, 602B, and/or 602C in FIGS. 6A and 602D). In FIG. 9A, computer system 600 detects input 912A on shutter icon 916 to initiate capture of media data.

Figure 9B:
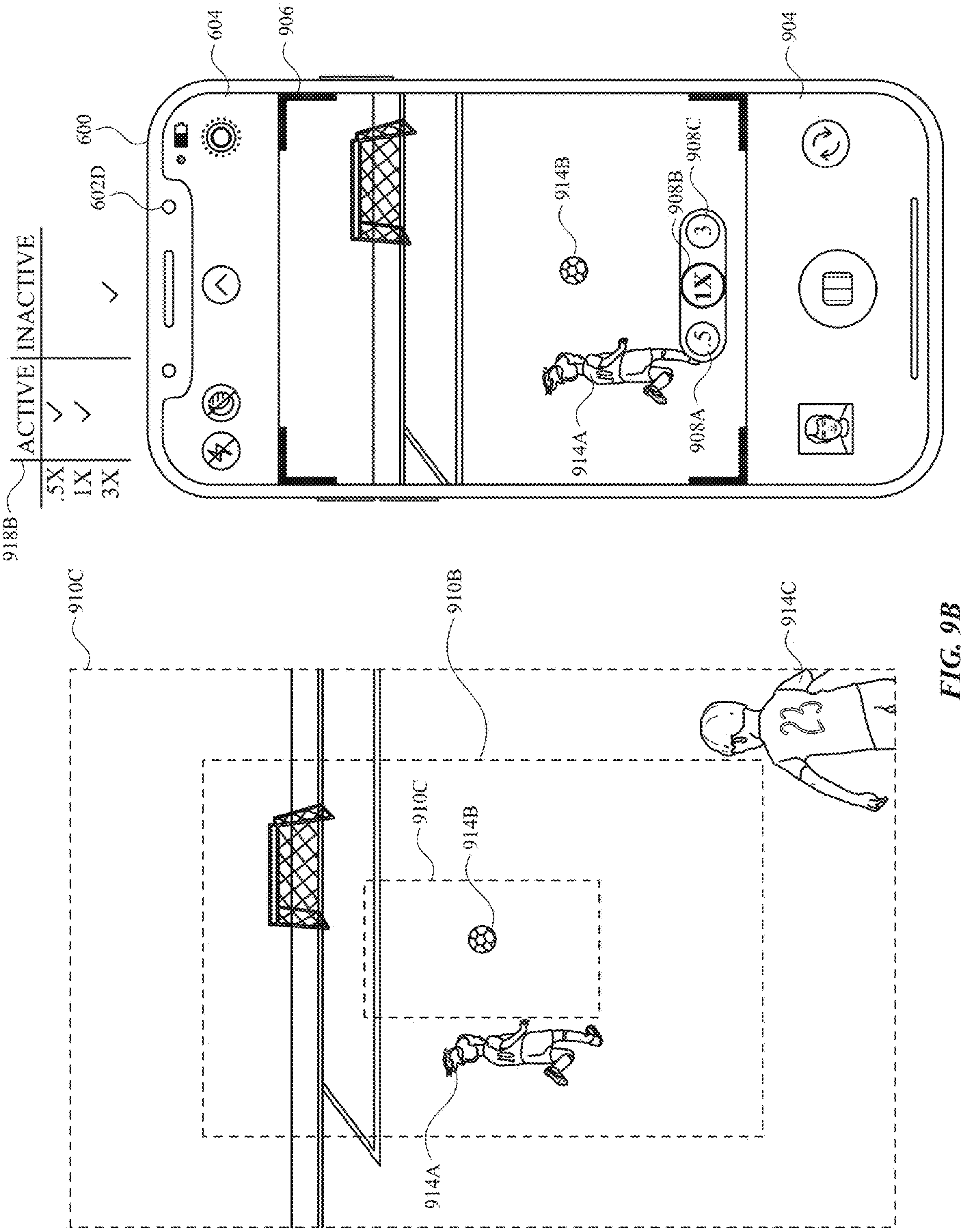

In FIG. 9B, in response to detecting input 912A, computer system 600 initiates media data capture. As computer system 600 captures the media data, computer system 600 detects third subject 914C entering field of view 910C. In response to detecting subject entering field of view 910C, computer system 600 changes which cameras are selected for media data capture. Because magnification level 1× is selected in camera user interface 904, as depicted in table 918B, computer system 600 continues to capture media data corresponding to the camera that corresponds to the 1× magnification. Also, because computer system 600 detected third subject 914C entering the scene, computer system 600 selects a respective camera corresponding to 0.5× magnification for media capture, as depicted in table 918B. In some embodiments, including the embodiment of FIG. 9B, computer system 600 does not select a respective camera corresponding to 3× to save storage space. In some embodiments, computer system 600 continues to capture media data using all available respective cameras of computer system 600. In some embodiments, computer system 600 selects cameras corresponding to the 0.5× magnification and 3× magnification of computer system 600 for media data capture.

Figure 9C:
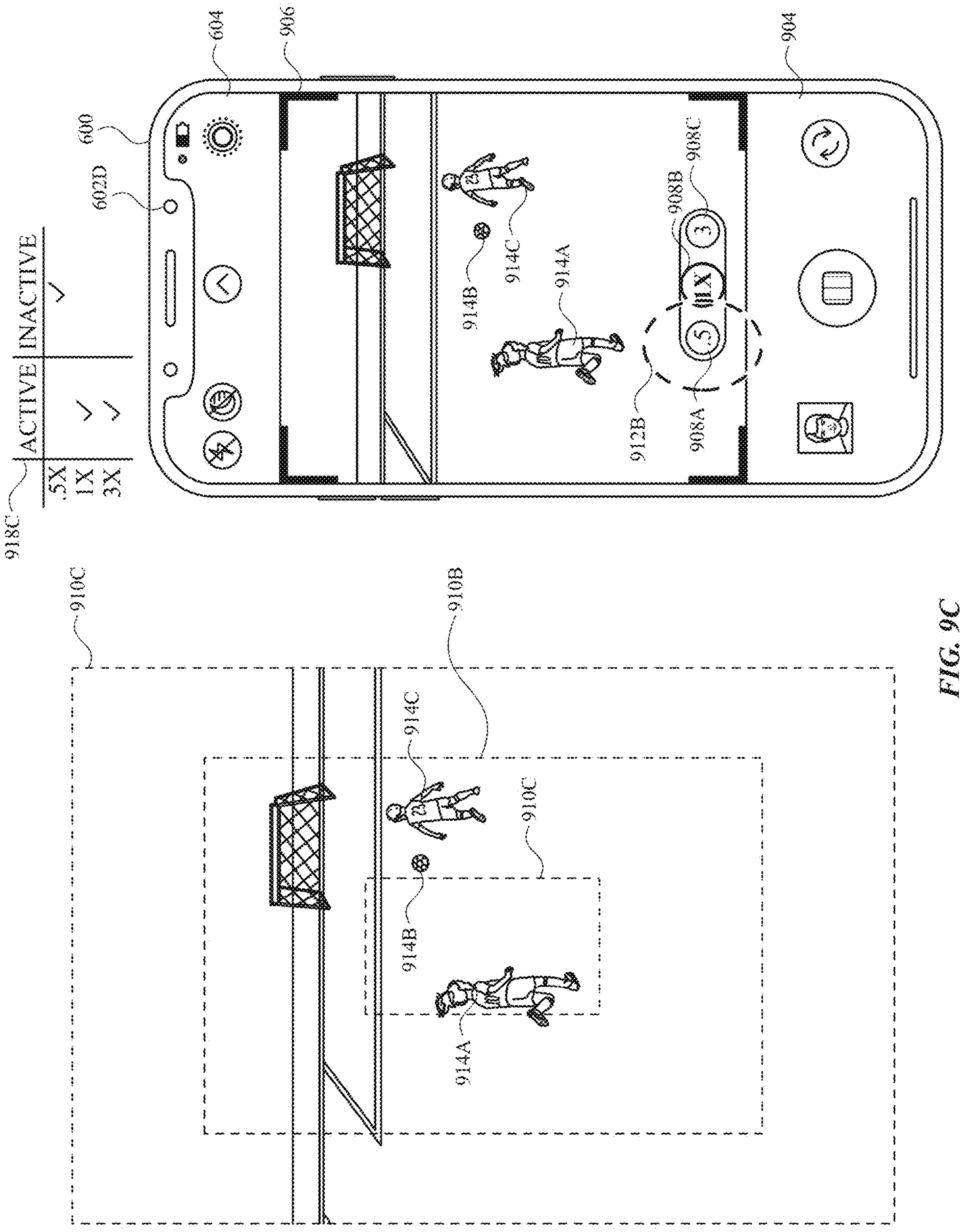

In FIG. 9C, computer system 600 detects that first subject 914A, subject 914B, and subject 914 are progressively getting further away from computer system 600. As a result, computer system 600 changes which respective cameras of computer system 600 captures media data. Because computer system 600 detected that magnification level 1× is selected in camera user interface 904, computer system 600 continues to capture media data corresponding to the camera that corresponds to the 1× magnification, as depicted in table 918C. Also, because computer system 600 detected first subject 914A, second subject 914B, and third subject 914C progressively getting further away from computer system 600, computer system 600 selects a respective camera corresponding to 3× magnification for media capture, as depicted in table 918B. In some embodiments, computer system 600 selects a respective camera corresponding to a higher magnification level for media data capture in response to computer system 600 detecting that the media data being captured is of a sporting event or another event where it is desirable to capture data with a higher magnification (e.g., concert and/or theater). In FIG. 9C, computer system 600 does not select the camera that corresponds to 0.5× magnification because no subjects are detected in the field of view 810C that are not also in field of view 810B and/or in order to save space. In FIG. 9C, computer system 600 further detects input 912B on magnification selection graphical object 908A that corresponds to a respective camera with a 0.5× magnification.

Figure 9D:
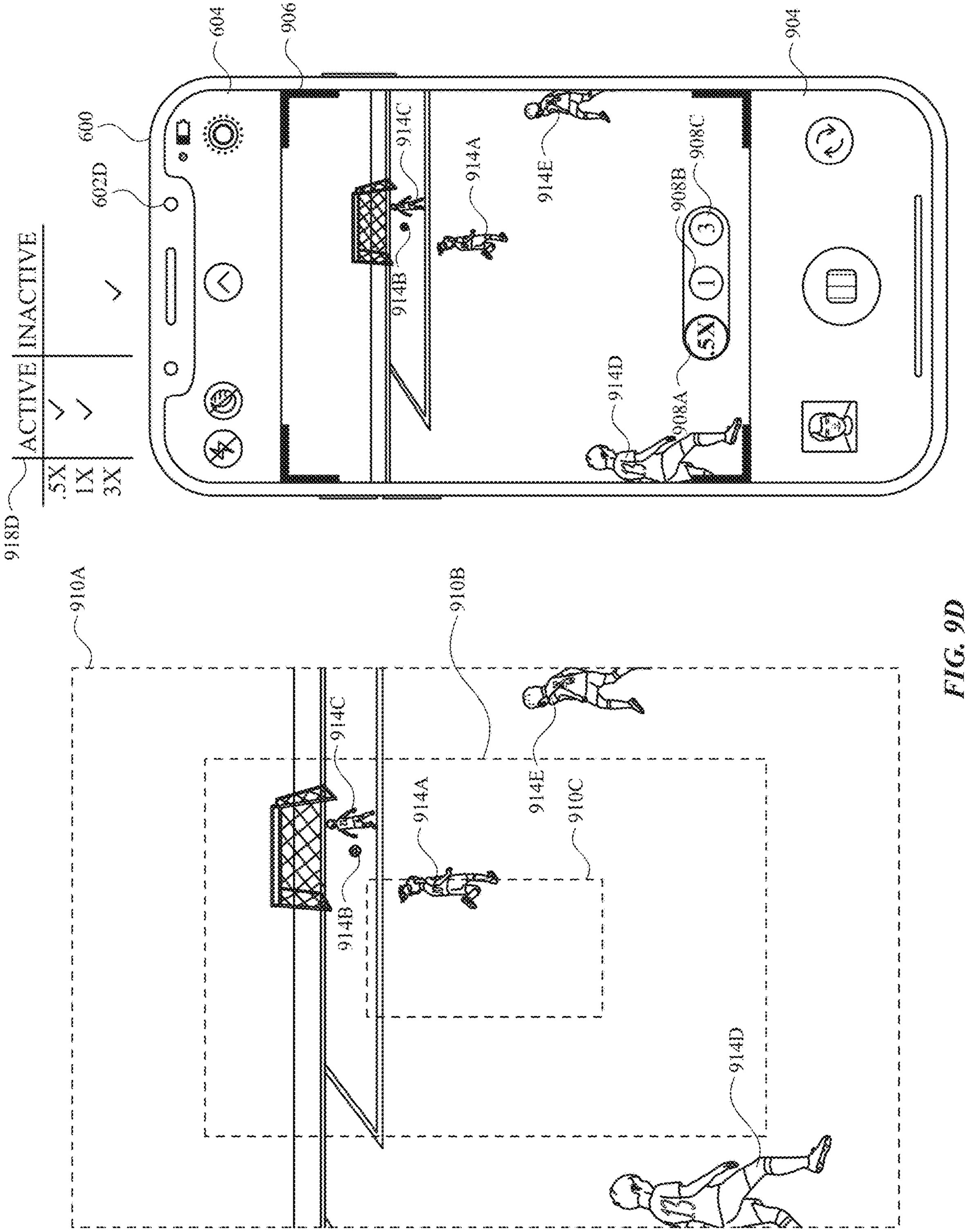

In FIG. 9D, in response to detecting input 912B, computer system 600 changes which respective cameras of computer system 600 captures media data. As illustrated in table 918D, in FIG. 9D computer system 600 captures media data with respective cameras that correspond to the 0.5× magnification and the 1× magnification. Computer system 600 selects the respective camera corresponding to the 0.5× magnification level in response to detecting activation of graphical objects 908A. Computer system 600 selects the camera corresponding to 1× magnification to capture media data in response to detecting a greater number of subjects within field of view 910B than in 910C. In some embodiments, computer system 600 selects camera corresponding to 1× magnification to capture media data because it was selected (e.g., user selected or automatically selected) prior to detecting input 912B on magnification selection graphical objects 908A.

Figure 9E:
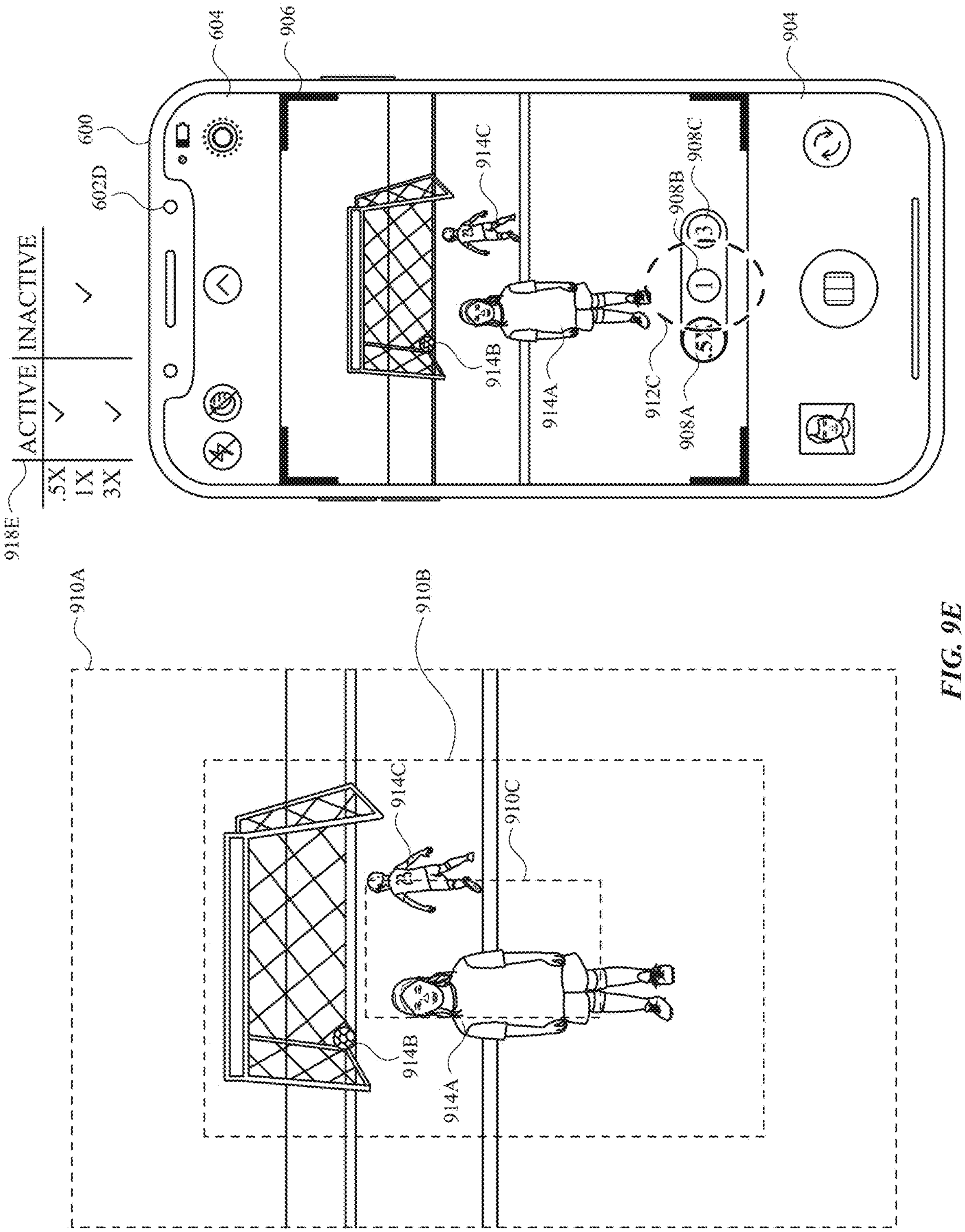

In FIG. 9E, computer system 600 detects that first subject 914A is closer to computer system 600 than in FIG. 9D. In response to detecting first subject 914A closer to computer system 600, computer system 600 changes which respective cameras of computer system 600 captures media data. As illustrated in table 918E, in FIG. 9E computer system 600 captures media data with respective cameras that correspond to the 0.5× magnification and the 3× magnification. Computer system 600 selects the respective camera corresponding to the 3× magnification level in response to detecting that first subject 914A has moved closer to computer system 600. Computer system 600 selects the respective camera corresponding to 0.5× magnification to capture media data based on a determination that magnification selection graphical object 908A that corresponds to magnification level 0.5× is currently selected in camera user interface 904. In some embodiments, computer system 600 selects the respective camera corresponding to 3× magnification to capture media data in response to computer system 600 detecting that first subject 914A moves progressively closer to computer system 600. In some embodiments, computer system 600 selects the respective camera corresponding to the 3× magnification to capture media data, because computer system 600 determines, based on the context of the environment, that it may be desirable to later edit the captured media data in the portrait editing mode, which preferably uses the media data captured at 3× magnification. In FIG. 9E, computer system 600 further detects input 912C on magnification selection graphical object 908B that corresponds to a respective camera with a 1× magnification.

Figure 9F:
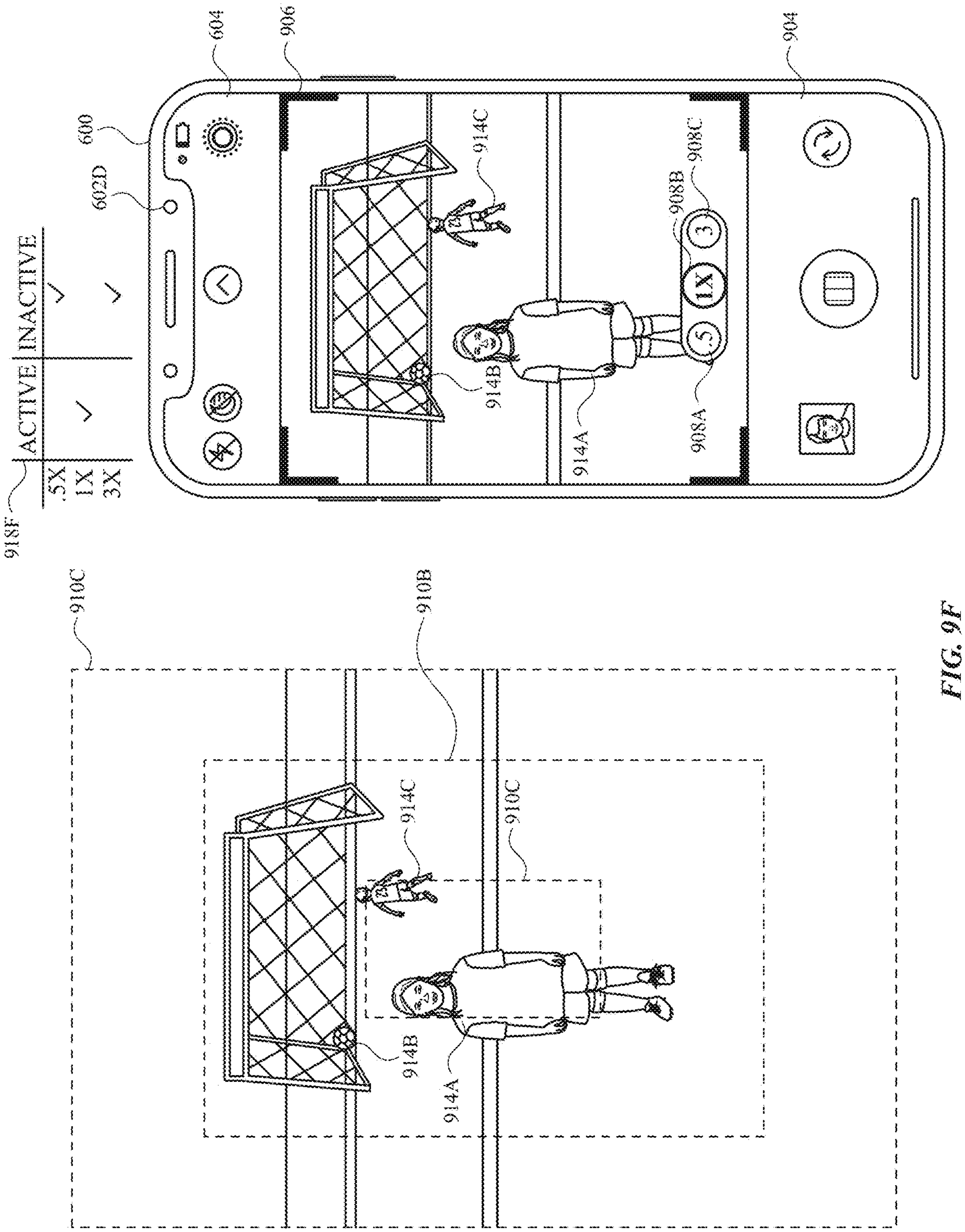

In FIG. 9F, in response to detecting input 912C, computer system 600 changes which respective cameras of computer system 600 captures media data. As illustrated in table 918F, in FIG. 9F computer system 600 captures media data with a respective camera that corresponds to the 1× magnification. Computer system 600 selects the respective camera corresponding to the 1× magnification level in response to detecting activation of graphical object 908B. Computer system 600 does not select other respective cameras, because it detects that it is undesirable and/or unnecessary to capture media data with other cameras based on the content of the captured media data. In some embodiments, computer system 600 selects a single camera for media capture to conserve storage space. In some embodiments, in response to computer system 600 detecting an input to stop the capture of media data, computer system 600 saves the captured media. In some embodiments, the saved media data includes the media data that was captured before (10 seconds, 20 seconds, 1 minute, and/or 5 minutes) computer system 600 detected input 912A on shutter icon 916 in FIG. 9A. In some embodiments, computer system 600 selects camera 602D for media data capture either alone or in conjunction with one or more of the respective cameras (e.g., cameras 602A, 602B, and/or 602C in FIG. 6A) based on detected information regarding the environment and context of computer system 600 as well as detected content within a respective field of view of any of the cameras of computer system 600.

FIG. 10 is a flow diagram illustrating a method for selecting a subset of cameras with which to capture media using a computer system in accordance with some embodiments. Method 1000 is performed at a computer system (e.g., 100, 300, 500, and/or 600) that is in communication with a display generation component (e.g., 604) (e.g., a display controller and/or a touch-sensitive display system) one or more input devices (e.g., a touch-sensitive portion of 604) (e.g., a touch-sensitive surface, a touchscreen, a button, and/or a microphone), and a plurality of cameras that includes at least three cameras (e.g., 602A, 602B, 602C, and/or 602D). In some embodiments the focal length, field of view, and optical magnification properties of an optical system is fixed for each of the plurality of cameras, but one or more of the fixed focal lengths, the fixed field of view, and/or the optical magnification properties are different between a first camera and a second camera of the plurality of cameras. In some embodiments a first camera of the plurality of cameras is positioned on the front side of computer system and the second camera of the plurality of cameras is positioned on the back side of the computer system.). Some operations in method 1000 are, optionally, combined, the orders of some operations are, optionally, changed, and some operations are, optionally, omitted.

In some embodiments, the electronic device (e.g., 600) is a computer system. The computer system is optionally in communication (e.g., wired communication and/or wireless communication) with a display generation component (e.g., 604) and with one or more input devices (e.g., touch-sensitive portion of display 604). The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 1000 provides an intuitive way for selecting a subset of cameras with which to capture media. The method reduces the cognitive burden on a user for selecting a subset of cameras with which to capture media, thereby creating a more efficient human-machine interface. For battery-operated computing devices, enabling a user to use a device that selects a subset of cameras with which to capture media faster and more efficiently conserves power and increases the time between battery charges.

The computer system (e.g., 600) detects (1002), via the one or more input devices (e.g., a touch-sensitive portion of 604), an input (912A) (e.g., (e.g., a tap gesture, long press, double-tap gesture, or a hand gesture) directed to capturing (e.g., storing in memory) a media item (e.g., the media item has data sufficient for it to be presented in multiple media types: e.g., photo, video, and/or slow-motion media) (in some embodiments the media item is simultaneously captured media of multiple types.).

In response to detecting the input directed to capturing the media item: in accordance with a determination (e.g., made by the computer system and/or an external device in communication with the computer system) that a first set of context criteria are met, the computer system captures (e.g., 1004) the media item using a first subset of (e.g., not all or fewer than all) cameras of the plurality of cameras, wherein the first subset of cameras includes at least two cameras of the plurality of cameras (e.g., 60AB and 602B and/or cameras corresponding to 0.5× and 1× magnifications as shown in FIG. 9B); and (in some embodiments the first subset of cameras used to capture the media item are chosen automatically and/or based on predetermined settings) (in some embodiments the set of context criteria includes a criterion based on the state of the computer system. In some embodiments the set of context criteria includes a criterion based on the environment (e.g., geographic location and/or environmental conditions). In some embodiments the set of context criteria includes a criterion based on data captured from at least one of the plurality of cameras. In some embodiments the set of context criteria includes a criterion based on an electronic sensor (i.e., not the camera) of the computer system.) in accordance with a determination that a second set of context criteria are met, wherein the second set of context criteria are different from the first set of context criteria (e.g., the second set of context criteria includes at least one criterion not included in the first set of context criteria or vice versa), the computer system captures (1006) the media item using a second subset of cameras of the plurality of cameras (e.g., 602B and 602C and/or cameras corresponding to 1× and 3× magnifications as shown in FIG. 9C), wherein the second subset of cameras includes at least two cameras of the plurality of cameras, and wherein the first subset of cameras and the second subset of cameras are different (e.g., the first subset of cameras includes at least one camera that is not included in the second subset of cameras or vice versa). Capturing media using a first subset or a second subset of cameras based on context criteria, performs an operation when a set of conditions has been met without requiring further user input. Doing so also assists the user with composing media capture events and reduces the risk that transient media capture opportunities are missed due to characteristics (e.g., orientation, zoom level, and/or sensor size) of a camera in one subset that can be different from the characteristics of cameras in the second subset, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second subset of cameras (e.g., as shown in 918B) includes at least one camera (e.g., 602B or a camera corresponding to 1× magnification) (e.g., a first camera) that is included in the first subset of cameras (e.g., as shown in 918C). In some embodiments the second subset of cameras includes all of the cameras included in the first subset of cameras, as well as one or more additional cameras that are not included in the first subset of cameras. Having at least one camera in common between the two subsets provides the subsets with overlapping capabilities, which can assist the user with composing media capture events and reduces the risk that transient media capture opportunities are missed due to camera characteristics (e.g., orientation, zoom level, and/or sensor size) not having sufficient overlap to reduce the risk of miscapture, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second subset of cameras (e.g., as shown in 918C) includes at least one camera (e.g., 602C or a camera corresponding to 3× magnification) (e.g., a second camera) that is not included in the first subset of cameras (e.g., as shown in 918B). In some embodiments the second subset of cameras and the first subset of cameras includes at least one camera common to both sets, but each subset also includes one or more cameras that are not included in the other subset of cameras. Having at least one camera in the second subset that is not in the first subset provides the second subset with captured capabilities that are not provided by the first subset, which can assist the user with composing media capture events and reduces the risk that transient media capture opportunities are missed due to camera characteristics (e.g., orientation, zoom level, and/or sensor size) not being sufficient to reduce the risk of miscapture, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of context criteria includes a first criterion that is met based on a preselected zoom level (e.g., 1× as shown in FIG. 9B) (e.g., a currently selected zoom level or a previously selected zoom value (e.g., a last used and/or a most used zoom level)). In some embodiments the first set of context criteria includes a criterion that is met when the computer system is configured to capture media with a preselected zoom level (e.g., a specific zoom level (1×, 2×, 3×, or 10×), an optical zoom level, and/or a digital zoom level) (in some embodiments a set of predetermined zoom levels (e.g., zoom levels between 1× and 3×, a zoom level greater than a specific zoom level (e.g., 3× or more), and/or a zoom level that is less than a specific zoom level (e.g., less than 3×)) when the input directed to capturing the media item is detected (e.g., a media capture application is currently set to the preselected zoom level). In some embodiments when the computer system is configured to capture media with a preselected zoom level (e.g., 3×), the first subset of cameras includes cameras with optical zoom levels (e.g., one or more of the cameras are fixed focal length cameras) that are at and below the preselected zoom level (e.g., the first subset of cameras includes a camera with a 3× zoom and a camera with a 1× zoom). Having a criterion based on the zoom level provides for camera subset selection based on a degree of zoom that affects the content that will be captured, which can assist the user with composing media capture events and reduces the risk that transient media capture opportunities are missed due to a zoom level being inadequate to properly capture intended content (e.g., content is cropped out due to excessive zoom or content is lacking detail due to insufficient zoom), which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of context criteria includes a second criterion that is met based on a classification (e.g., the content is classified as moving content, still content, a person, an animal, an inanimate object, and/or content relating to a type of event (e.g., a sporting event, an artistic performance, and/or a speech)) of content being captured (e.g., as discussed with reference to FIG. 9C) (e.g., content to be captured). In some embodiments the classification of the content being captured is based on user input (e.g., a setting manually selected by the user (e.g., a capture mode setting such as sport, portrait, action, and/or still life and/or a capture setting such as aperture/depth-effect value, white balance, and/or focal point)). In some embodiments the classification of the content being captured is based on a determination made by the computer system (e.g., based on data from one or more sensors (e.g., one or more cameras of the plurality of cameras and/or microphones) that are in communication with the computer system (e.g., based on image data being captured matching a predetermined pattern) and/or based on data regarding an appropriate set of cameras to be used based on the time of day and/or previously selected by the user in similar conditions). Selecting which subset of cameras to use for media capture based on classification of the content (e.g., after the classification is selected and/or determined), performs an operation when a set of conditions has been met without requiring further user input. Doing so also assists the user with composing media capture events and reduces the risk that transient media capture opportunities are missed or miscaptured due to characteristics (e.g., orientation, zoom level, and/or sensor size) of a camera subset being inappropriate for a the classification of the content, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first set of context criteria are met when the content being captured is classified as content that includes a degree of motion of one or subjects that exceeds a predetermined threshold (e.g., as discussed with reference to FIG. 9D) (e.g., the content being captured is a sporting event and/or action-related event); and (in some embodiments the first subset of cameras includes at least one camera configured to capture high-speed motion and/or reduced blurring (e.g., the camera has low shutter speed value (e.g., a fast shutter speed setting)) and/or a camera having a rapid focusing speed and/or a camera having a wide field-of-view.) (in some embodiments the content is classified based on the distance and/or number of subjects within the content (e.g., a sporting event captured from a distance that includes multiple subjects or a portrait of a single subject captured at a close distance) the first set of context criteria are not met when the content being captured is classified as content that does not include a degree of motion of one or subjects that exceeds the predetermined threshold (e.g., as discussed with reference to FIG. 9E) (e.g., the content being captured is a portrait of a subject and/or a still life composition). In some embodiments the second subset of cameras includes at least one camera configured to capture a high amount of light and/or with a high amount of depth effect (e.g., a camera with a low f-stop value) and/or with a larger sensor size to capture a high amount of data/details.) Selecting a subset of cameras based on a degree of motion of the one or more subjects assists the user with composing media capture events and reduces the risk that transient media capture opportunities are missed or miscaptured due to characteristics (e.g., shutter speed, orientation, zoom level, and/or sensor size) of a camera subset being inappropriate for a the degree of motion, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the classification of the content being captured is based on movement (e.g., movement away from the computer system) of a plurality of objects (in some embodiments the objects are identified as potential subjects of interest (e.g., players, balls, and/or vehicles in a sporting event) detected by at least one camera of the plurality of cameras (e.g., as discussed with reference to FIG. 9C). In some embodiments movement of a plurality of objects causes the computer system to select a subset of cameras for media capture that includes at least one camera configured to capture high-speed motion and/or reduced blurring (e.g., the camera has low shutter speed value (e.g., a fast shutter speed setting)) and/or a camera having a rapid focusing speed and/or a camera having a wide field-of-view. Classifying content being captured based on the movement of a plurality of objects allows for automatic selection of an appropriate subset of cameras based on that movement, performs an operation when a set of conditions has been met without requiring further user input. Doing so also assists the user with composing media capture events and reduces the risk that transient media capture opportunities are missed due to characteristics (e.g., orientation, zoom level, and/or sensor size) of a camera in one subset that can be different from the characteristics of cameras in the second subset and that are more appropriate for capturing movement, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the determination of whether the first set of context criteria are met is made (e.g., made by the computer system and/or an external device in communication with the computer system) prior to detecting the input (e.g., prior to 912A) directed to capturing the media item. In some embodiments the computer system is periodically or continually evaluating whether the first subset or second subset of cameras should be used and adjusting accordingly. In some embodiments the computer system can switch, during a capturing of the media item (e.g., when the media item is video captured over time), from using the first subset of cameras to using the second subset of cameras based on a determination of whether a second set of context criteria are met (e.g., when the context changes during capture). Making a determination prior to detecting the input reduces the risk that the wrong subset of cameras are selected for media capture, which assists the user with composing media capture events and reduces the risk that transient media capture opportunities are missed due to characteristics (e.g., orientation, zoom level, and/or sensor size) of a camera in one subset that can be different from the characteristics of cameras in the second subset and that are more appropriate for capturing movement, which enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first subset of cameras includes a first camera (e.g., 602A or a camera corresponding to 0.5× magnification) that has a first field-of-view that is different than a second field-of-view of a second camera (e.g., 602B or a camera corresponding to 1× magnification) that is included in the second set of cameras. In some embodiments the first field-of-view is wider than the field-of-view of one or more cameras or all cameras in the second subset of cameras. In some embodiments the first field-of-view is narrower than the field-of-view of one or more cameras or all cameras in the second subset of cameras. In some embodiments cameras within a subset of cameras have different fields-of-view (e.g., the first subset of cameras includes a third camera that has a third field-of-view and a fourth camera that has a fourth field-of-view that is different than the third field-of-view) (e.g., the first subset of cameras includes a wide and a telephoto camera). Employing cameras with different fields-of-view in the first and second subsets of cameras assists the user with composing media capture events and reduces the risk that transient media capture opportunities are missed due to camera having the wrong field-of-view to properly capture the content (e.g., content is cropped out due to excessive zoom and/or content is lacking detail due to insufficient zoom and/or content being missed because the field-of-view is not oriented in a direction to capture the content), which enhances the operability of the system and makes the user-system interface more efficient (e.g., by helping the user to provide proper inputs and reducing user mistakes when operating and/or interacting with the system) which, additionally, reduces power usage and improves battery life of the system by enabling the user to use the system more quickly and efficiently.

Note that details of the processes described above with respect to method 1000 (e.g., FIG. 10) are also applicable in an analogous manner to the methods described above. For example, a media item can be captured using both the techniques of method 1000 and 800. For another example, a media item captured according to method 1000 can be edited using one or more techniques of method 700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve capture and/or editing of media items. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the capture and/or editing of media items. Accordingly, use of such personal information data enables users to have calculated control of the capture and/or editing of media items. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of contextual data to improve the capture of media items, the present technology can be configured to allow users to select to "opt in" or "opt out" of participation in the collection of personal information data during registration for services or anytime thereafter. In another example, users can select not to provide contextual data to improve the capture of media items. In yet another example, users can select to limit the length of time contextual data is maintained or entirely prohibit the development of a contextual data to improve the capture of media items. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media items can be captured and/or cameras can be selected for capture by inferring preferences based on non-personal information data or a bare minimum amount of personal information, such as the content being requested by the device associated with a user, other non-personal information available to camera application, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

displaying, via the display generation component, an editing user interface for editing a respective media item that was previously captured, wherein the editing user interface includes a first set of one or more edit options to edit a first type of media;

while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

2. The computer system of claim 1, wherein the second type of media includes a synthetic depth-of-field effect applied to a plurality of frames of the respective media item, wherein the first type of media does not include the synthetic depth-of-field effect applied to the plurality of frames of the respective media item.

3. The computer system of claim 1, wherein the first set of one or more edit options to edit the first type of media does not include an option to modify a speed of playback of at least a portion of the respective media item, and wherein the second set of one or more edit options to edit the second type of media includes an option to modify the speed of playback of at least a portion of the respective media item.

4. The computer system of claim 1, wherein the first set of one or more edit options to edit the first type of media includes a first playback selectable user interface object, that when activated, initiates playback of a first set of a plurality of portions of the respective media item at a first time interval, and wherein the second set of one or more edit options to edit the second type of media includes a second playback selectable user interface object, that when activated, causes playback of at least a second set of a plurality of portions of the respective media item at a second time interval, different from the first time interval.

5. The computer system of claim 1, the one or more programs further including instructions for:

subsequent to detecting the first input and while displaying the editing user interface, detecting, via the one or more input devices, a second input; and in response to detecting the second input, displaying, via the display generation component, the editing user interface for editing the respective media item, wherein the editing user interface includes a third set of one or more edit options, different from the first type of media and the second type of media, of the respective media item, wherein the first set of one more edit options is different from the second set of one or more edit options and the third set of one or more edit options.

6. The computer system of claim 1, the one or more programs further including instructions for:

in accordance with a determination that a set of discarding criteria is satisfied, discarding a portion of additional data corresponding to the respective media item; and in accordance with a determination that the set of discarding criteria is not satisfied, forgoing discarding the portion of additional data corresponding to the respective media item.

7. The computer system of claim 6, wherein the set of discarding criteria includes a first criterion that is satisfied when a predetermined amount of time has elapsed subsequent to capturing the respective media item.

8. The computer system of claim 6, wherein the set of discarding criteria includes a second criterion that is satisfied when the respective media item was not edited within a respective amount of time after capturing the respective media item.

9. The computer system of claim 8, wherein one or more media items that have been edited within the respective amount of time continue to be associated with additional data corresponding to the respective media item after the respective amount of time.

10. The computer system of claim 6, wherein the set of discarding criteria includes a fourth criterion that is satisfied when the respective media item is not marked as a favorite.

11. The computer system of claim 6, wherein the set of discarding criteria includes a fifth criterion that is satisfied when the respective media item does not meet a view frequency threshold.

12. The computer system of claim 6, wherein the additional data includes data from a first camera and data from a second camera different from the first camera, and wherein discarding the portion of additional data includes discarding the data from the second camera.

13. The computer system of claim 6, wherein the additional data includes first data for presenting the respective media item at a first frame rate and second data for presenting the respective media item at a second frame rate that is higher than the first frame rate, and wherein discarding the portion of additional data includes discarding the second data for presenting the respective media item at the second frame rate that is higher than the first frame rate.

14. The computer system of claim 1, wherein the editing user interface includes a mode selection graphical object, that, when selected, initiates a change of an editing mode for the respective media item from a first type of editing mode to a second type of editing mode that is different from the first type of editing mode.

15. The computer system of claim 14, wherein the first input corresponds to an input on the mode selection graphical object.

16. The computer system of claim 14, wherein prior to detecting the first input, displaying the editing user interface for editing the respective media item that was previously captured without displaying the mode selection graphical object.

17. The computer system of claim 14, wherein the mode selection graphical object:

in accordance with a determination that a dynamic mode criteria are satisfied, includes a respective mode type graphical indication; and in accordance with a determination that the dynamic mode criteria are not satisfied, does not include the respective mode type graphical indication.

18. The computer system of claim 1, the one or more programs further including instructions for:

in accordance with a determination that a first media item includes a first threshold amount of lateral data, displaying, via the display generation component, a panoramic graphical object that indicates that a sufficient amount of data is present for a panoramic image; and in accordance with a determination that the first media item does not include the first threshold amount of lateral data, forgoing displaying the panoramic graphical object.

19. The computer system of claim 18, wherein displaying the panoramic graphical object includes displaying an animation of the panoramic graphical object from a first graphical state to a second graphical state.

20. The computer system of claim 18, wherein the panoramic graphical object is displayed while displaying the editing user interface for editing the respective media item that was previously captured.

21. The computer system of claim 18, the one or more programs further including instructions for:

while displaying a capture user interface for capturing a second media item:

in accordance with a determination that the second media item includes a second threshold amount of lateral data, displaying, via the display generation component, a second panoramic graphical object that indicates that a second sufficient amount of data is present for a second panoramic image; and in accordance with a determination that the second media item does not include the second threshold amount of lateral data, forgoing displaying the second panoramic graphical object.

22. The computer system of claim 1, the one or more programs further including instructions for:

displaying a representation of the respective media item, wherein the representation of the respective media item includes an indication that the respective media item includes additional data.

23. The computer system of claim 1, the one or more programs further including instructions for:

while capturing a third media item:

in accordance with a determination that the third media item is being captured in a first mode, displaying a multi-capture graphical object, that when activated, initiates a process to capture the third media item in a second mode, different from the first mode, wherein capturing the third media item in the second mode includes capturing data sufficient for the third media item to be presented as multiple media types during an edit mode.

24. The computer system of claim 23, the one or more programs further including instructions for:

while capturing the third media item:

in accordance with the determination that the third media item is being captured in the first mode, displaying, via the display generation component, a first set of configuration graphical objects for modifying a first set of one or more settings corresponding to capturing media in the first mode; and in accordance with a determination that the third media item is being captured in the second mode, different from the first mode, displaying, via the display generation component, a second set of configuration graphical objects for modifying a first set of one or more settings corresponding to capturing media in the second mode, wherein the second set of configuration graphical objects includes fewer graphical objects than the first set of configuration graphical objects.

25. The computer system of claim 23, wherein the third media item, when captured in the first mode, includes data sufficient for presenting the third media item as a first media type without including data sufficient for presenting the third media item as a second media type, different from the first media type.

26. The computer system of claim 1, the one or more programs further including instructions for:

while displaying the editing user interface for editing the respective media item that was previously captured, detecting, via the one or more input devices, a fourth input; and in response to detecting the fourth input:

in accordance with a determination that the fourth input is detected while displaying the editing user interface that includes the first set of one or more edit options to edit the first type of media, displaying a representation of the respective media item, wherein the representation of the respective media item corresponds to the first type of media; and in accordance with a determination that the fourth input is detected while displaying the editing user interface that includes the second set of one or more edit options to edit the second type of media, displaying the representation of the respective media item, wherein the representation of the respective media item corresponds to the second type of media.

27. A non-transitory computer-readable storage medium storing one or more programs configured to be executed by one or more processors of a computer system that is in communication with a display generation component and one or more input devices, the one or more programs including instructions for:

displaying, via the display generation component, an editing user interface for editing a respective media item that was previously captured, wherein the editing user interface includes a first set of one or more edit options to edit a first type of media;

while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

28. The non-transitory computer-readable storage medium of claim 27, wherein the second type of media includes a synthetic depth-of-field effect applied to a plurality of frames of the respective media item, wherein the first type of media does not include the synthetic depth-of-field effect applied to the plurality of frames of the respective media item.

29. The non-transitory computer-readable storage medium of claim 27, wherein the first set of one or more edit options to edit the first type of media does not include an option to modify a speed of playback of at least a portion of the respective media item, and wherein the second set of one or more edit options to edit the second type of media includes an option to modify the speed of playback of at least a portion of the respective media item.

30. The non-transitory computer-readable storage medium of claim 27, wherein the first set of one or more edit options to edit the first type of media includes a first playback selectable user interface object, that when activated, initiates playback of a first set of a plurality of portions of the respective media item at a first time interval, and wherein the second set of one or more edit options to edit the second type of media includes a second playback selectable user interface object, that when activated, causes playback of at least a second set of a plurality of portions of the respective media item at a second time interval, different from the first time interval.

31. The non-transitory computer-readable storage medium of claim 27, wherein the editing user interface includes a mode selection graphical object, that, when selected, initiates a change of an editing mode for the respective media item from a first type of editing mode to a second type of editing mode that is different from the first type of editing mode.

32. The non-transitory computer-readable storage medium of claim 27, the one or more programs further including instructions for:

in accordance with a determination that a first media item includes a first threshold amount of lateral data, displaying, via the display generation component, a panoramic graphical object that indicates that a sufficient amount of data is present for a panoramic image; and in accordance with a determination that the first media item does not include the first threshold amount of lateral data, forgoing displaying the panoramic graphical object.

33. The non-transitory computer-readable storage medium of claim 27, the one or more programs further including instructions for:

displaying a representation of the respective media item, wherein the representation of the respective media item includes an indication that the respective media item includes additional data.

34. The non-transitory computer-readable storage medium of claim 27, the one or more programs further including instructions for:

while capturing a third media item:

in accordance with a determination that the third media item is being captured in a first mode, displaying a multi-capture graphical object, that when activated, initiates a process to capture the third media item in a second mode, different from the first mode, wherein capturing the third media item in the second mode includes capturing data sufficient for the third media item to be presented as multiple media types during an edit mode.

35. The non-transitory computer-readable storage medium of claim 27, the one or more programs further including instructions for:

while displaying the editing user interface for editing the respective media item that was previously captured, detecting, via the one or more input devices, a fourth input; and in response to detecting the fourth input:

in accordance with a determination that the fourth input is detected while displaying the editing user interface that includes the first set of one or more edit options to edit the first type of media, displaying a representation of the respective media item, wherein the representation of the respective media item corresponds to the first type of media; and in accordance with a determination that the fourth input is detected while displaying the editing user interface that includes the second set of one or more edit options to edit the second type of media, displaying the representation of the respective media item, wherein the representation of the respective media item corresponds to the second type of media.

36. A method, comprising:

at a computer system that is in communication with a display generation component and one or more input devices:

displaying, via the display generation component, an editing user interface for editing a respective media item that was previously captured, wherein the editing user interface includes a first set of one or more edit options to edit a first type of media;

while displaying the editing user interface, detecting, via the one or more input devices, a first input; and in response to detecting the first input, displaying, via the display generation component, the editing user interface for editing the respective media item, wherein the editing user interface includes a second set of one or more edit options to edit a second type of media, different from the first type of media, of the respective media item, wherein the first set of one more edit options is different from the second set of one or more edit options.

37. The method of claim 36, wherein the second type of media includes a synthetic depth-of-field effect applied to a plurality of frames of the respective media item, wherein the first type of media does not include the synthetic depth-of-field effect applied to the plurality of frames of the respective media item.

38. The method of claim 36, wherein the first set of one or more edit options to edit the first type of media does not include an option to modify a speed of playback of at least a portion of the respective media item, and wherein the second set of one or more edit options to edit the second type of media includes an option to modify the speed of playback of at least a portion of the respective media item.

39. The method of claim 36, wherein the first set of one or more edit options to edit the first type of media includes a first playback selectable user interface object, that when activated, initiates playback of a first set of a plurality of portions of the respective media item at a first time interval, and wherein the second set of one or more edit options to edit the second type of media includes a second playback selectable user interface object, that when activated, causes playback of at least a second set of a plurality of portions of the respective media item at a second time interval, different from the first time interval.

40. The method of claim 36, wherein the editing user interface includes a mode selection graphical object, that, when selected, initiates a change of an editing mode for the respective media item from a first type of editing mode to a second type of editing mode that is different from the first type of editing mode.

41. The method of claim 36, further comprising:

in accordance with a determination that a first media item includes a first threshold amount of lateral data, displaying, via the display generation component, a panoramic graphical object that indicates that a sufficient amount of data is present for a panoramic image; and in accordance with a determination that the first media item does not include the first threshold amount of lateral data, forgoing displaying the panoramic graphical object.

42. The method of claim 36, further comprising:

displaying a representation of the respective media item, wherein the representation of the respective media item includes an indication that the respective media item includes additional data.

43. The method of claim 36, further comprising:

while capturing a third media item:

in accordance with a determination that the third media item is being captured in a first mode, displaying a multi-capture graphical object, that when activated, initiates a process to capture the third media item in a second mode, different from the first mode, wherein capturing the third media item in the second mode includes capturing data sufficient for the third media item to be presented as multiple media types during an edit mode.

44. The method of claim 36, further comprising:

while displaying the editing user interface for editing the respective media item that was previously captured, detecting, via the one or more input devices, a fourth input; and in response to detecting the fourth input:

in accordance with a determination that the fourth input is detected while displaying the editing user interface that includes the first set of one or more edit options to edit the first type of media, displaying a representation of the respective media item, wherein the representation of the respective media item corresponds to the first type of media; and in accordance with a determination that the fourth input is detected while displaying the editing user interface that includes the second set of one or more edit options to edit the second type of media, displaying the representation of the respective media item, wherein the representation of the respective media item corresponds to the second type of media.

* * * * *